United States Patent
King

(10) Patent No.: US 6,532,476 B1
(45) Date of Patent: Mar. 11, 2003

(54) SOFTWARE BASED METHODOLOGY FOR THE STORAGE AND RETRIEVAL OF DIVERSE INFORMATION

(75) Inventor: Kevin D. King, Longmont, CO (US)

(73) Assignee: Precision Solutions, Inc., Longmont, CO (US)

( * ) Notice: Subject to any disclaimer, the term of this patent is extended or adjusted under 35 U.S.C. 154(b) by 0 days.

(21) Appl. No.: 09/438,328

(22) Filed: Nov. 13, 1999

(51) Int. Cl.[7] .............................................. G06F 17/30
(52) U.S. Cl. ........................ 707/104.1; 707/2; 707/101; 707/205
(58) Field of Search .................... 707/1–10, 100–104.1, 707/200–206, 101

(56) References Cited

U.S. PATENT DOCUMENTS

| | | | | |
|---|---|---|---|---|
| 4,068,300 A | * | 1/1978 | Bachman | 707/1 |
| 4,479,196 A | | 10/1984 | Ferrer et al. | |
| 4,631,673 A | * | 12/1986 | Haas et al. | 707/100 |
| 4,637,059 A | * | 1/1987 | Habitzreiter et al. | 382/260 |
| 4,714,996 A | | 12/1987 | Gladney et al. | |
| 4,868,376 A | * | 9/1989 | Lessin et al. | 235/380 |
| 5,201,046 A | | 4/1993 | Goldberg et al. | |
| 5,204,958 A | * | 4/1993 | Cheng et al. | 707/102 |
| 5,230,073 A | * | 7/1993 | Gausmann et al. | 707/3 |
| 5,257,365 A | | 10/1993 | Powers et al. | |
| 5,359,724 A | | 10/1994 | Earle | |
| 5,412,801 A | * | 5/1995 | de Remer et al. | 714/20 |
| 5,414,834 A | | 5/1995 | Alexander et al. | |
| 5,535,067 A | * | 7/1996 | Rooke | 327/159 |
| 5,548,751 A | | 8/1996 | Ryu et al. | |
| 5,551,002 A | | 8/1996 | Flax et al. | |
| 5,586,280 A | * | 12/1996 | Simms | 707/2 |
| 5,625,814 A | * | 4/1997 | Luciw | 707/5 |
| 5,692,177 A | | 11/1997 | Miller | |
| 5,694,576 A | * | 12/1997 | Yamamoto | 711/154 |
| 5,729,730 A | | 3/1998 | Wlaschin et al. | |
| 5,752,343 A | | 5/1998 | Reiter et al. | |
| 5,809,509 A | | 9/1998 | Blackman et al. | |
| 5,860,136 A | * | 1/1999 | Fenner | 370/396 |
| 5,893,087 A | | 4/1999 | Wlaschin et al. | |
| 5,905,985 A | | 5/1999 | Malloy et al. | |
| 5,956,729 A | * | 9/1999 | Goetz et al. | 707/102 |
| 5,960,434 A | * | 9/1999 | Schimmel | 707/100 |
| 5,974,427 A | * | 10/1999 | Reiter | 707/203 |
| 5,987,468 A | * | 11/1999 | Singh et al. | 707/100 |
| 6,029,170 A | * | 2/2000 | Garger et al. | 707/1 |
| 6,088,778 A | * | 7/2000 | Ruff et al. | 711/112 |
| 6,098,125 A | * | 8/2000 | Fiacco et al. | 370/235 |
| 6,285,607 B1 | * | 9/2001 | Sinclair | 365/189.01 |
| 6,336,124 B1 | * | 1/2002 | Alam et al. | 707/523 |
| 2002/0015423 A1 | * | 2/2002 | Rakib et al. | 370/485 |

FOREIGN PATENT DOCUMENTS

EP          0 398 650        11/1990

* cited by examiner

Primary Examiner—Greta Robinson
Assistant Examiner—Harold E. Dodds, Jr.
(74) Attorney, Agent, or Firm—Law Offices of Jessica Costa, PC; Jessica Costa

(57) ABSTRACT

Using a novel methodology for organizing information both in non-persistent and persistent computer storage devices, limitations common to traditional data storage models are eliminated. The invention combines two distinct, yet complementary technologies, one for the organization of non-persistent storage and one for the organization of persistent storage. The invention allows records of unlimited dimensions containing data of any type and size, in any combination, to be constructed, maintained, and utilized in both non-persistent and persistent storage. In the persistent model, the invention also allows a user to define variable length frames, multiple hashing algorithms, and reuse of space caused by deleted records using an automatic gap consolidation algorithm.

11 Claims, 47 Drawing Sheets

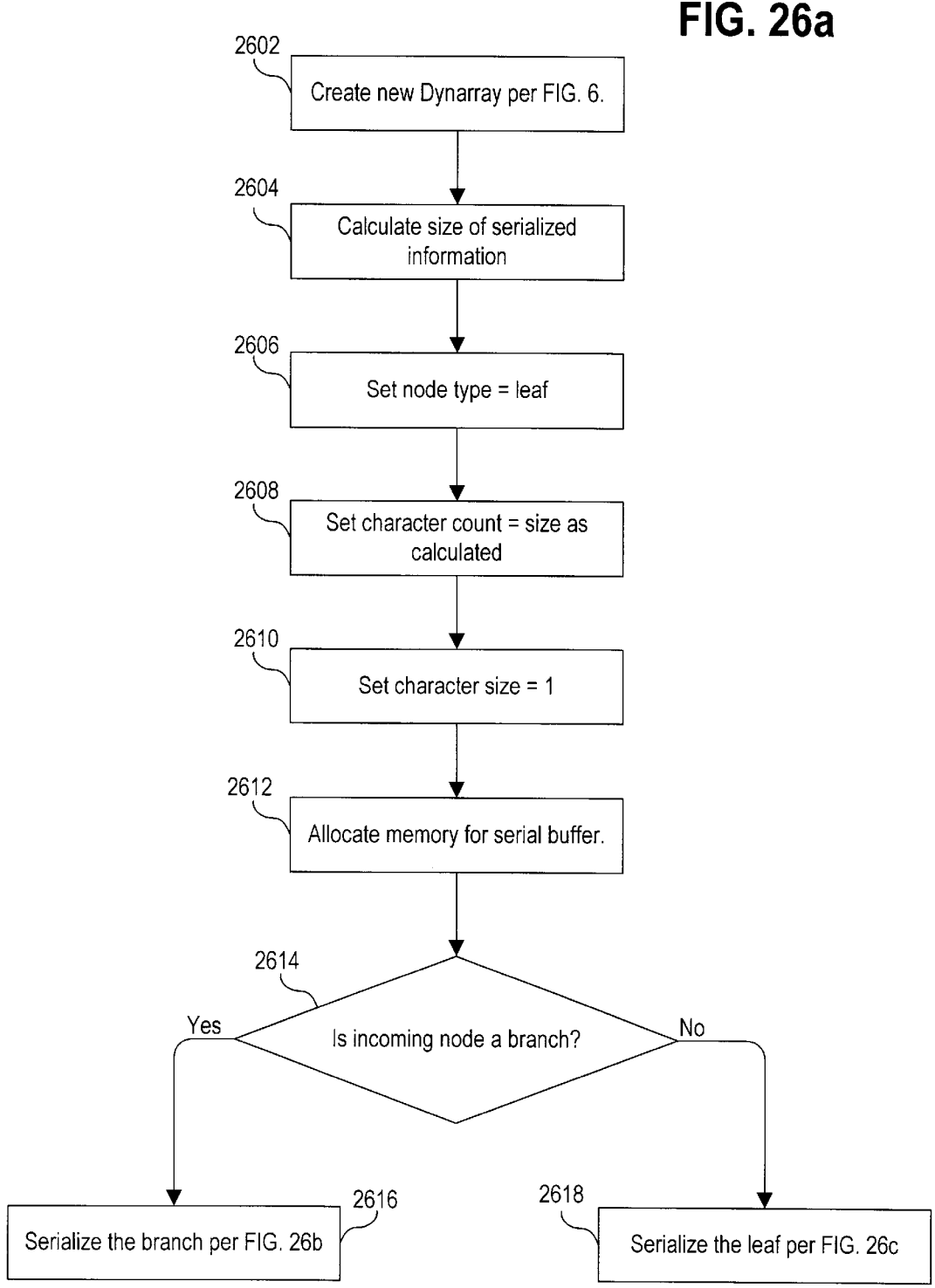

SOFTWARE BASED METHODOLOGY FOR THE STORAGE AND RETRIEVAL OF DIVERSE INFORMATION

TECHNICAL FIELD OF THE INVENTION

The present invention relates to the field of computer database software used for the storage and retrieval of information, and more particularly to an adaptive multi-dimensional database capable of storing and retrieving information of any type and format to and from both persistent and non-persistent storage.

BACKGROUND OF THE INVENTION

For nearly as long as computers have been used for the calculation of results, they have been used for the storage and retrieval of information. This task is one for which computers are well suited; the structure of the computing hardware itself (specifically, a processor controlling persistent and non-persistent storage) provides an excellent platform for the storage and retrieval of information.

Current database technologies are typically characterized by one or the other of two predominant data storage methodologies. The first of these methodologies is known generally as "relational" storage. While there are many characteristics of relational databases, perhaps the most significant is the requirement that every piece of information stored must be of a predetermined length. At the time the file is constructed, the length of each data field to be stored per record is determined, and all records added from that point forward must adhere to those restrictions on a field-by-field basis. While this methodology is certainly pragmatic, it provides several opportunities for improvement. First, if a field is defined to be x in length, then exactly x characters must be stored there. If information exceeding xcharacters must be stored, that information must be divided among multiple fields, disassembled at the time of storage, and reassembled at the time of retrieval. Such manipulation provides no practical benefit, other than to overcome an inherent weakness in the technology. On the other hand, if less than x characters are to be stored, storage space is wasted as the information is padded out with a predefined neutral character in order to fit the x character minimum for the field.

Another characteristic of a relational database is that it is inherently two-dimensional. A relational database is essentially a table organized into columns and rows, which provides a single data element at the intersection of each column and row. While this is an easily understood storage model, it is highly restrictive. If multiple values are required at each intersection, the database designer has two options: either 1) add new columns, or 2) add new rows for each of the multiple values. Neither option is optimal. If a new column is added, each row must then also contain that new column, regardless of whether or not multiple values exist for that row, since the size of the record is fixed and must be known prior to allocating the record. If, on the other hand, a new row is added for each multiple value, each row must then store duplicate information to maintain the relationships. In either case, storage is unnecessarily allocated, resulting in inefficient storage use.

To illustrate this, consider a relational database file containing parent and child names. For each parent, the file supports the storage of one child, such as the following:

| Parent | Child |
|---|---|
| Joe Smith | Sally Smith |
| Bob Thomas | Jim Thomas |

The file structure presents a problem if a parent has more than one child. Using the relational model, the database designer has one of two options; either 1) add new columns for each child, or 2) repeat the parent information for each child. If the designer opts to add new columns, a number of columns to add must then be determined. However, this also presents a problem. If columns are defined, for example, for up to ten children, the file will not fully accommodate information for parents with more than ten children, and records for those who have fewer than ten children will still require the same amount of storage. If, on the other hand, the parent information is repeated by adding more rows, storage is wasted for each duplicated parent value. Obviously, neither option provides a complete solution.

The other predominant data storage methodology is known generally as "Multivalue" storage. Multivalue database systems (formerly known as Pick©-compatible systems; named after Richard Pick, the commonly accepted founder of the Multivalue technology) overcome the weaknesses inherent in the relational storage model. First, information stored in a Multivalue file is dynamic—that is, each record grows and/or shrinks based on the information to be stored. Unlike a relational file, which requires each record to be discretely defined at the time of file creation, a Multivalue file has no such restrictions. Instead, a file can be created, fields of any length can be added to records and textual records of any length or structure can be added to the file at any time.

Also unlike the relational methodology, the Multivalue methodology allows data to be multivalued—that is, multiple values can be stored at each intersection of column and row. Additionally, each value in a multivalued field can contain any number of subvalues, thus allowing the construction of a three-dimensional record of fields (more commonly known as attributes) containing multivalues, each multivalue potentially containing multiple subvalues.

Using the parent/child example from above, this information could be stored using the Multivalue methodology with much less overhead than with the relational methodology. Records stored in a Multivalue file might appear something like this:

Joe Smith^Sally Smith

Bob Thomas^Jim Thomas]Jack Thomas

Fields in a Multivalue record have no specific starting and ending positions, nor specific length, as do their relational counterparts. Instead, the record contains certain characters that are used to separate, or delimit, each field. In the above example, the caret represents an attribute mark, which separates individual fields in the record. In the second example, the bracket character represents a value mark, which separates the individual multivalues in the field. Though not shown in this example, a subvalue mark could also be used to further divide each multivalued field.

Unlike the relational methodology, which stores information in memory and on persistent storage using virtually identical structures, the Multivalue methodology uses hashing and framing techniques when organizing the information on persistent storage. Essentially, each Multivalue file is divided into a series of groups, each group comprising any number of frames, or areas of persistent storage. In order for a record to be written to a particular group, a primary key is hashed (used in a calculation) to determine the appropriate group where the record should be stored. This particular combination of techniques is very effective in providing quick access to any record in the file, with certain limitations, discussed below.

While the Multivalue storage and retrieval methodology has advantages over the relational method, it is also problematic. First and foremost, because certain characters are used to delimit the attributes, values, and subvalues in a record, these characters cannot be contained in the data itself without compromising the structure of the record. Second, because there are no predefined field widths (as there would be with the relational model), there is no way to calculate the position of a given field in the record. Therefore, to extract a field from a record, the record must be scanned from the top, counting delimiters until the desired field is reached. This, therefore, causes the performance at the bottom of the record to be degraded in comparison to the performance at the top of the record. As the record grows, the degradation becomes more significant.

Additionally, while framing and hashing work effectively to provide quick access to records in the file, all known implementations of the Multivalue methodology force a frame to be a certain length, such as 512, 1K, 2K, or 4K. This introduces an inefficiency that is common to relational databases—potentially significant excess storage can be required to fill a frame to maintain frame alignment in persistent storage.

Perhaps the most significant shortcoming applies to both methodologies. Both relational and Multivalue methodologies are designed for the storage of text and numbers, typically those in the ASCII character set. While implementations of both methodologies provide ways of accessing non-textual information (such as graphics or audio), neither methodology directly supports the storage of these types of highly dynamic and variant data forms inside of a 'normal' record.

In addition, due to the increase of text based computing, many applications now require that computers be able to recognize and manipulate text in different languages. UNICODE is a unified character encoding system for handling any type of international character that is maintained and developed by the UNICODE Consortium, and which is identical to the International Standards Organization's (ISO) Basic Multilingual Plane (BMP) of ISO 10646. Unlike the 8-bit ASCII character set, UNICODE provides a unified 16-bit encoding scheme which allows systems to exchange information unambiguously. In addition, many applications operate on non-textual data such as audio or video data, thus making it easier for application designers to create applications that are multi-language aware.

Although UNICODE may be used to solve many of the problems of storing multi-lingual characters, there are some applications in which it is desirable to store information of varying type. For example, many software companies internationalize their software; thus, they must support installations in multiple countries. In this scenario, the company may wish to store the customer's address both in English (using standard ASCII code) and in the customer's local language (for example, using UNICODE). However, to support multiple character types, today's database software must allocate enough memory to store the largest character type (e.g., 2 bytes for UNICODE). Thus, if the data is stored using a character type that requires less space than the largest character type (e.g., 1 byte for ASCII), memory space is unnecessarily wasted. Accordingly, a need exists for a database technology that allows any character or data type to be stored while still achieving optimal memory usage.

SUMMARY OF THE INVENTION

The present invention is a novel adaptive multidimensional database methodology that significantly improves over the prior art.

Just as the Multivalue methodology solves many of the concerns with the relational methodology, the invention solves the concerns with the Multivalue methodology. Rather than limit a record to merely two dimensions as in relational databases or to three dimensions as in Multivalue databases, the invention provides a methodology whereby a structure of unlimited dimensions can be constructed, maintained, and utilized. Additionally, there are no restrictions as to the type of information stored in each dimension of the invention's record. While textual and numeric values can certainly be stored, the invention can also support audio, graphic, and any other type of information without compromising the n-dimensional structure.

This ability to store literally any type or structure of information means that the invention inherently supports a type of textual information which is of increasing value in the global internet community—international character sets. The invention, unlike any existing data storage methodology, can store information encoded in any number of different character sets all within the same record.

Also, while the fundamental design of the invention's persistent storage algorithm is rooted in Multivalue concepts, the invention provides additional features. Unlike its Multivalue roots, the invention provides user-defined variable length frames, which overcome the problem of wasting persistent storage simply to 'fill space'. In addition, the invention provides multiple hashing algorithms to allow more control over the distributions of records in persistent storage. Additionally, an automatic gap consolidation feature of the invention provides a methodology for reusing areas of the file where records have previously been written and deleted. The technical advantages of this invention therefore extends all of the functionality of both the relational and Multivalue methodologies, without the problems inherent to either.

BRIEF DESCRIPTION OF THE DRAWING

The invention will be better understood from a reading of the following detailed description taken in conjunction with the drawing in which like reference designators are used to designate like elements, and in which:

FIGS. 26a–26c illustrate an operational flowchart of one embodiment for serializing a DynArray in the non-persistent storage model into a flat file for storage on persistent storage;

DETAILED DESCRIPTION

A novel methodology for the storage of variable size records which each are capable of storing multidimensional data to an infinite level subject only to the logical limitations of the operating system and hardware (particularly memory limitations) is described in detail hereinafter. The invention is described in terms of specific examples and illustrative embodiments, in particular with regard to implementation algorithms, which are presented by way of example only and not limitation.

Figure 1:
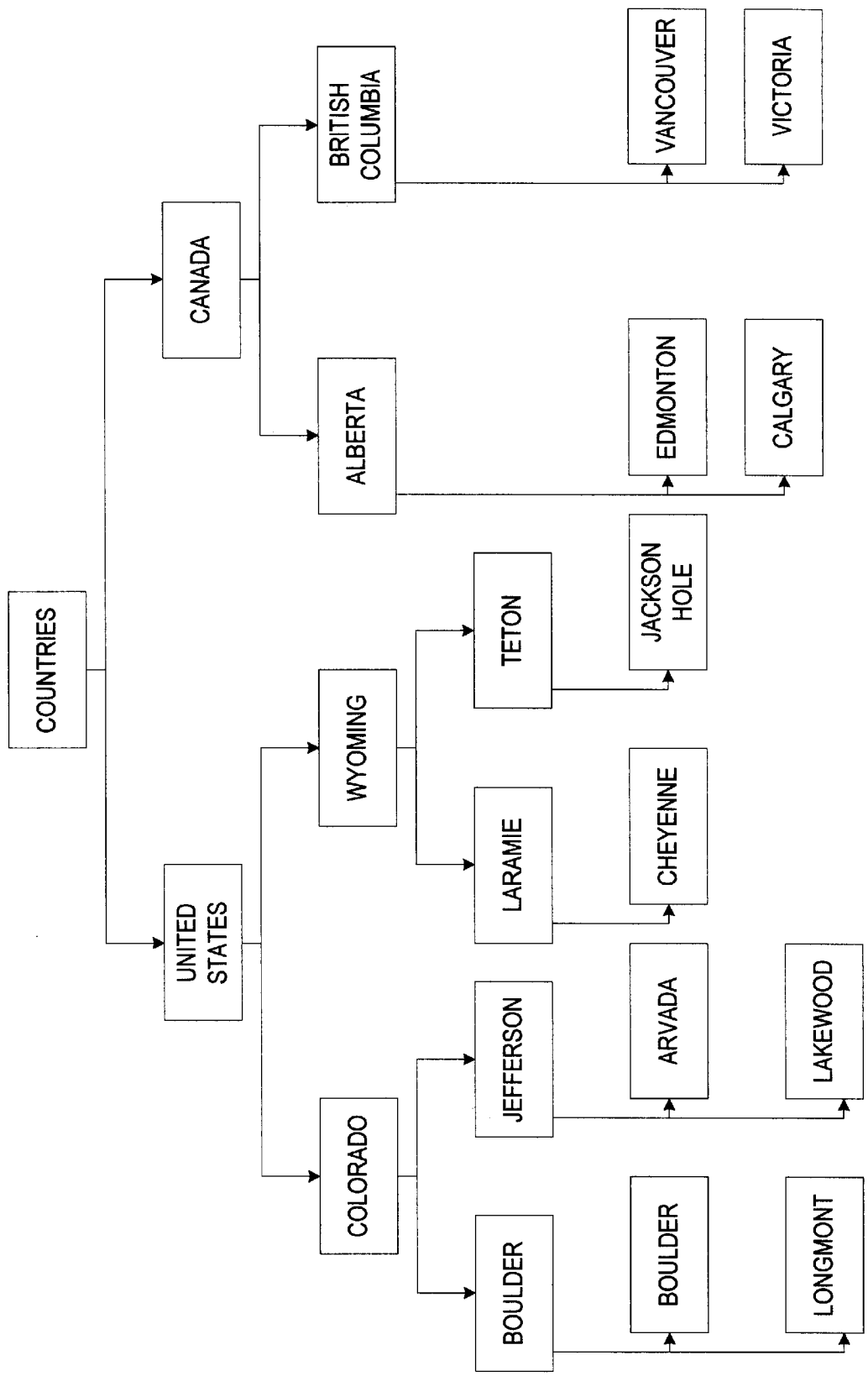
FIG. 1 is a diagram of an example multidimensional data set.

A theoretical example of a multidimensional data set is illustrated in FIG. 1. In this example, a single record is used to define city information. However, rather than simply list the city codes as a single unordered vector (i.e., a single dimension array), this set groups city codes according to the county where each city is located. Counties are then grouped according to the state where each is located. Finally, states are grouped according to the country where each is located. (In the case of Canada, there are not county codes, so cities are grouped according to their province code, and province codes in turn are grouped into the Canada country element.)

With the information structured as illustrated, the user of this information can instantly access all of the states for each country, all counties for a particular state and country, and all cities for a particular county, state, and country, without requiring multiple files or resource-expensive storage accesses.

It is clear from the example illustrated in FIG. 1 that the size of each country element will vary depending on the geographical definitions and structure of each individual country. For example, the United States has 50 states, whereas Canada has 12 provinces. Further, the size of each dimension for a given country can also vary. For example, the state of Colorado in the United States has 63 counties, whereas the state of Wyoming has 23 counties. The number of cities located in each county also vary. In addition, the language used to store the information may vary from country to country. For example, a record containing the country, state, county, and city designations for the United States might be stored in ASCII, which requires one byte per character, whereas a record containing designations for Japan might be stored in UNICODE, which requires 2 bytes per character. Accordingly, for all of the above reasons, the amount of space required to store country-specific information is not necessarily a standard size that is known beforehand. The invention accommodates storing this variable size and type of data with nominal resource requirements and overhead.

The invention is best understood through a separate analysis of its operation in relation to both a non-persistent storage model and a persistent storage model. As known by those skilled in the art, persistent storage defines a serial or semi-serial repository which records the storage of a generic object and will maintain that recording even after a power source has been discontinued. In terms of the present invention, persistent data is the data stored on and/or using such a repository. Non-persistent storage, by comparison, is also a serial or semi-serial repository. However, data stored in such a repository is not maintained after a power source has been discontinued. Typically, data is introduced into the invention in non-persistent storage, and can be copied to persistent storage before the end of the application session. Otherwise, data remaining in non-persistent storage will be discarded at the end of the application session.

Persistent and non-persistent storage models have different requirements for storing data. Due to the conventional serialized manner in which data is stored in persistent storage, the methodology for adding, deleting, and modifying a database in persistent storage must take into account the limitations of serialized or semi-serialized data placement format. Non-persistent storage differs from persistent storage in that it is not limited to any particular data placement format. Rather, data records in non-persistent storage may be, and typically will be, stored randomly according to memory allocation algorithms of the operating system. Accordingly, the methodology for adding, deleting, and modifying a database in non-persistent storage is subject to fewer constraints.

1. Non-Persistent Storage Model

Figure 2:
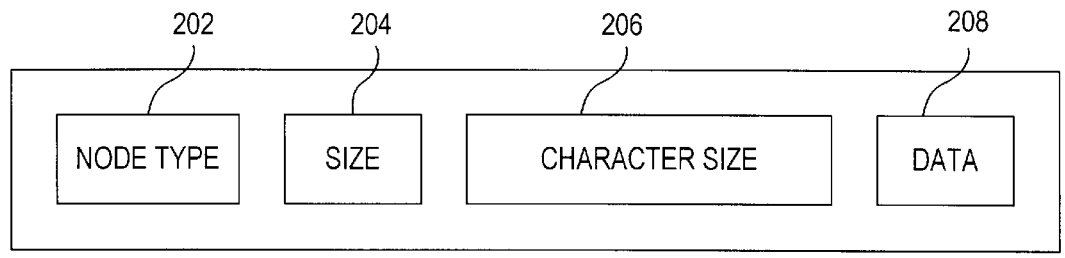
FIG. 2 is a diagram illustrating a DynArray node which is the fundamental building block of the invention in the non-persistent storage model.

The non-persistent storage model is a methodology for structuring the computer's memory to support the storage of any structure having any number of dimensions and storing any combination of types of information in a single entity. The fundamental basis of the persistent storage model is an entity known as a DynArray (Dynamic Array), shown in FIG. 2. An instance of this entity is commonly called a node, and includes a node type field 202, a size field 204, a count field 206 and a data field 208.

In accordance with the invention, there are two different types of nodes, identified by node type 202. Each node may be either a branch or a leaf. The remaining fields in the structure have different meaning depending on the type of node in question. For example, the data field 208 in a leaf node contains actual data, whereas the same field in a branch node contains references (pointers) to other branches and leaves in the structure. Table 1 describes the different fields and how they apply to branch and leaf nodes.

TABLE 1

| Field | Branch Node | Leaf Node |
| --- | --- | --- |
| Node Type | Set to BRANCH_TYPE when the node type is a branch node. | Set to LEAF_TYPE when the node type is a leaf node. |
| Size | Contains the number of references to other branches and leaves in the Data element. | Contains the number of characters (not necessarily the number of bytes) in the Data field. |
| Count | Not applicable to branch nodes. | Contains a value describing the number of bytes in each character as stored in the Data field. The total size of the Data field is (Count* Size). In the illustrative embodiment of the invention, this value is either 2 for Unicode textual values or 1 for all other types of values. |
| Data | Contains an array of references (pointers) to other nodes. | Contains a pointer to the actual data for that node. |

As described in Table 1, a leaf node is indicated when the node type 202 is equal to constant LEAF_TYPE. In a leaf node, size field 204 is defined to contain the number of characters in the data field 208. The size of each character contained in data field 208 is defined in the count field 206.

In contrast, a branch node is indicated when the node type 202 is equal to constant BRANCH_TYPE. In a branch node, the size field 204 is defined to contain the number of pointers, as contained in data field 208, to other nodes (either branch or leaf nodes). The count field 206 is not applicable to branch nodes.

In the illustrative embodiment of the invention, the count field is stored as a 32-bit unsigned long integer. This allows each leaf to contain $2^{32}$ bytes, and each branch to contain $2^{32}$ subnodes. Assuming a theoretical limit of $2^{32}$ dimensions, the maximum size of a single structure could reach as high as $2^{1.46E+48}$ bytes, far exceeding the limits of any computing hardware in existence today. Should expansion be warranted, however, the invention could be adapted to a double precision implementation, effectively expanding the existing capacity by an additional $2^{32}$.

In traditional database vernacular, each node could be considered either a field (leaf node) or record (branch node), with one very important exception. While nodes in the invention can be serial (as fields in a record would traditionally be structured), nodes can also be embedded within one another to form an unbalanced tree structure as illustrated in FIG. 3.

Figure 3:
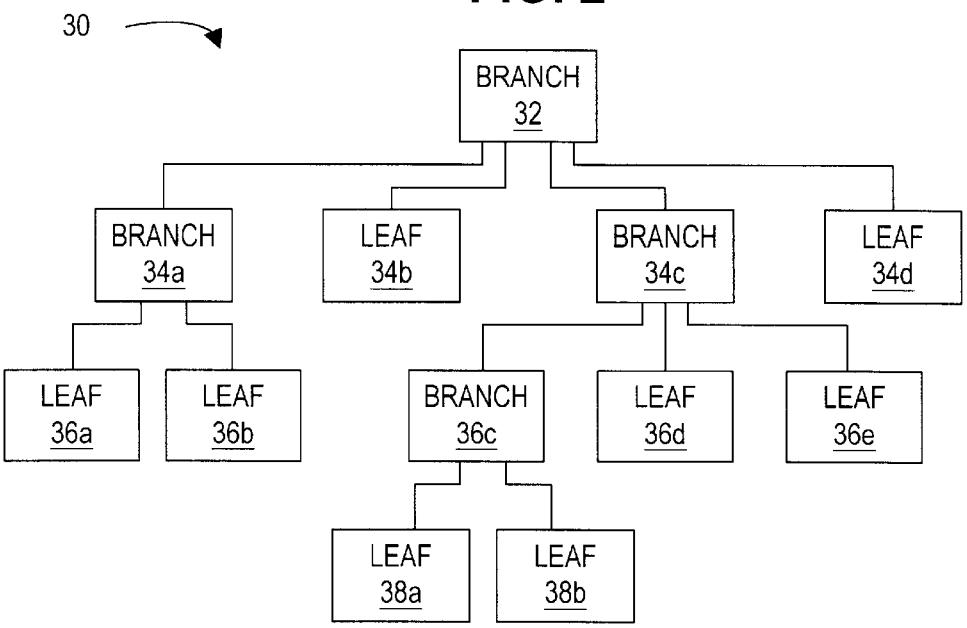
FIG. 3 is a tree structure built using DynArrays in accordance with the non-persistent storage model of the invention illustrated in diagrammatic form.

The tree illustrated in FIG. 3 is a 12 node DynArray 30 where the top node 32 is a branch with four subnodes 34a, 34b, 34c, 34d. The first 34a and third 34c subnodes are also branches with additional subnodes 36a, 36b, and 36c, 36d, 36e respectively. In contrast, the second 34b and fourth 34d subnodes of top node 32 are leaves, and have nothing below them. This illustrates a fundamental characteristic of branches and leaves; like a physical tree, which can grow branches out of branches out of branches, leaves-are the terminating point of the structure.

To illustrate how this structure might be used in practice, consider the data set of FIG. 1, namely a list of country codes with corresponding states, counties, and cities. The DynArray of the invention is capable of storing all of this information as a single entity, and hence a single record in persistent storage, without duplication of any values.

Figure 4A:
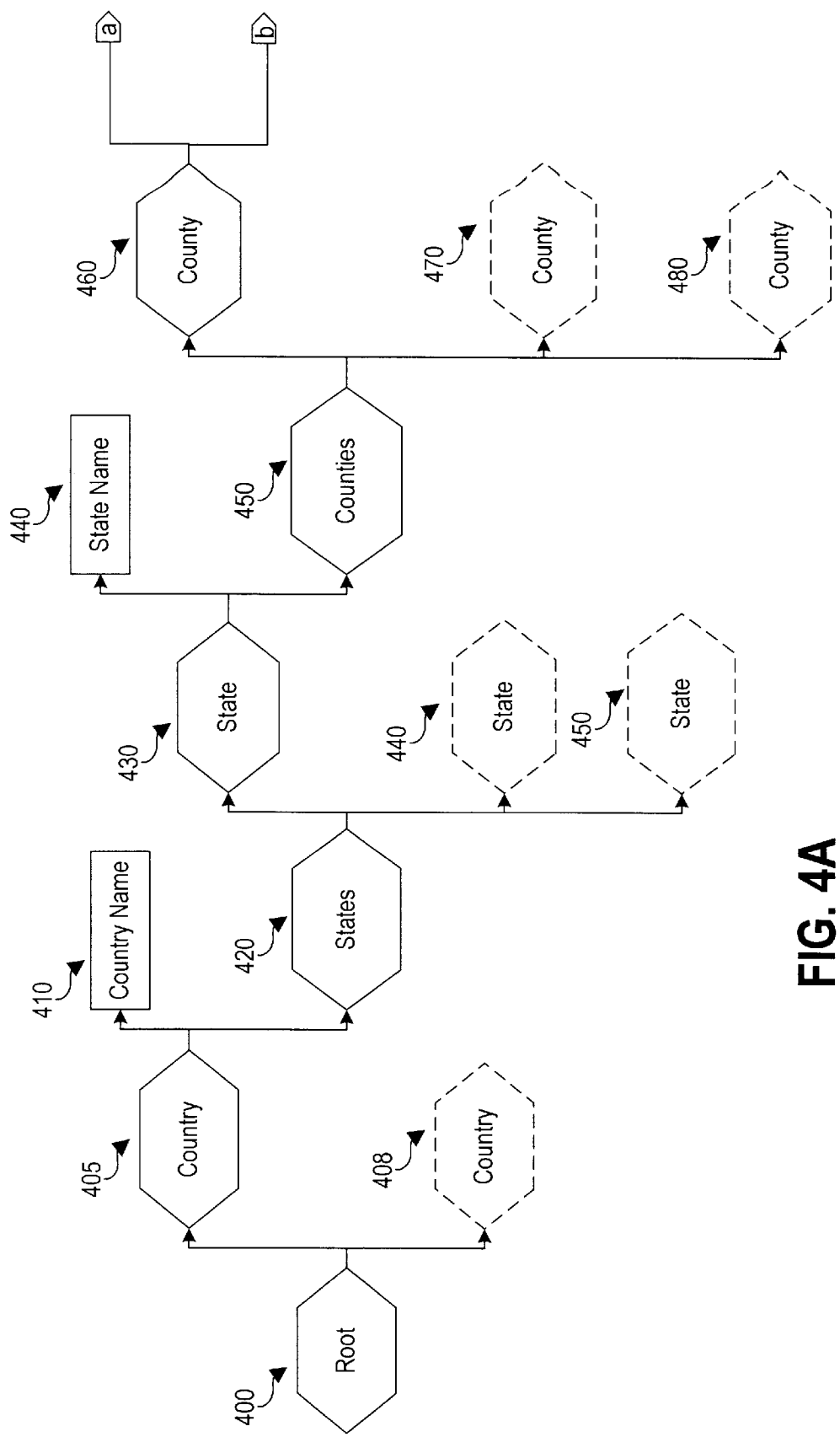
FIG. 4 is a diagrammatic illustration of a DynArray structure which has the ability to store the data set defined in FIG. 1.
Figure 4B:
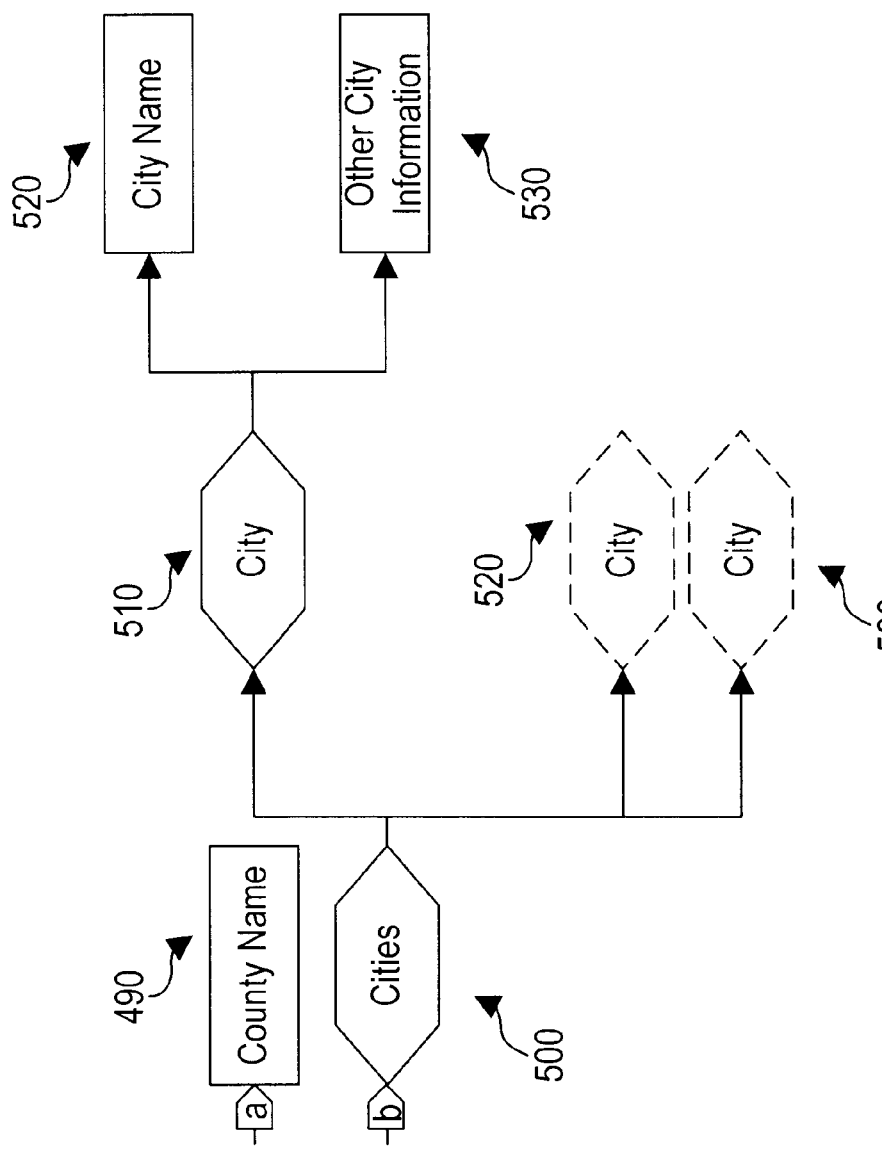

FIG. 4 illustrates a Dynarray 400 which stores an implementation of the data set defined in FIG. 1. As illustrated, node 400 is comprised of references to nodes 405 and 408, which each define country information. (Note that for the sake of illustrative brevity, the figure will expand upon only one branch node in each dimension. Though detail for the dashed boxes is not given here, it should be understood that the explanation for one box on a particular dimension applies unilaterally to all dashed boxes on the same dimension. Additionally, each dashed box represents the domain of 0 to $2^{32}$ iterations of the same.) Node 405, specific details for a given country, is comprised of references to nodes 410 and 420. In this dimension, 410 is a leaf node (actual data element) defining the name of the country, and 420 is a branch node defining a list of states associated with this country. Referenced by 420 are nodes 430, 440, and 450, which each define information for individual states in that country. Each state as defined by node 430 is comprised of references to nodes 440 and 450, where 440 is a leaf node defining a specific state name, and 450 is a branch node defining a list of counties associated with each state. Referenced by 450 are nodes 460, 470, and 480, which each define information for individual counties in that state. Each county defined by node 460 comprises references to nodes 490 and 500, where 490 is the name of a specific county, and 500 is a branch node defining the list of cities in the specific county. referenced by 490 are nodes 510, 520, and 530, which each define information for specific cities in that county. Each city defined by node 510 is comprised of references to nodes 520 and 530, where 520 is the name of a specific city and 530 represents miscellaneous information pertaining to a city. Note that while this figure illustrates the basic multidimensional implementation, specific data elements for each dimension have been sparsely illustrated for clarity. Once should note that while only two elements are shown in each dimension, each dimension can accommodate $2^{32}$ elements comprised of any combination of leaves and branches.

Figure 5A:
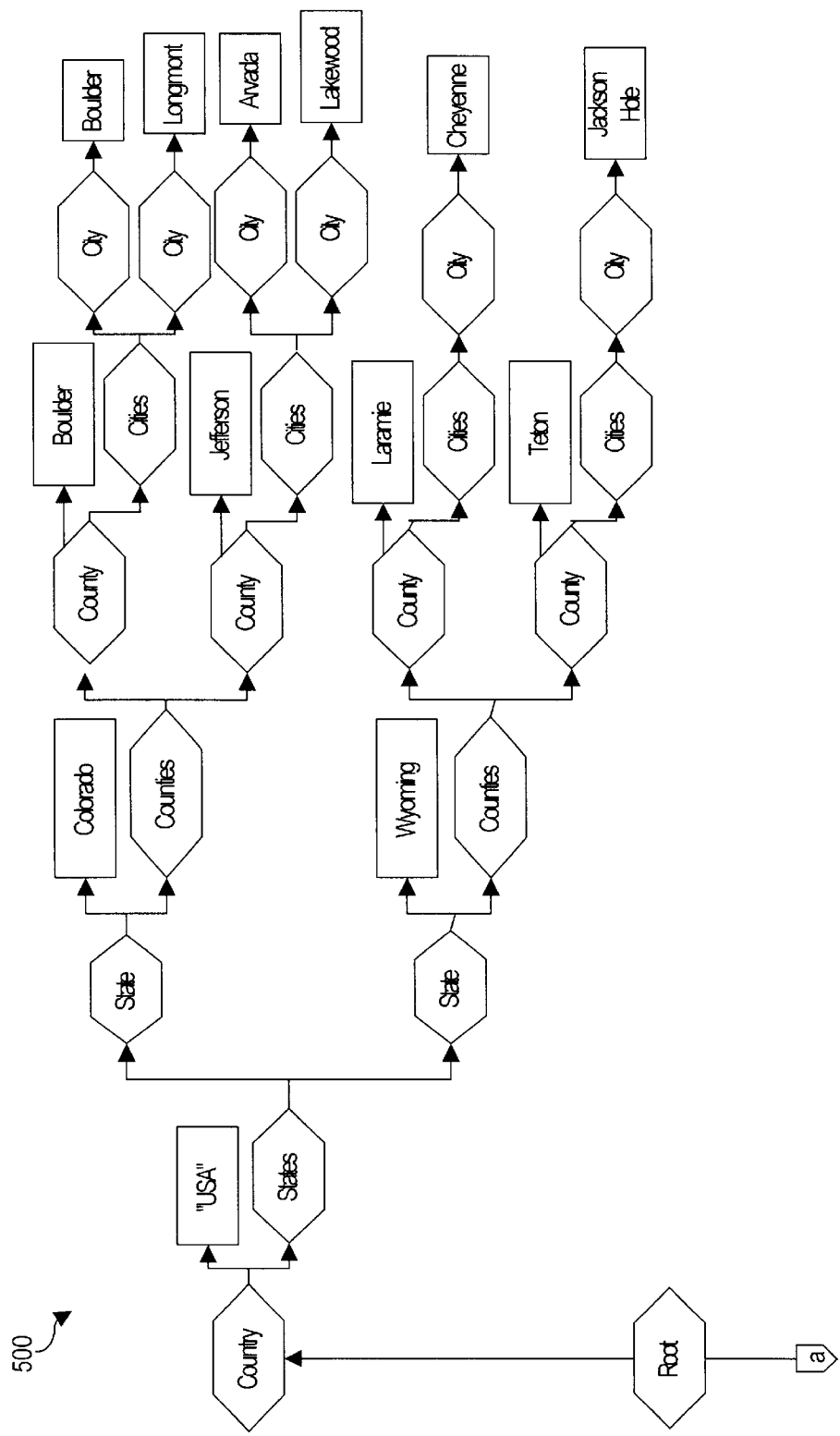
FIG. 5 is a diagrammatic illustration of a DynArray structure which stores an implementation of the data set defined in FIG. 1.
Figure 5B:
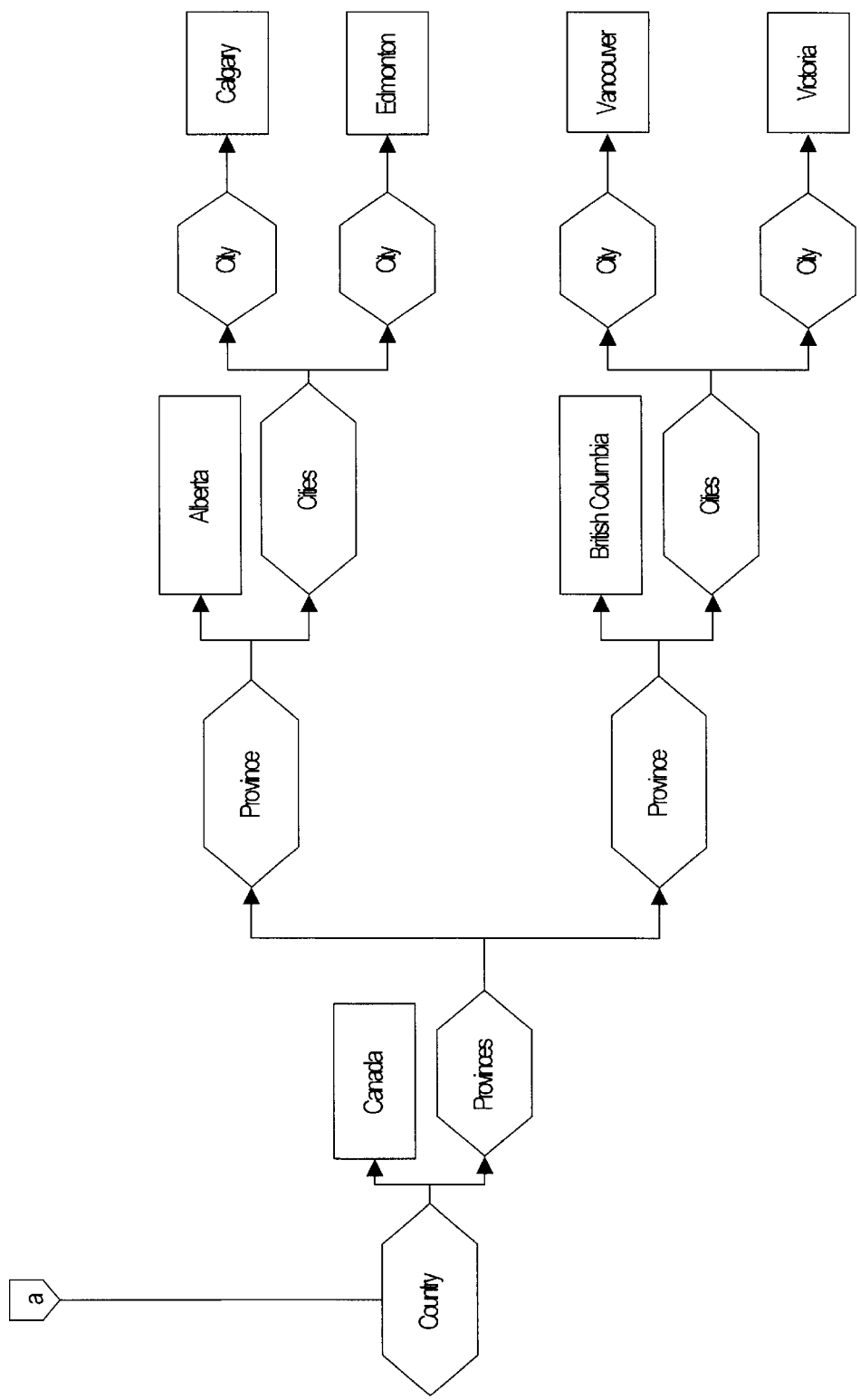

FIG. 5 illustrates a Dynarray 500 which stores an implementation of the example USA and Canada country records of FIG. 1. It will be appreciated from the examples shown in FIGS. 4 and 5 that the invention supports the storage of multi- and variable-dimensional data of variable character types. In other words, each data element may contain any number of dimensions, limited only by the nature of the data represented and the hardware and operating system limitations of the computer system. For example, the country record representing the United States comprises four dimensions including the country code, state code, county code and city code, whereas the country record representing Canada comprises only three dimensions including the country code, province code, and city code. Thus, each data element in the country code list can contain a different number of dimensions. In addition, each county record and each city record can contain any number of data elements. For example, since Colorado and Wyoming have a different number of counties, and each county generally varies in the number of cities located within it, the size of each branch node can vary. Finally, the number and type of characters stored in each leaf can vary from leaf to leaf, allowing multiple data types to be stored simultaneously in the database.

The non-persistent storage model includes a number of methods (functions) for manipulating a DynArray consisting of one to many nodes. These methods perform access and manipulation of a DynArray and generally fall into one of the following categories as illustrated in Table 2.

Note: Several common notations are used in Table 2, as follows:

The letter x is used to denote any valid nonzero unsigned long integer.

The letter $y^l$ references to a specific position y in level l of a DynArray.

The letters $n^a$ and $n^b$ refer to two distinct DynArray nodes either inclusive or exclusive of each other, depending on their usage, where n is any valid number between 1 and $2^{32}$.

TABLE 2

| Method Type | Description |
| --- | --- |
| Construction | These methods instantiate a new DynArray. The current embodiment of the invention supports five different construction methods, as follows:<br>1) A default constructor method is used to create a blank leaf node. This leaf can then be changed, expanded, accessed, or destroyed using the other methods.<br>2) A string leaf constructor method is used to create a leaf node and assign it a specific data value.<br>3) A copy constructor method is used to create a new DynArray which is an exact duplicate of an existing DynArray.<br>4) A branch constructor method is used to create a new branch or leaf. (This is effectively the same as the default constructor with the exception of being able to define whether the new node is a branch or leaf.)<br>5) A series constructor method is used to create a branch node with a certain number of subordinate leaf nodes. |
| Destruction | There is only one destructor method for a DynArray. This method effectively deletes the entire DynArray and returns the used memory to the heap of memory available to the calling program. |
| Insertion | These methods insert a node into an existing DynArray. If the DynArray structure is insufficient to accommodate the new node, the structure is automatically expanded as required. The current embodiment of the invention supports three different insertion methods, as follows:<br>1) Insert $n^a$ into $n^b$ at $y^1$ (where $y^1$ is an unsigned long integer): This method is common to all insertion methods; it inserts node $n^a$ into node $n^b$ at position $y^1$ (counting from the leftmost position).<br>2) Insert $n^a$ into $n^b$ at $y^1$ (where $y^1$ is a signed long integer): This method inserts node $n^a$ into node $n^b$ at position $y^1$. If $y^1$ is negative, the insertion position is determined by counting from the rightmost position.<br>3) Insert x into n at position(s) $y^1, y^2, \ldots y^n$: This method inserts node x into node n at level position $y^1, y^2, \ldots y^n$. |
| Deletion | These methods remove a node or nodes from an existing DynArray. If the node or nodes to be removed do not exist in the DynArray, the DynArray is left unchanged. The current embodiment of the invention supports six different deletion methods, as follows:<br>1) Delete x nodes from $n^a$ at position $y^1$ (where $y^1$ is an unsigned long integer): This method removes x nodes from a DynArray $n^a$ at a position $y^1$. All deletion methods utilize this method for removing nodes from the DynArray. |

TABLE 2-continued

| Method Type | Description |
|---|---|
| | 2) Delete x nodes from $n^a$ at position $y^1$ (where $y^1$ is a signed long integer): This method removes x nodes from DynArray $n^a$ at position $y^1$. If $y^1$ is positive, the deletion position is determined by counting from the leftmost position. If $y^1$ is negative, the deletion position is determined by counting from the rightmost position. |
| | 3) Delete 1 node from $n^a$ at position $y^1$ (where $y^1$ is an unsigned long integer): This method removes one node from DynArray $n^a$ at position $y^1$. |
| | 4) Delete 1 node from $n^a$ at position $y^1$ (where $y^1$ is a signed long integer): This method removes one mode from DynArray $n^a$ at position $y^1$. If $y^1$ is negative, the position is determined by counting from the rightmost position. |
| | 5) Delete x nodes from $n^a$ at position(s) $y^1, y^2, \ldots y^n$: This method removes x nodes from DynArray $n^a$ at level position $y^1, y^2, \ldots y^n$. Unlike the other methods, this method will traverse through multiple dimensions to find the node to be removed. |
| | 6) Delete 1 node from $n^a$ at position(s) $y^1, y^2, \ldots y^n$: This method removes 1 node from DynArray $n^a$ at position $y^1, y^2, \ldots y^n$. Like the previous method, this method will traverse through multiple dimensions en route to find the node to be removed. |
| Extraction | These methods extract a copy of a node from an existing DynArray into a separate entity. If the position to be extracted does not exist, a null pointer is returned. The current embodiment of the invention supports three methods, as follows: |
| | 1) Extract $n^a$ from $n^b$ at position $y^1$ (where $y^1$ is an unsigned long integer): This method is common to all extraction methods; it extracts (makes a copy of) a DynArray node $n^a$ from position $y^1$ of DynArray $n^b$. |
| | 2) Extract $n^a$ from $n^b$ at position $y^1$ (where $y^1$ is a signed long integer): This method extracts (makes a copy of) a DynArray node $n^a$ from position $y^1$ of DynArray $n^b$. If $y^1$ is negative, the extraction position is determined by counting from the rightmost position. |
| | 3) Extract $n^a$ from $n^b$ at position(s) $y^1, y^2, \ldots y^n$: This method extracts (makes a copy of) DynArray node $n^a$ from level position(s) $y^1, y^2, \ldots y^n$ of DynArray $n^b$. This method will traverse through multiple dimensions to find the node to be extracted. |
| Replacement | These methods allow one specific node in a DynArray to be replaced, discarding the original node and replacing it with a new one. The current embodiment of the invention supports three methods as follows: |
| | 1) Replace position $y^1$ in $n^a$ with $n^b$ (where $y^1$ is an unsigned long integer): This method is common to all replacement methods; it replaces position $y^1$ in DynArray $n^a$ with DynArray $n^b$. Node $n^a$ is then discarded. |
| | 2) Replace position $y^1$ in $n^a$ with $n^b$ (where $y^1$ is a signed long integer): This method replaces position $y^1$ in DynArray $n^a$ with DynArray $n^b$. Node $n^a$ is then discarded. If $y^1$ is negative, the replacement position is determined by counting from the rightmost position. |
| | 3) Replace position $y^1, y^2, \ldots y^n$ in $n^a$ with $n^b$: This method replaces the node $n^a$ at position $y^1, y^2, \ldots y^n$ with node $n^b$. |
| Serialization/ Deserialization | These methods allow a record to be serialized (reformatted) to be written to persistent storage, and deserialized (restored to its original structure) upon access from persistent storage. When a DynArray is in non-persistent storage, collections of pointers manage the connection between the branch nodes and leaf nodes. These pointers change for each instance of a DynArray, and therefore cannot be stored with the leaf data. Therefore, the serialization format encapsulates all data and references required to reconstruct (deserialize) the structure once it is re-read from persistent storage. The current embodiment of the invention supports one serialization and one deserialization method. Once a DynArray has been serialized, it can be written to persistent storage. Once read from persistent storage, the information as read can be deserialized back into the original DynArray structure. While the elements of the structure may not be located at the same memory addresses at the time the structure was serialized, the structure and all its data will be intact. |

Figure 6:
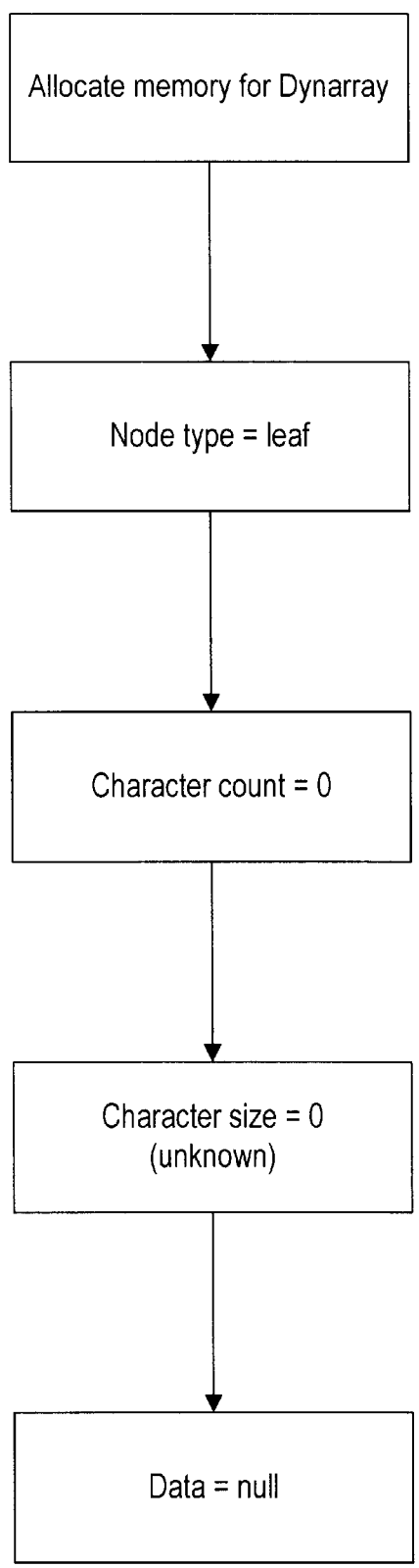
FIG. 6 is a flowchart illustrating one embodiment of the default constructor method used to create a blank leaf node in the non-persistent storage model.
Figure 7:
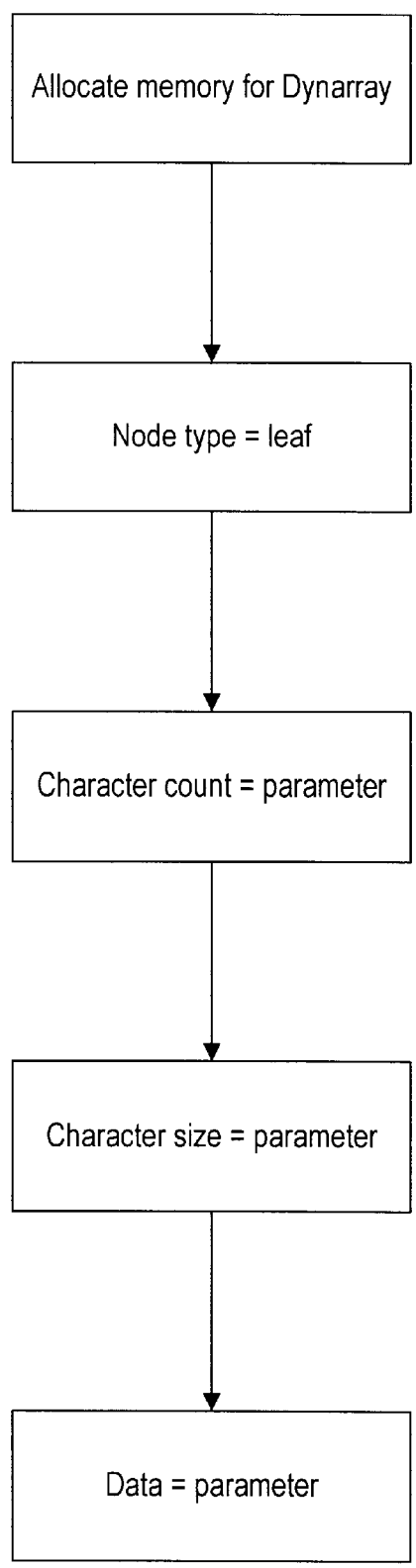
FIG. 7 is a flowchart illustrating one embodiment of a string leaf constructor method used in the non-persistent storage model.
Figure 8:
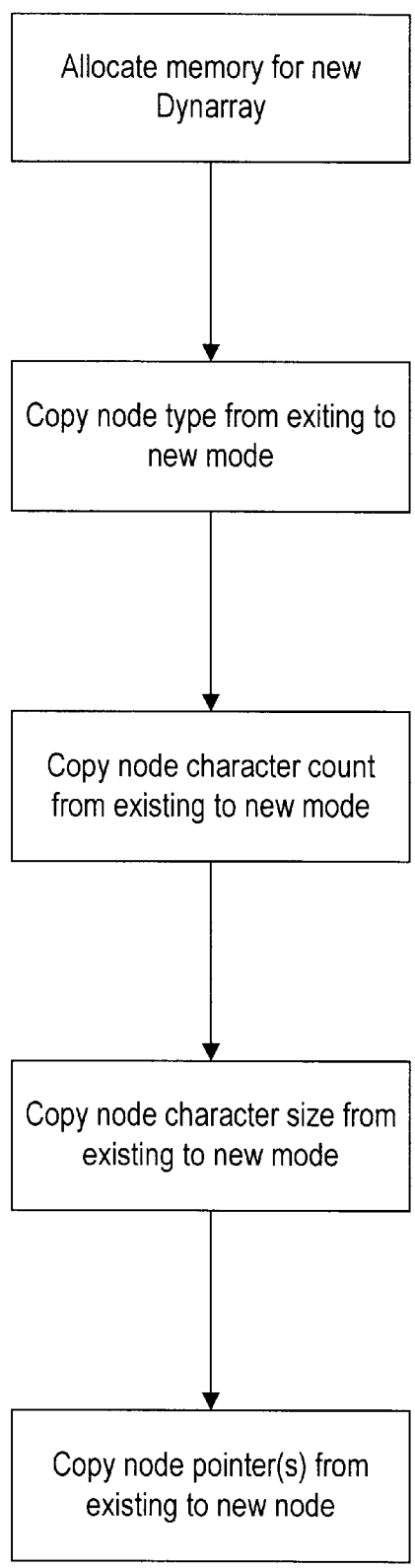
FIG. 8 is a flowchart illustrating one embodiment of a copy constructor method used in the non-persistent storage model.
Figure 9:
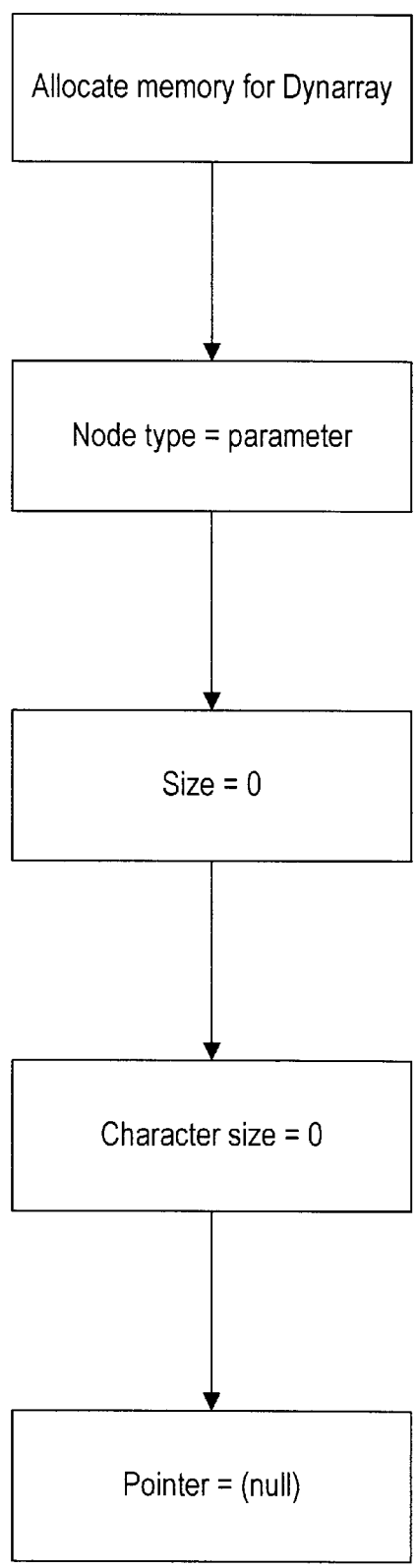
FIG. 9 is flowchart illustrating one embodiment of a branch constructor method used in the non-persistent storage model.
Figure 10:
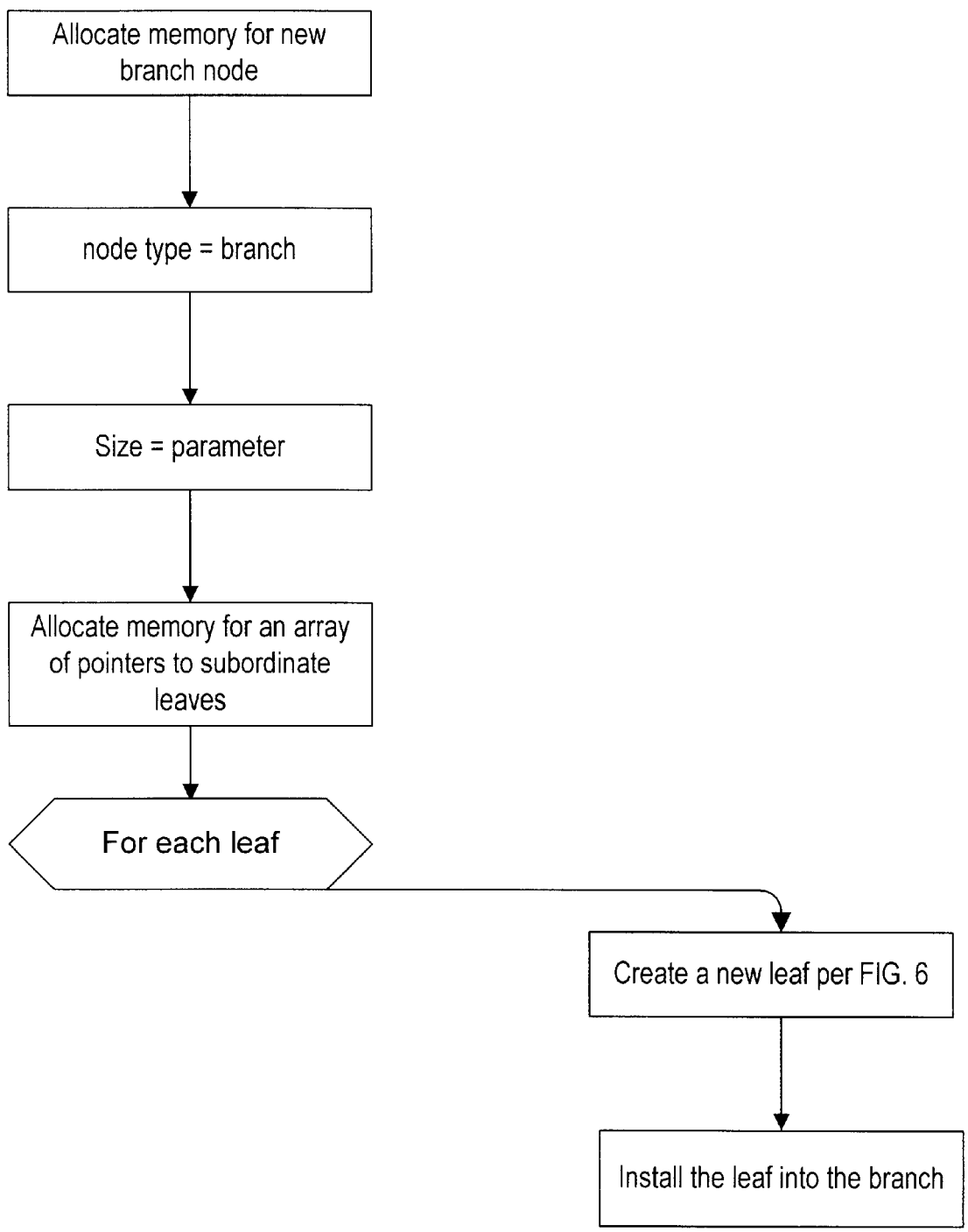
FIG. 10 is flowchart illustrating one embodiment of a series constructor method used in the non-persistent storage model.

FIGS. 6–10 contain operational flowcharts of the various constructor methods defined in Table 2. FIG. 6 is a flowchart illustrating one embodiment of the default constructor method used to create a blank leaf node. FIG. 7 is a flowchart illustrating one embodiment of a string leaf constructor method used for creating a leaf node and assigning it a specific data value. FIG. 8 illustrates one embodiment of a copy constructor method used for duplicating an existing DynArray. FIG. 9 illustrates one embodiment of a branch constructor method used for creating either a new branch or new leaf, where the input parameter defines whether the new node is a branch or leaf. FIG. 10 illustrates one embodiment of a series constructor method used for creating a branch node having a number, defined by the input parameter, of subordinate leaf nodes.

Figure 11:
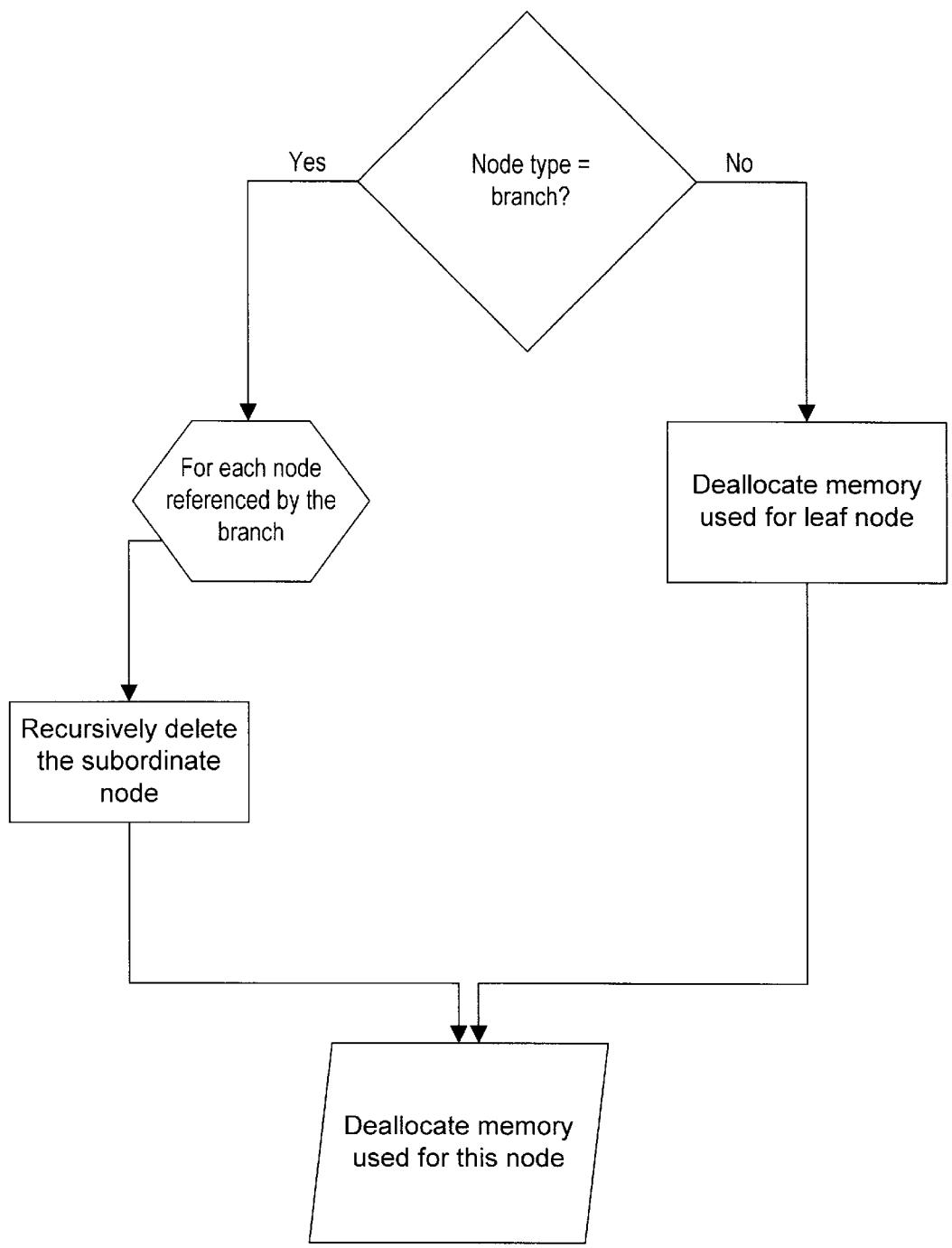
FIG. 11 is a flowchart illustrating one embodiment of the destructor method in the non-persistent storage model.

FIG. 11 contains an operational flowchart of one embodiment of the destructor method defined in Table 2. As illustrated, if the node to be deleted is a branch type, the method is called recursively to delete each node below it until all leaves and branches below it are deleted as well.

Figure 12:
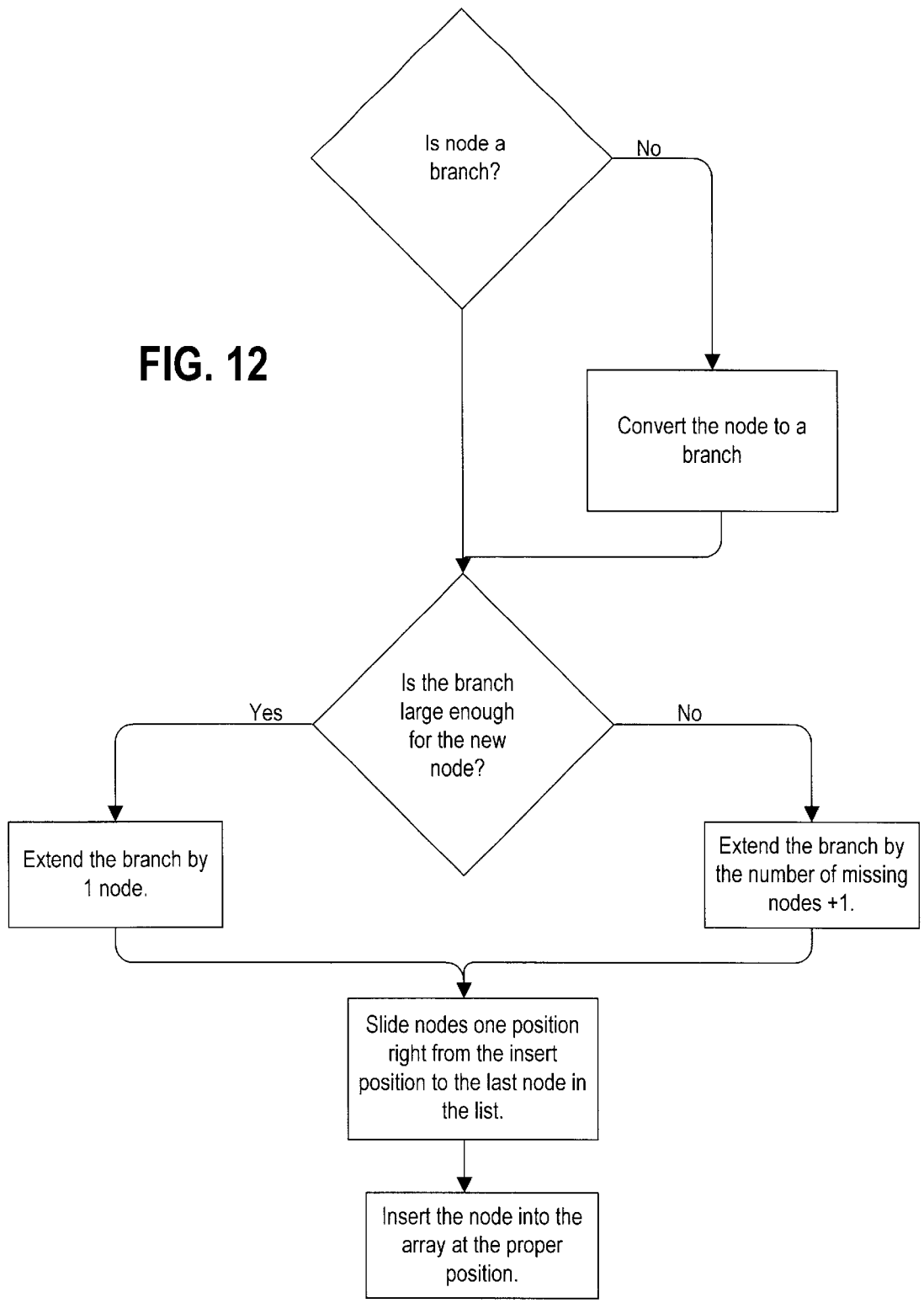
FIG. 12 is a flowchart illustrating one embodiment of the generic insertion method in the non-persistent storage model.
Figure 13:
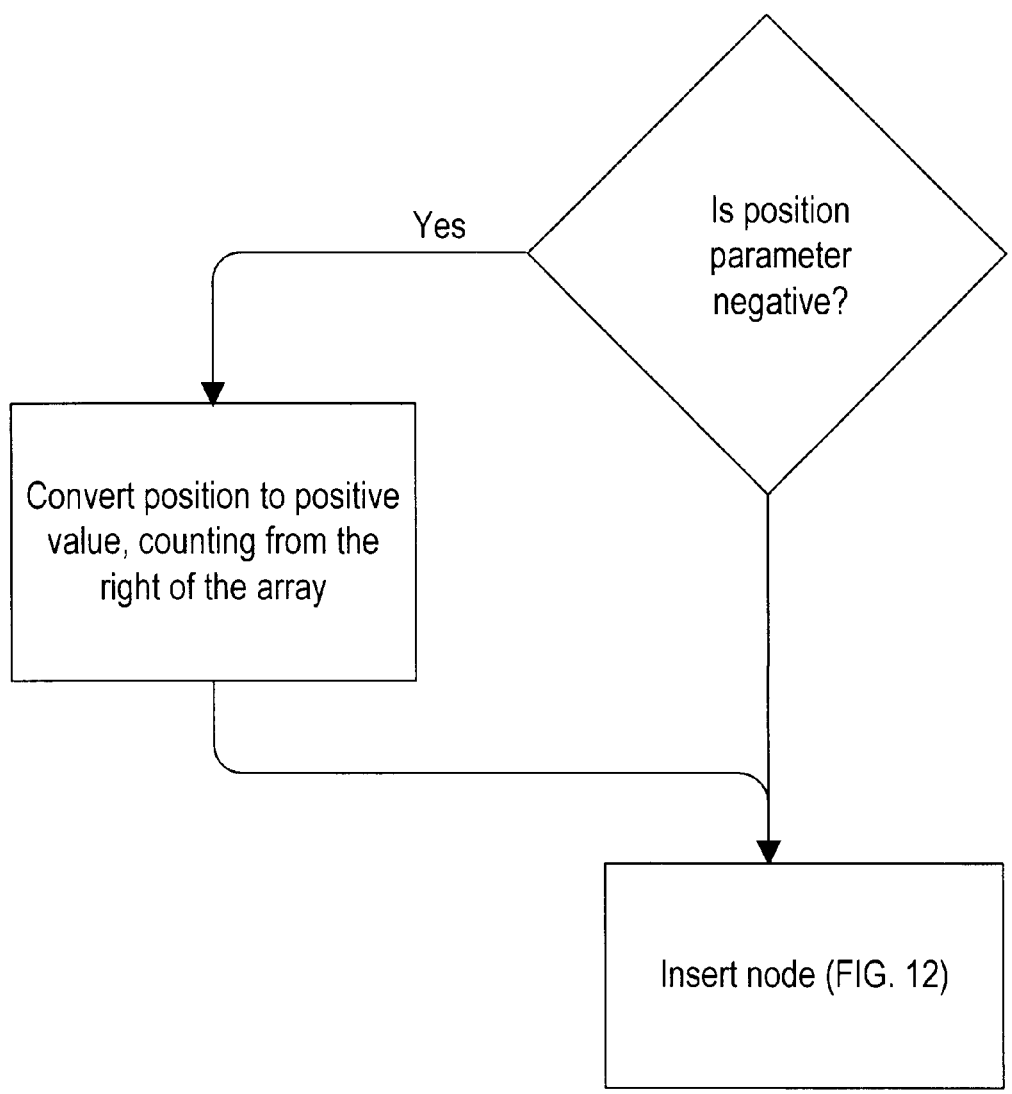
FIG. 13 is flowchart illustrating one embodiment of an alternative insertion method in the non-persistent storage model.
Figure 14:
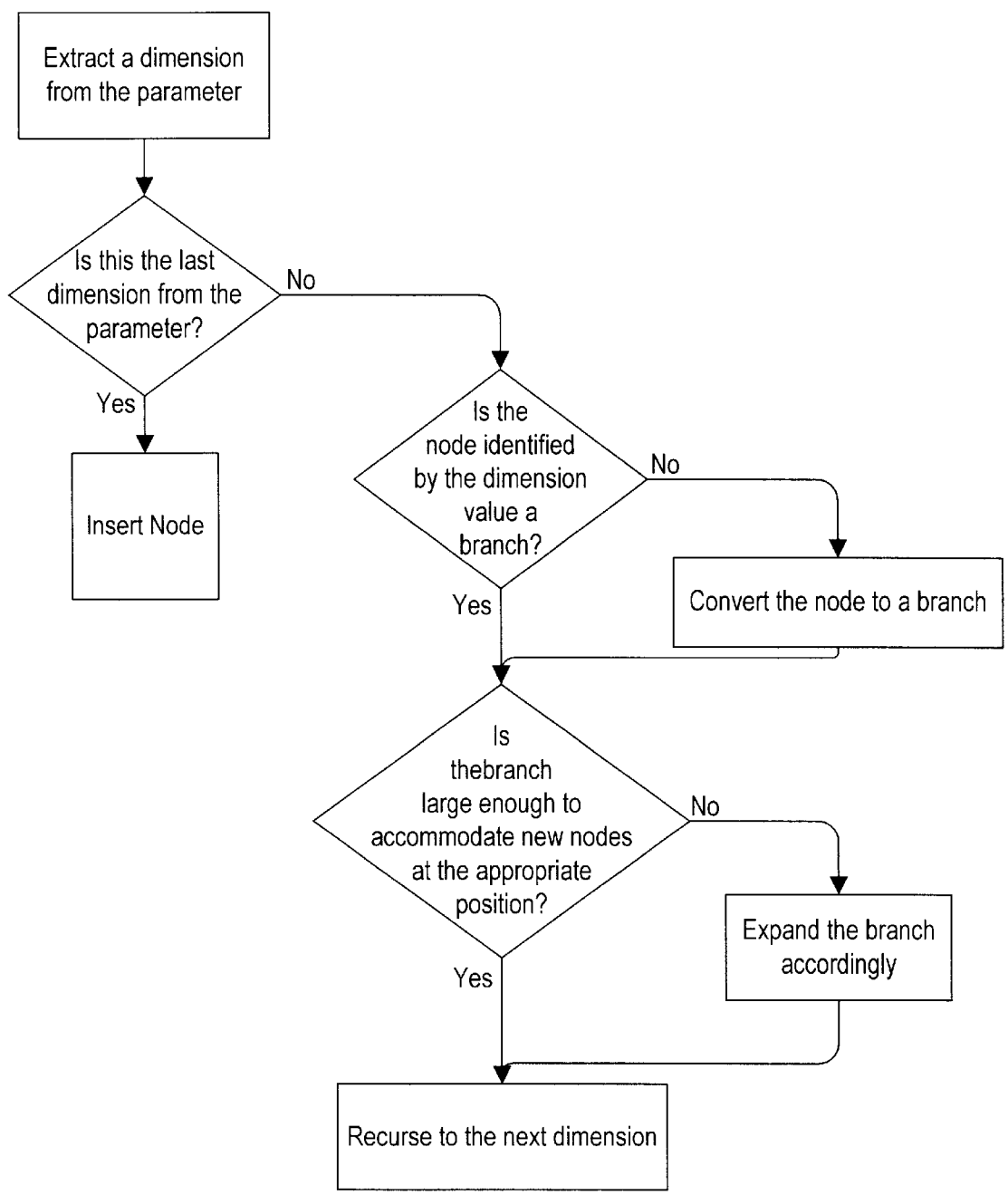
FIG. 14 is a flowchart illustrating one embodiment of a method for inserting a node into a multiple-dimensional node in the non-persistent storage model.

FIGS. 12–14 contain operational flowcharts of the various insertion methods defined in Table 2. FIG. 12 illustrates one embodiment of the base insertion method, which inserts a DynArray node $n^a$ into another DynArray node $n^b$ at a position $y^1$, counting from the leftmost position, where $y^1$ is an unsigned long integer. As illustrated, this method converts node $n^a$ into a branch and/or extends the size of the branch to allow room for the new node $n^b$, if needed, and then shifts the nodes one position right from the insert position to the last node in the list, and then inserts the new node $n^a$ into the branch array at the proper position. FIG. 13 illustrates one embodiment of an alternative insertion method, which inserts a DynArray node $n^a$ into another DynArray node $n^b$ at a position $y^1$, counting from the rightmost position, where $n^a$ is a signed long integer. This method converts the signed long integer into a positive value counting from the right instead of the left of the array if the position $y^1$ is negative, and then calls the insert routine of FIG. 12. FIG. 14 illustrates one embodiment of a method for inserting a node into a multiple-dimension node at the positions $y^1, y^2, \ldots, y^n$ in each respective dimension 1, 2, ..., n. This method traverses the dimensions 1, 2, ..., n, converting each node to a branch and/or expanding the branch node at the positions defined by the parameters $y^1, y^2, \ldots, y^n$ as needed until it reaches the final dimension in the parameter list. It then calls the insert node method of FIG. 12 to insert the node $n^b$ at the proper position.

Figure 15:
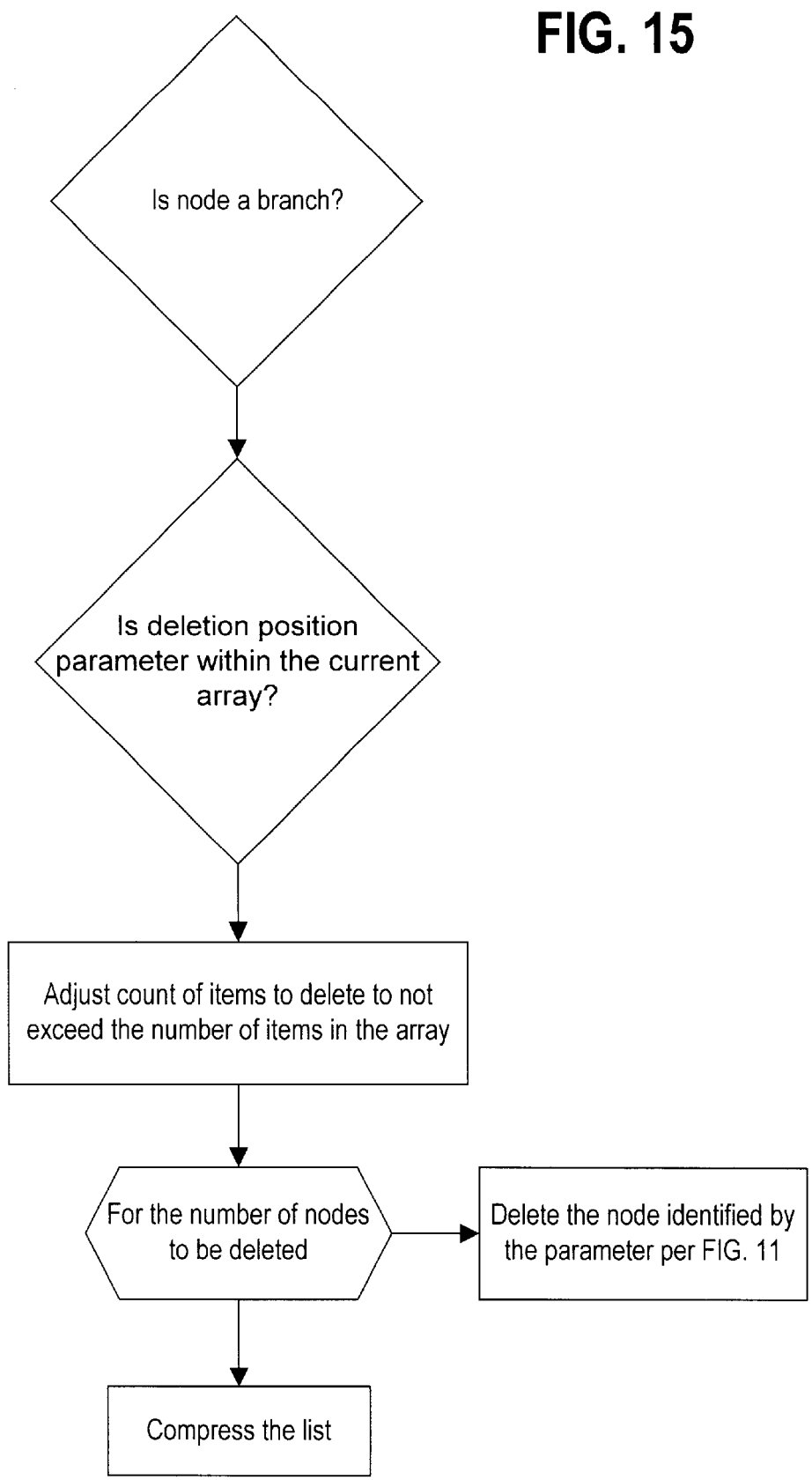
FIG. 15 is a flowchart illustrating one embodiment of the generic delete method in the non-persistent storage model.
Figure 16:
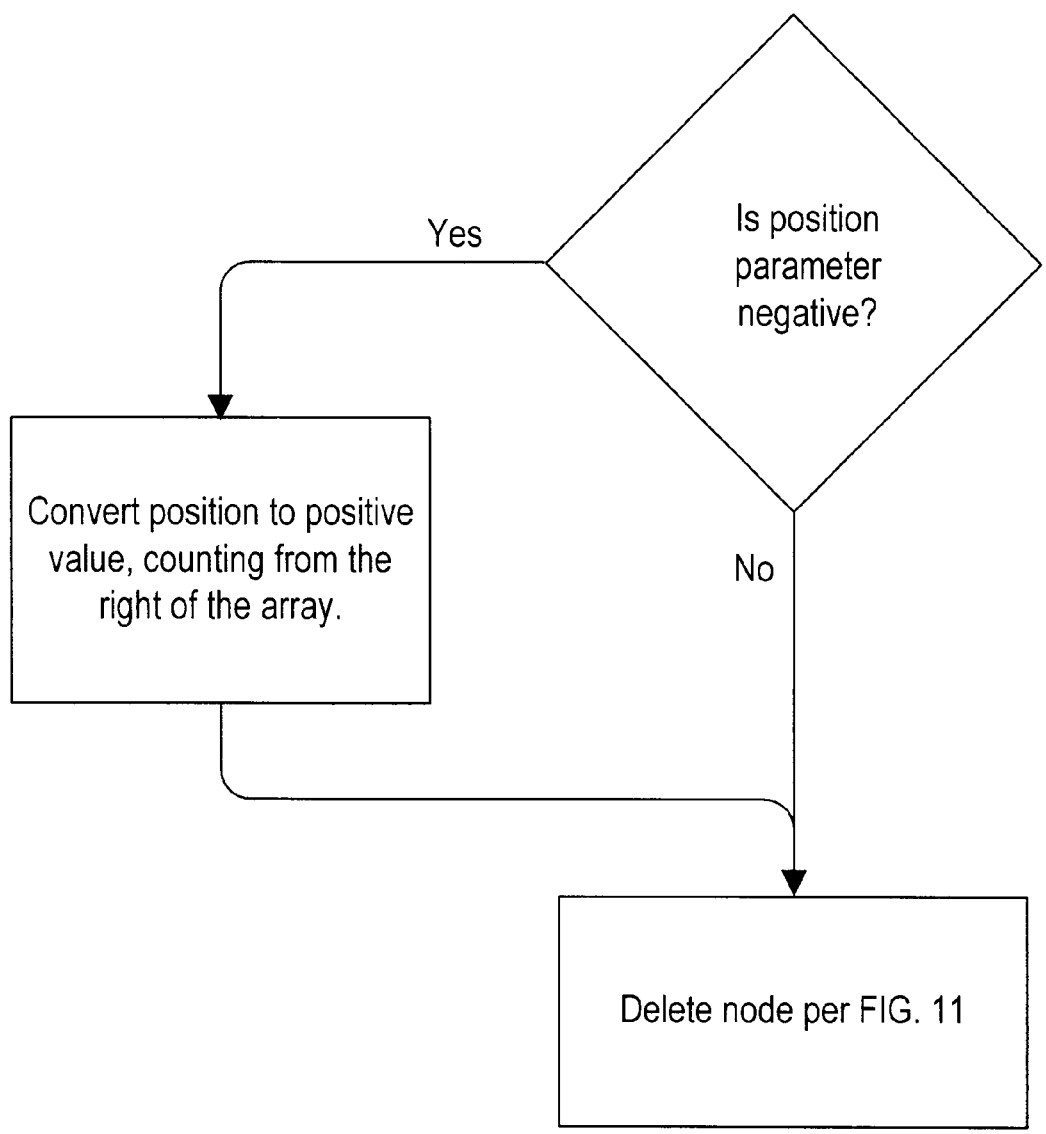
FIG. 16 is a flowchart illustrating a delete method which deletes multiple nodes from a DynArray in the non-persistent storage model.
Figure 17:
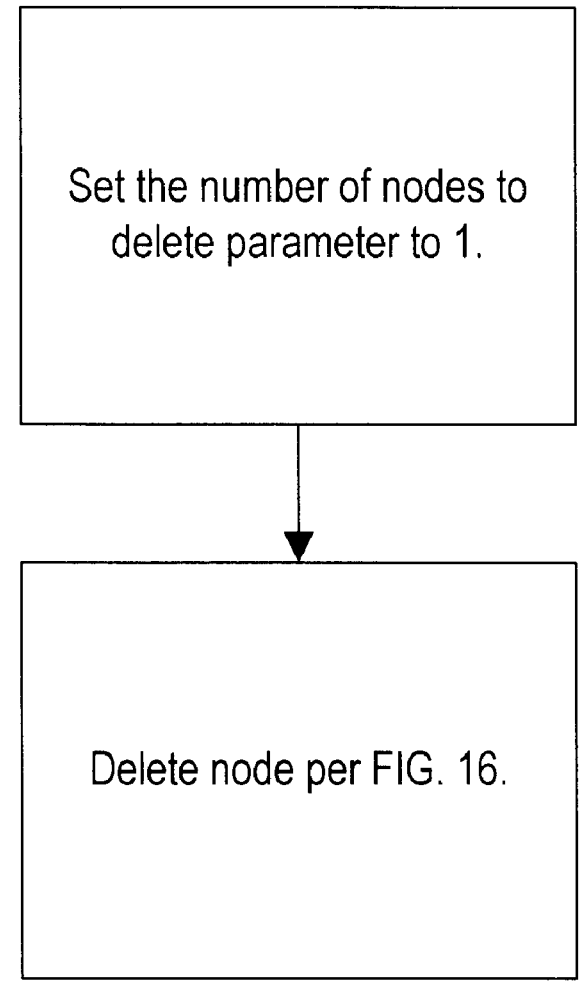
FIG. 17 is a flowchart illustrating one embodiment of a method for deleting a single node from a DynArray in the non-persistent storage model.
Figure 18:
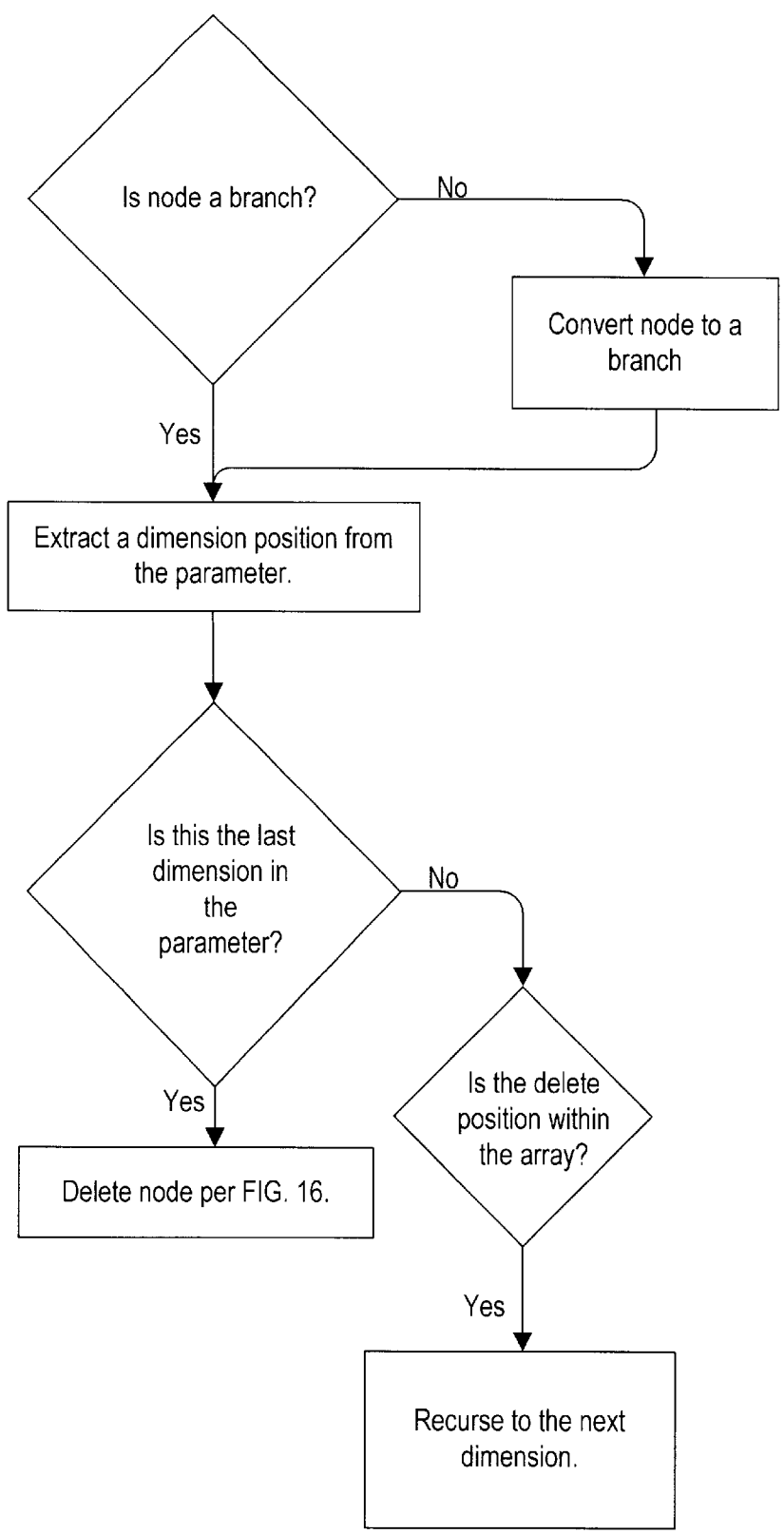
FIG. 18 is a flowchart illustrating one embodiment of a method for deleting one or more nodes from a multiple-dimension node in the non-persistent storage model.
Figure 19:
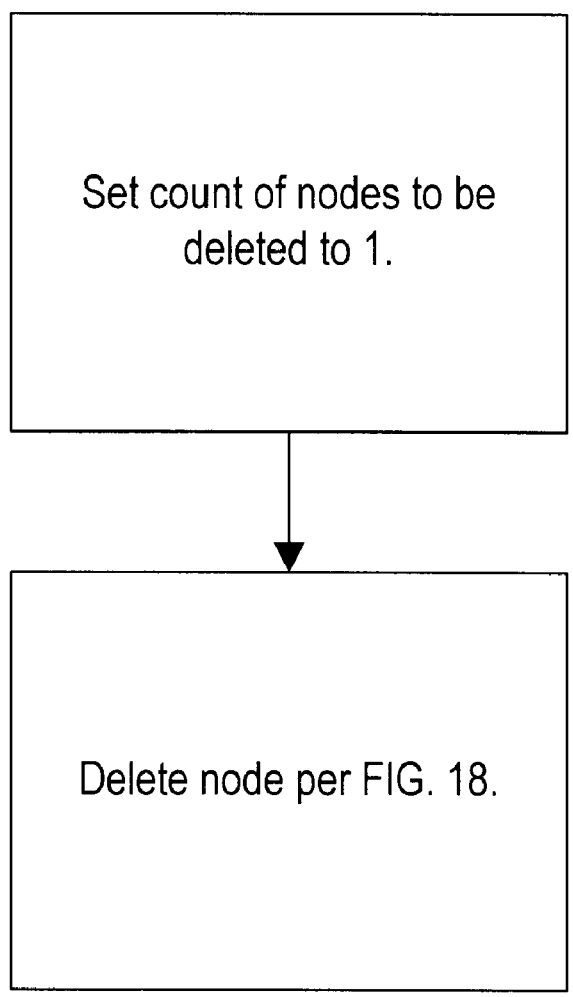
FIG. 19 is a flowchart illustrating one embodiment of a method for deleting a single node from a multiple-dimension node in the non-persistent storage model.

FIGS. 15–19 contain operational flowcharts of the various node deletion methods defined in Table 2. FIG. 15 is one embodiment of the generic delete method which removes x nodes from a DynArray $n^a$ at position $y^1$. In this embodiment, several checks are performed before deleting any part of the node. First, if the node is not a branch, then the position of the node to be deleted is compared with the size of the current branch node to ensure that the position does not exceed the branch array. If the position of the node to be deleted does exist in the branch array, the count of items to delete is adjusted if needed to a limit of the number of branch elements to the right of the position of the node to be deleted including the node to be deleted itself. Each node included in the count of items to delete is then deleted according to the destructor method illustrated in FIG. 11, and the final branch node is then compressed to include only the undeleted nodes in the branch array. FIG. 16 illustrates a delete method which deletes x nodes from a DynArray $n^a$ at position $y^1$, where $y^1$ is a signed long integer and the deletion position is determined by counting from the leftmost position in the branch array if $y^1$ is positive, and the deletion position is determined by counting from the rightmost position in the branch array if $y^1$ is negative. FIG. 17 illustrates one embodiment of a method for deleting a single node from a DynArray $n^a$ at position $y^1$. FIG. 18 illustrates one embodiment of a method for deleting x nodes from a multiple-dimension node at the positions $y^1, y^2, \ldots, y^n$ in each respective dimension 1, 2, . . . , n. This method traverses the dimensions 1, 2, . . . , n at respective positions defined by the parameters $y^1, y^2, \ldots, y^n$ until it reaches the final dimension n in the parameter list. It then calls the delete node method of FIG. 16 to delete the node $n^b$ at position $y^n$ in dimension n. FIG. 19 illustrates one embodiment of a method for deleting a single node from a multiple-dimension node at the positions $y^1, y^2, \ldots, y^n$ in each respective dimension 1, 2, . . . , n.

Figure 20:
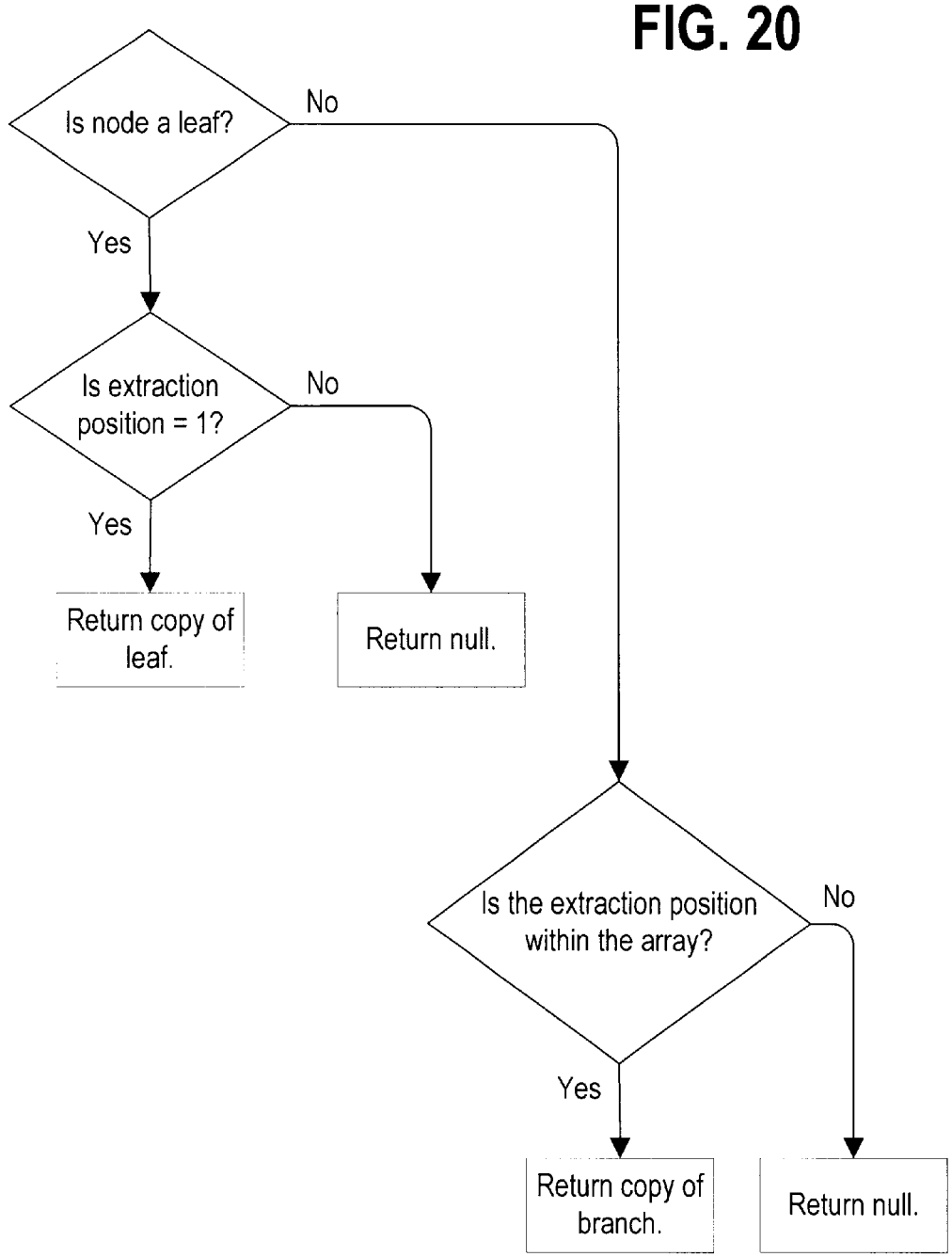
FIG. 20 is a flowchart illustrating one embodiment for extracting a node $n^a$ from another node $n^b$ at a position $y^1$, counting from the leftmost position in the non-persistent storage model.
Figure 21:
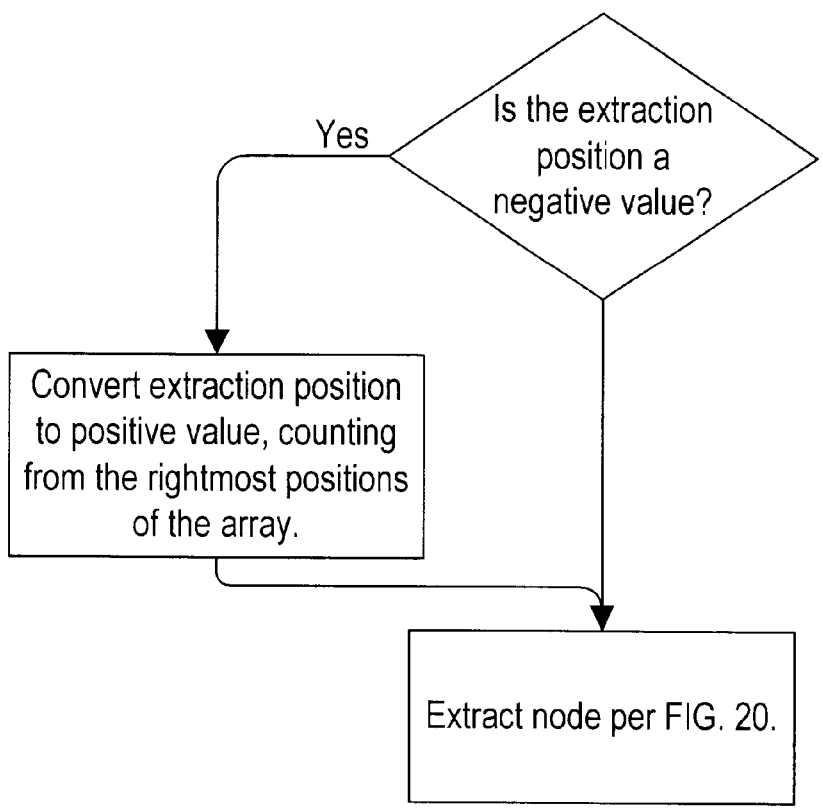
FIG. 21 is a flowchart illustrating one embodiment of an alternative extraction method for extracting a node $n^a$ from another node $n^b$ at a position counted from either the right or the left of the original node in the non-persistent storage model.
Figure 22:
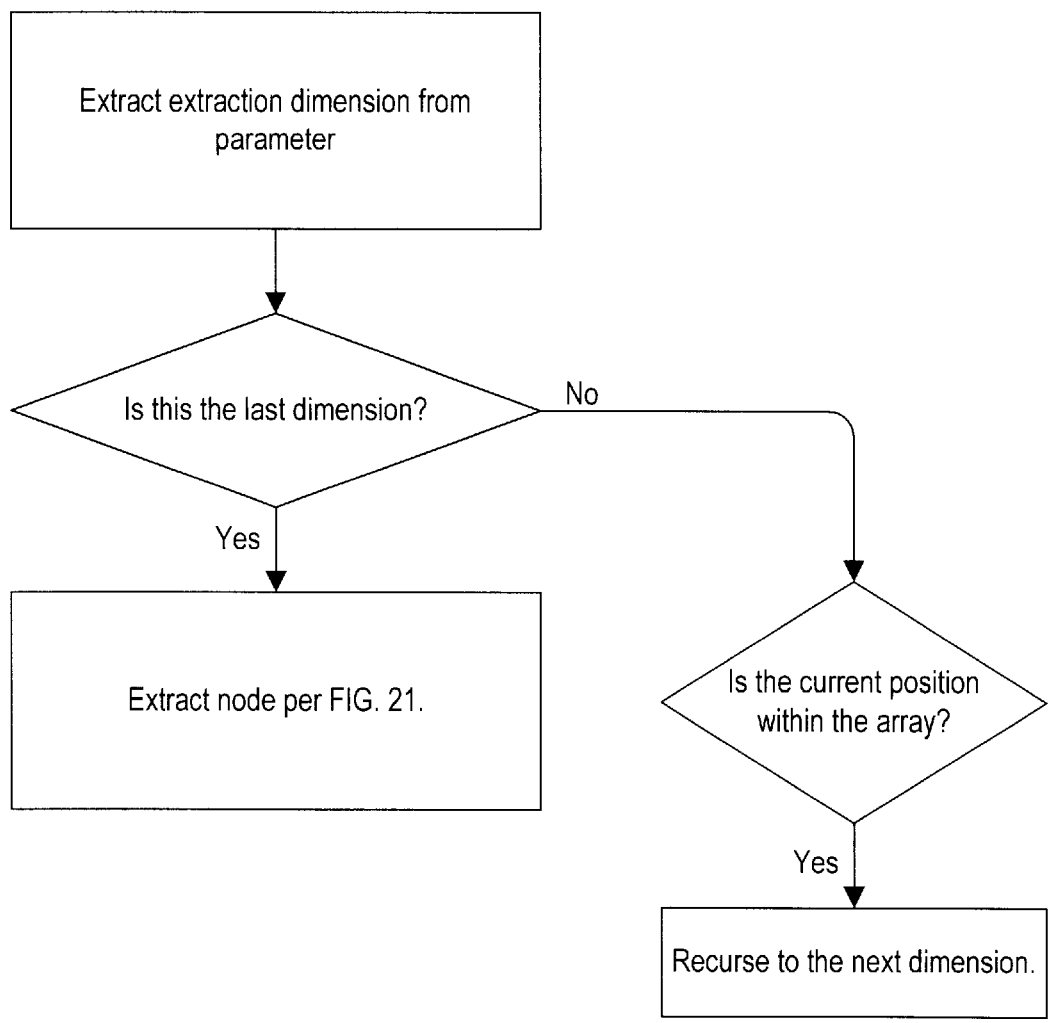
FIG. 22 is a flowchart illustrating one embodiment of a method for extracting a node $n^b$ from a multiple-dimension node in the non-persistent storage model.

FIGS. 20–22 contain operational flowcharts of the various node extraction methods defined in Table 2. FIG. 20 illustrates one embodiment for extracting a node $n^a$ from another node $n^b$ at a position $y^1$, counting from the leftmost position, where $y^1$ is an unsigned long integer. As illustrated, if node $n^b$ is a leaf, the method returns a copy of the leaf if the extraction position is 1; otherwise it returns a null pointer. If node $n^b$ is a branch, the method returns a copy of the branch if the extraction position is within the branch array; otherwise it returns a null pointer. FIG. 21 illustrates one embodiment of an alternative extraction method, which extracts a DynArray node $n^a$ from another DynArray node $n^b$ at a position indicated by signed long integer $y^1$, counting from the leftmost position if $y^1$ is positive, and counting from the rightmost position if $y^1$ is negative. FIG. 22 illustrates one embodiment of a method for extracting a node $n^b$ from a multiple-dimension node at the positions $y^1, y^2, \ldots, y^n$ in each respective dimension 1, 2, . . . , n. This method traverses the dimensions 1, 2, . . . , n, at the positions defined by the parameters $y^1, y^2, \ldots, y^n$ until it reaches the final dimension n in the parameter list. It then calls the extract node method of FIG. 20 to extract the node $n^b$ at the proper position.

Figure 23:
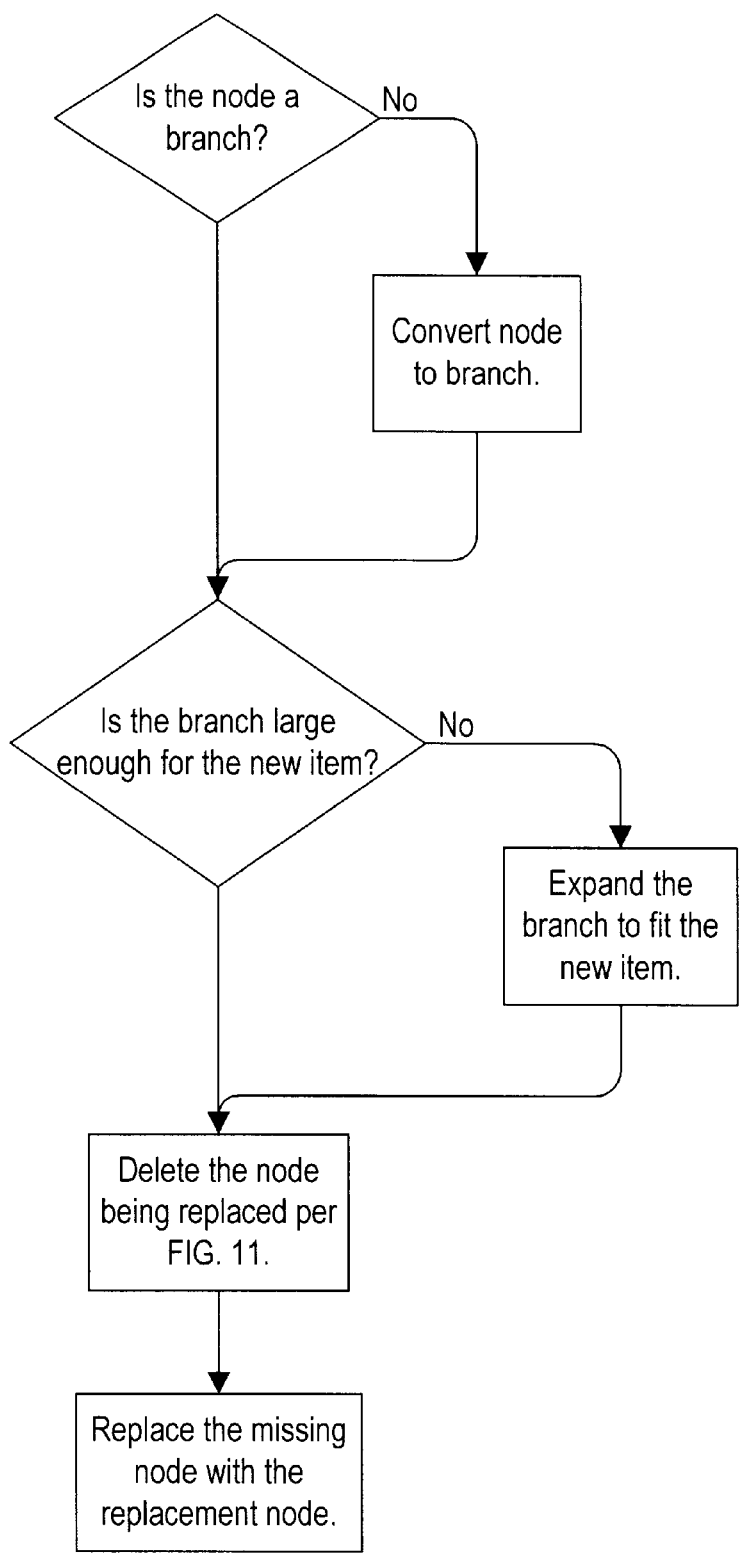
FIG. 23 is a flowchart illustrating one embodiment of the generic replacement method for replacing node $n^a$ located at a position $y^1$ counting from the leftmost position with another DynArray node $n^b$ in the non-persistent storage model.
Figure 24:
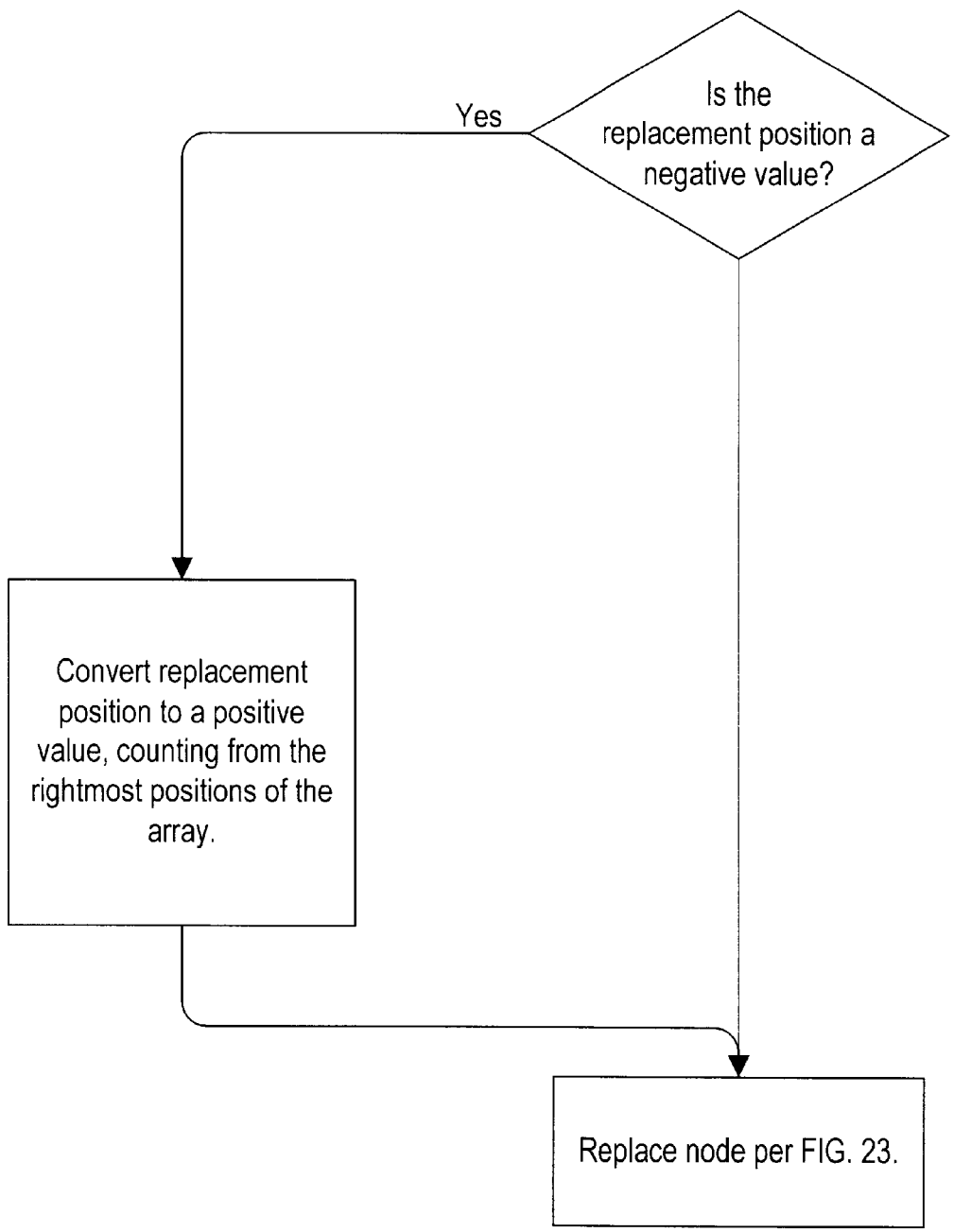
FIG. 24 is a flowchart illustrating one embodiment of an alternative node replacement method, which replaces a node $n^a$ with another node $n^b$ at a position counting from either the leftmost position or the rightmost position of the original node in the non-persistent storage model.
Figure 25:
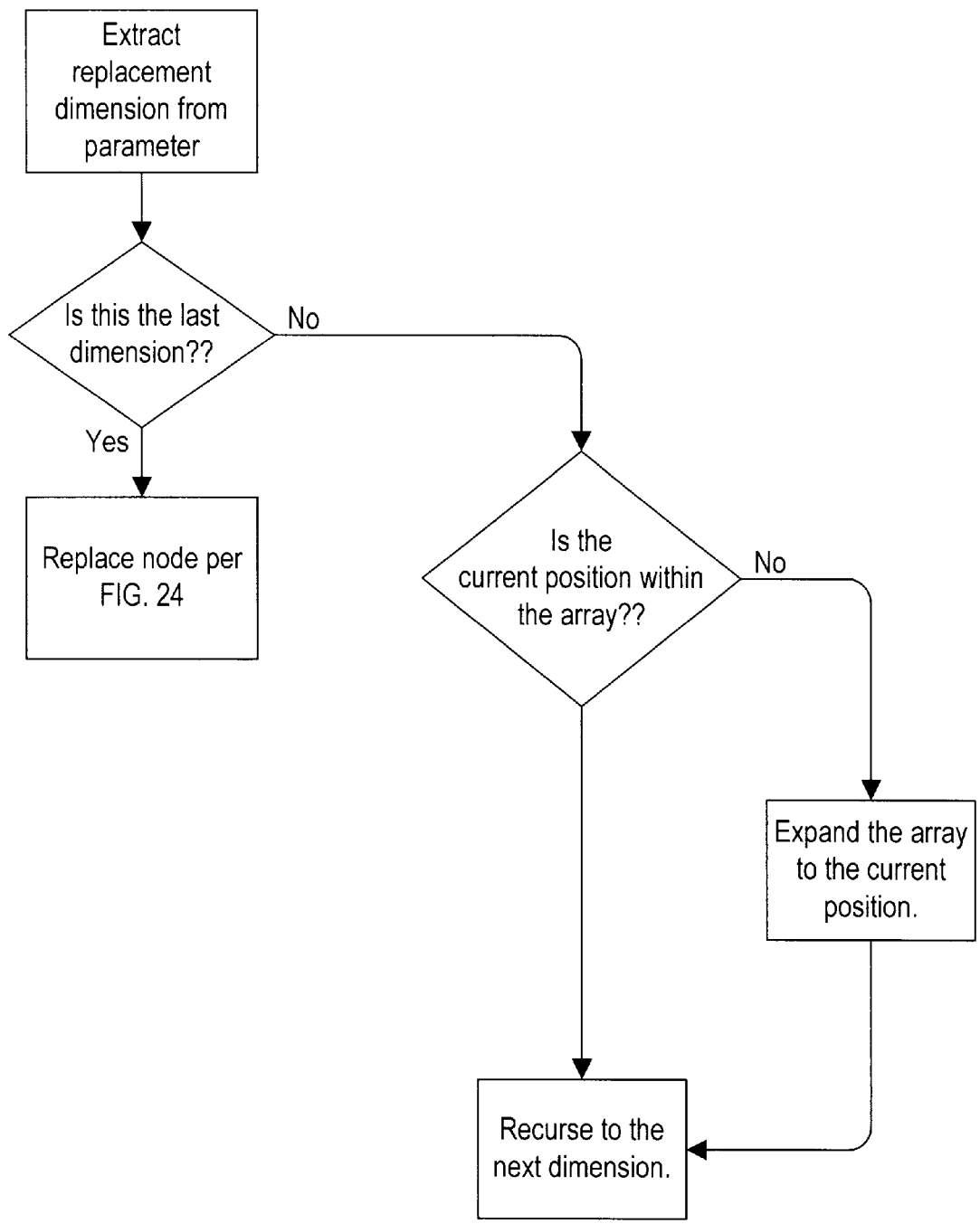
FIG. 25 is a flowchart illustrating one embodiment of a method for replacing a node $n^a$ located in another multi-dimensional node with another node $n^b$ in the non-persistent storage model.

FIGS. 23–25 contain operational flowcharts of the various node replacement methods defined in Table 2. FIG. 23 illustrates one embodiment of the generic replacement method, which replaces a DynArray node $n^a$ located at a position $y^1$ with another DynArray node $n^b$, counting from the leftmost position, where $y^1$ is an unsigned long integer. As illustrated, this method converts node $n^a$ into a branch and/or expands the size of the branch to allow room for the new node $n^b$, then deletes node $n^a$ according to the method of FIG. 11, and then replaces the missing node $n^a$ with the replacement node $n^b$. FIG. 24 illustrates one embodiment of an alternative node replacement method, which replaces a DynArray node $n^a$ with another DynArray node $n^b$ at a position indicated by signed long integer $y^1$, counting from the leftmost position if $y^1$ is positive, and counting from the rightmost position if $y^1$ is negative. FIG. 25 illustrates one embodiment of a method for replacing a node $n^a$ with another node $n^b$, where the node $n^a$ is located in another multi-dimensional node at the positions $y^1, y^2, \ldots, y^n$ in each respective dimension 1, 2, . . . , n. This method traverses the dimensions 1, 2, . . . , n, converting each node to a branch and/or expanding the branch node at the positions defined by the parameters $y^1, y^2, \ldots, y^n$ as needed until it reaches the final dimension n in the parameter list. It then calls the replacement method of FIG. 24 to replace node $n^a$ with node $n^b$ at the proper position.

Figure 26B:
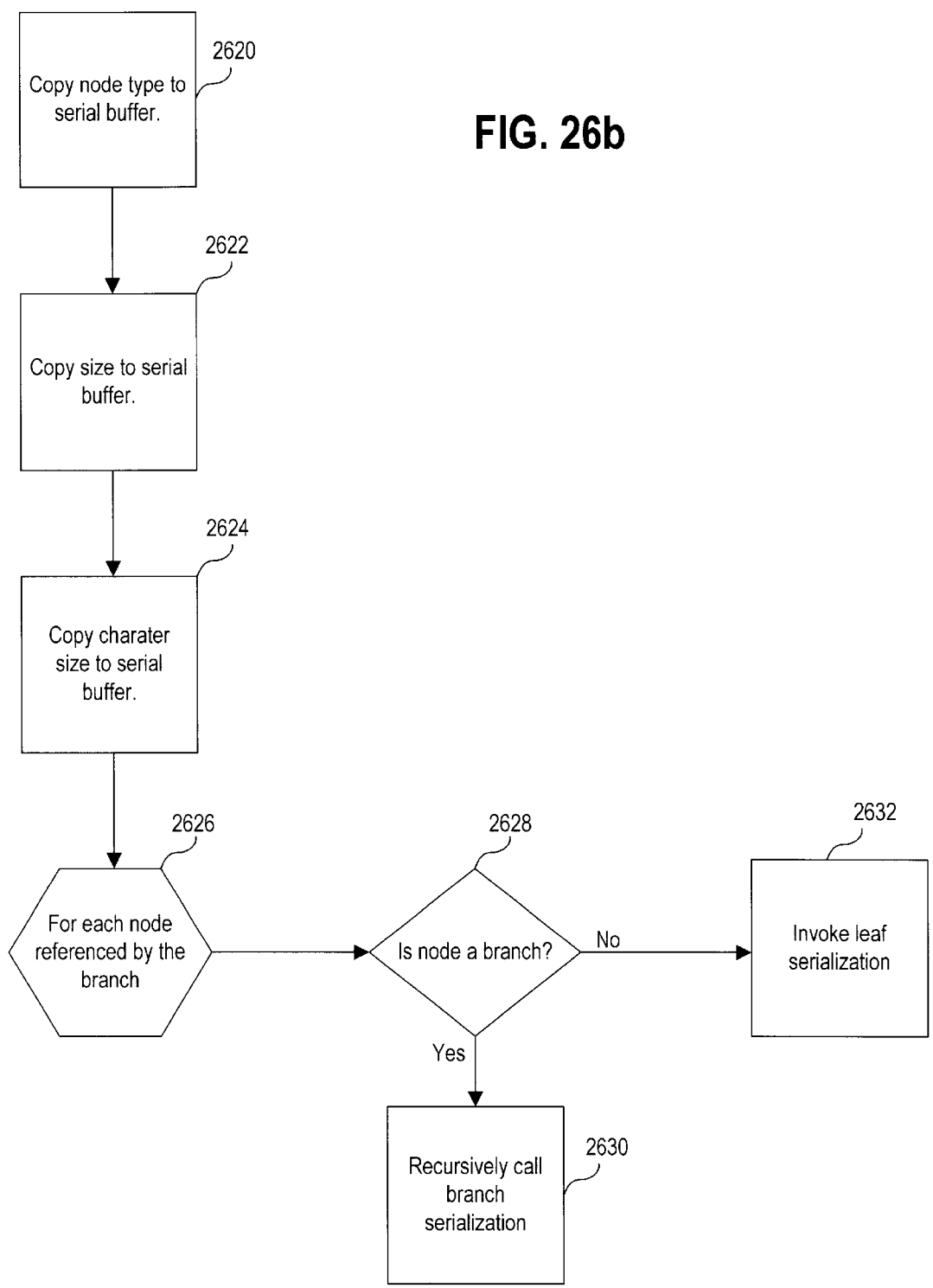
Figure 26C:
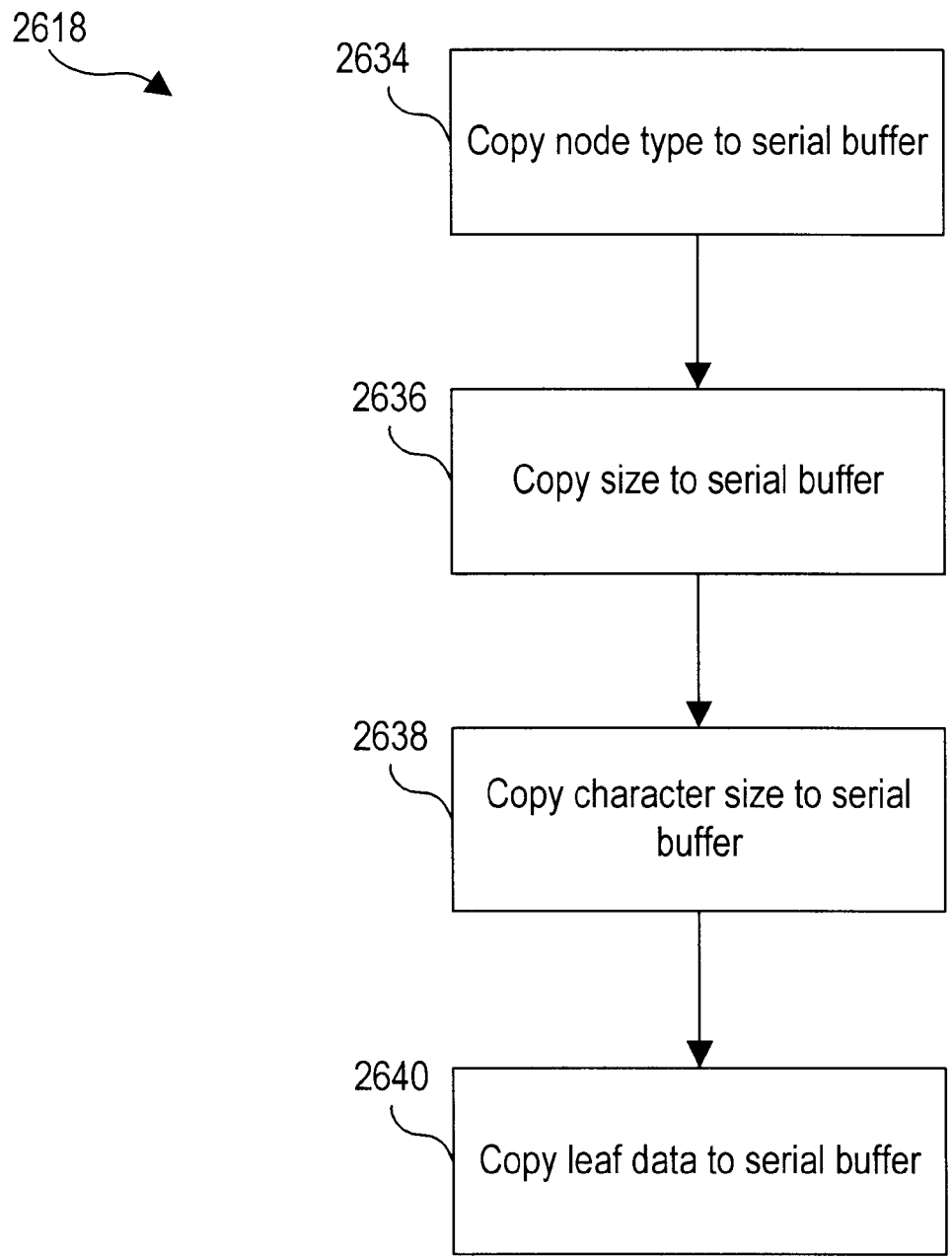

FIGS. 26a–26c contain the operational flowchart of one embodiment for serializing a DynArray into a flat file. As illustrated in FIG. 26a, a new DynArray is created 2602 as per FIG. 6. The size of the serialized information to be stored in the DynArray is calculated 2604. The node type of the newly created DynArray is set 2606 to a leaf type. The character count is set 2608 to the size as calculated in step 2604. The count is set 2610 to 1 for ASCII. Enough memory to store the entire serial buffer containing data in the amount of the calculated size of the serialized information (as calculated in step 2604) is allocated 2612. A determination is made 2614 as to whether the current node is a leaf or a branch. If the current node is a branch, the branch is serialized 2616 according to the method of FIG. 26b. If the current node is a leaf, the leaf is serialized 2618 according to the method of FIG. 26c.

FIG. 26b is a flowchart illustrating one embodiment of the method 2616 for serializing a branch. First, the node type is copied 2620 to the serial buffer created in step 2612. The character count is then copied 2622 to the serial buffer, followed by the count in step 2624. Then, for each node referenced by the branch, as determined in step 2626, a determination is made 2628 as to whether the referenced node is a branch or a leaf. If the referenced node is a branch, the branch serialization method 2616 is recursively called 2630 until a leaf is found. If the referenced node is a leaf, the leaf serialization method 2618 is invoked 2632.

FIG. 26c is a flowchart illustrating one embodiment of the method 2618 for serializing a leaf. As illustrated, the node type (which always equals leaf type in this instance) is copied 2634 to the serial buffer, followed by the character count 2636, followed by the count 2638. Finally, the leaf data is copied 2640 to the serial buffer.

When the entire node and all of its subnodes have been serialized into the serial buffer, the data 208 of the DynArray created in step 2602 is set to the contents of the serial buffer. The entire node structure is then serialized into a single DynArray and is ready for storage on persistent storage.

Figure 27A:
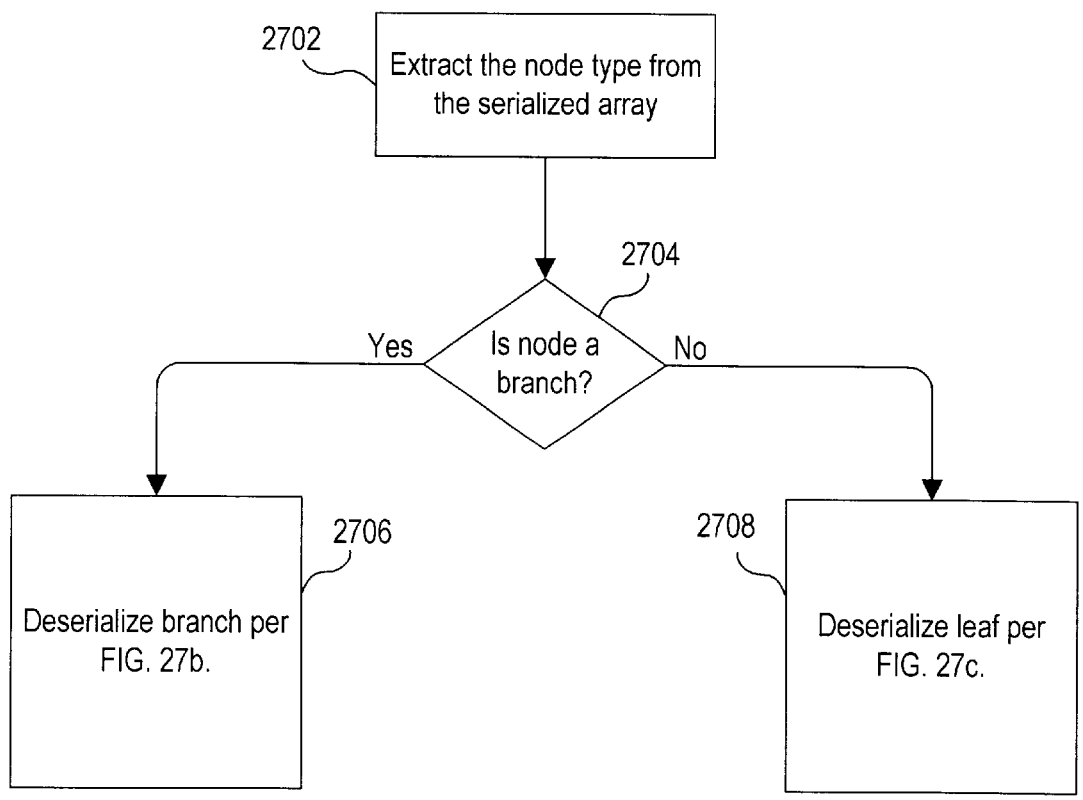
FIGS. 27a–27c illustrate an operational flowchart for deserializing a DynArray serialized according to FIGS. 26a–26c.
Figure 27B:
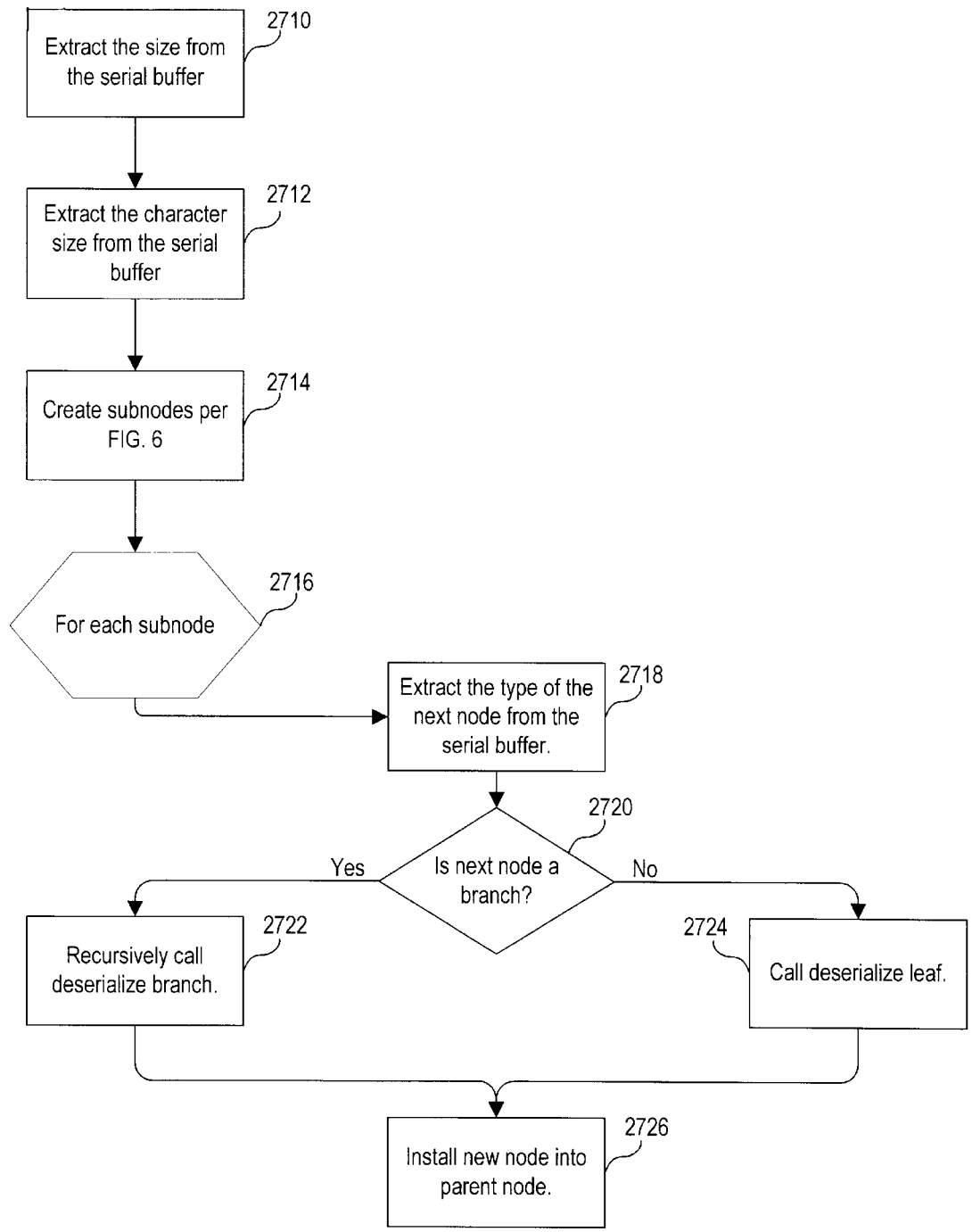
Figure 27C:
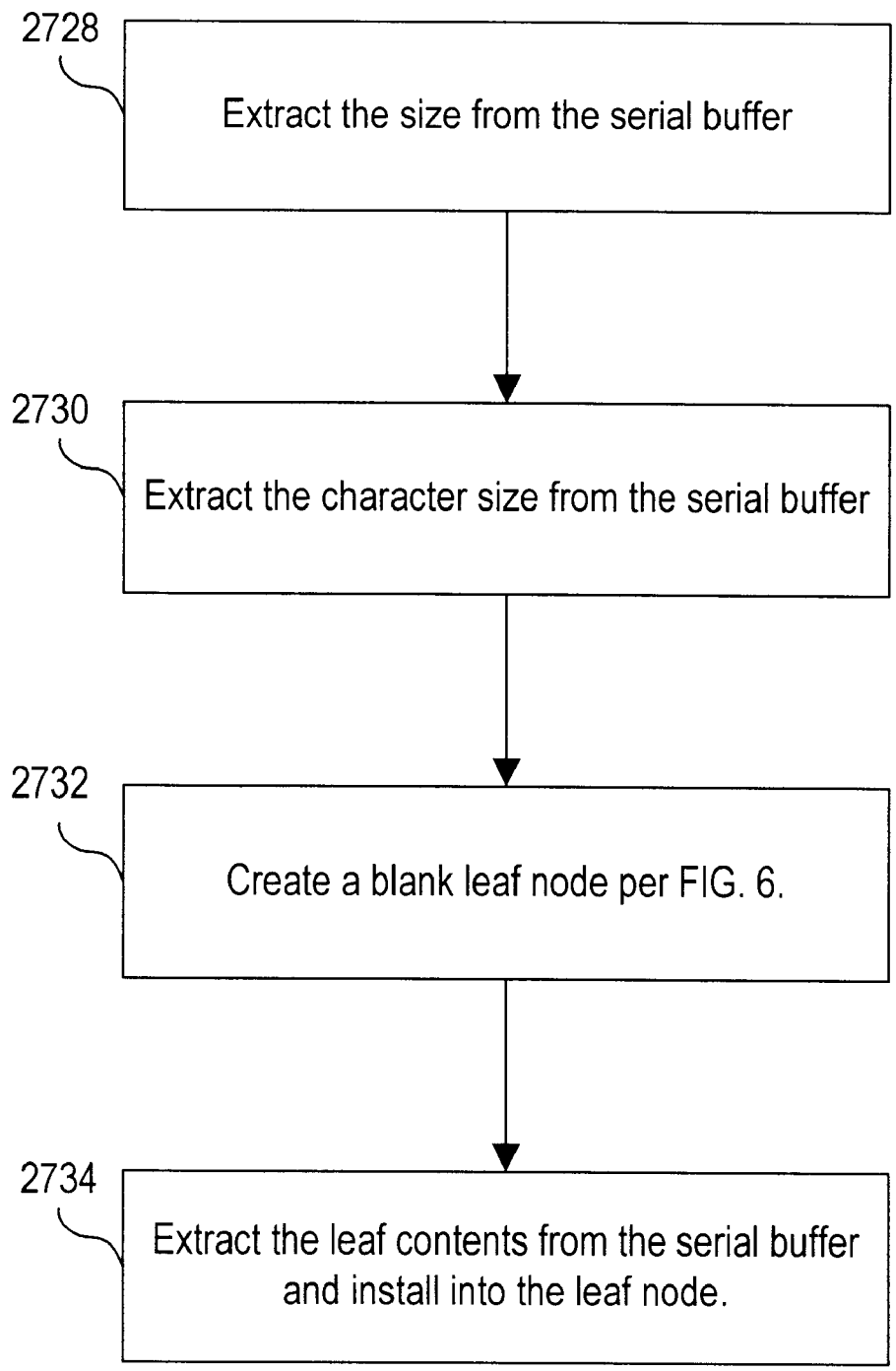

FIGS. 27a–27c contain the operational flowcharts for deserializing a serialized DynArray. As shown in FIG. 27, the node type is extracted 2702 from a serialized DynArray. A determination is made 2704 as to whether the node is branch or a leaf. If the node is a branch, the branch is deserialized 2706 according to the branch deserialization method of FIG. 27b. If the node is a leaf, the branch is deserialized 2708 according to the leaf deserialization method of FIG. 27c.

FIG. 27b illustrates one embodiment for deserializing a branch node. As illustrated, the character count is extracted 2710 from the serialized DynArray. The count is then extracted 2712 from the serialized DynArray. A set of subnodes are created 2714 according to the method of FIG. 6. For each subnode, as kept track of in step 2716, the node type of the next node in the serialized DynArray is extracted 2718 and a determination is made 2720 as to whether the node type of the next node is a branch or a leaf. If the next node is a branch, the deserialize branch routine is recursively called 2722 until a leaf node is found. If the next node is a leaf, the deserialize leaf method of FIG. 27c is called 2724. The new node is then installed 2726 into the parent node.

FIG. 27c illustrates one embodiment of a method for deserializing a leaf node. As illustrated, the character count is extracted 2728 from the serialized DynArray. The count is then extracted from the serialized DynArray. A blank leaf node (as per FIG. 6) is then created 2732, and the leaf contents are extracted 2734 from the serialized DynArray and installed into the leaf node.

When an entire serialized DynArray has been deserialized, the original node structure is restored.

2. Persistent Storage Model

As previously described, utilization of persistent storage is subject to certain constraints due to the serial nature of the access protocols to and from the storage medium. In particular, the methodology for adding, deleting, and modifying the persistent storage model is subject to the constraints of the serialized or semi-serialized data placement format.

Figure 28:
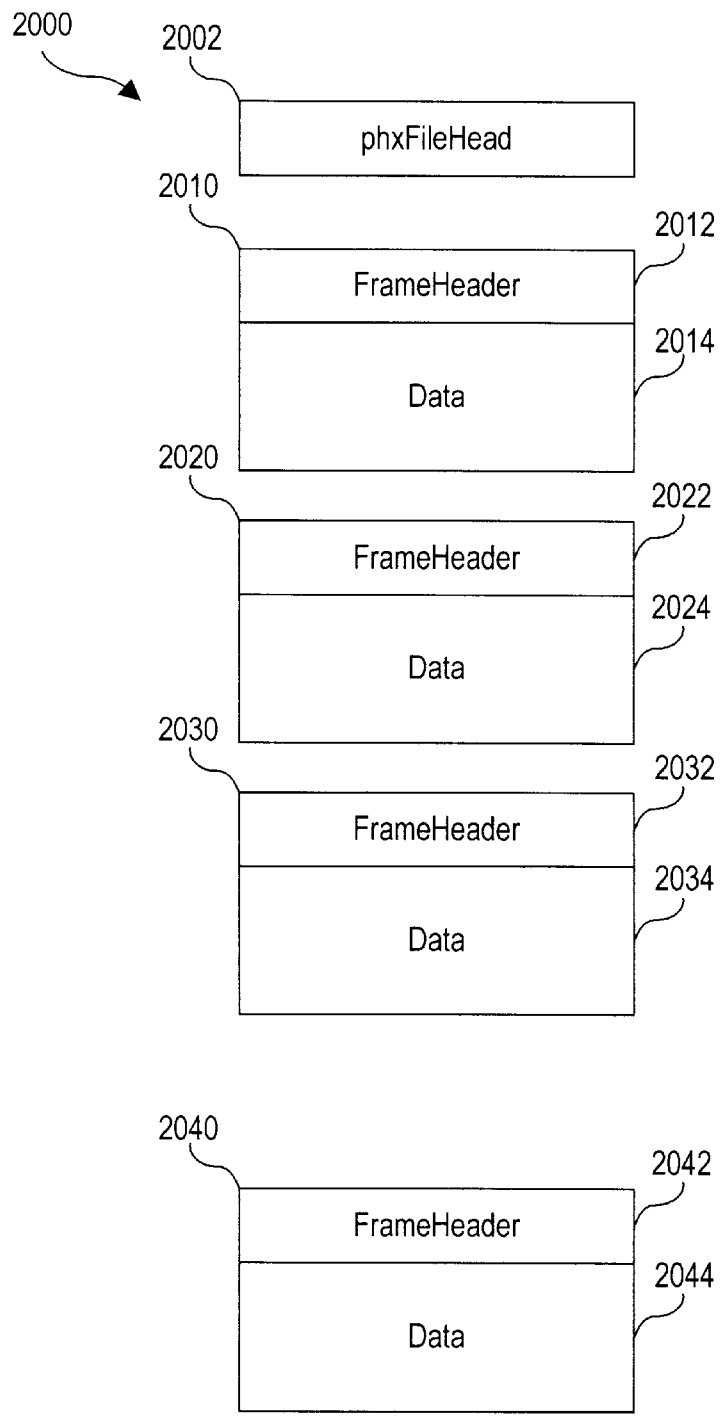
FIG. 28 is a block diagram of a file implemented in accordance with the persistent storage model of the invention.

The persistent storage model of the invention is a methodology for structuring the computer's persistent storage to support the storage and retrieval of any type of information and/or any structure or combination of types in a single entity. Though the model was designed specifically to support the non-persistent storage model previously discussed, it intrinsically supports any non-persistent storage model. The fundamental basis of this model is an entity known as a phxFile, illustrated in FIG. 28. The format of the phxFile is as follows: At the beginning of a file 2800 is a file header (phxFileHead) 2802—which is created when the file is created—containing information required for the management of the file.

Following the file header is a series of frames (storage blocks) 2810, 2820, 2830, 2840, where all frames are of equal size. At this fundamental level, this structure generally follows the invention's Multivalue heritage. However, there are a number of notable exceptions. First, unlike its Multivalue ancestry, the invention provides for a variable frame size on each file. This allows the creator of the file the flexibility required to control excess space in the file. Second, the invention includes a number of different hashing algorithms that can be used to balance the distribution of records into the frames. With more balanced record distribution, the access time to any one record is minimized. In the illustrative embodiment, there are ten different hashing algorithms. Third, the file contains a version number which can be used to manage backward compatibility as the invention matures throughout implementation variances. Finally, the invention uses an automatic gap consolidation feature to manage reuse of otherwise dead space in the file.

Figure 29:
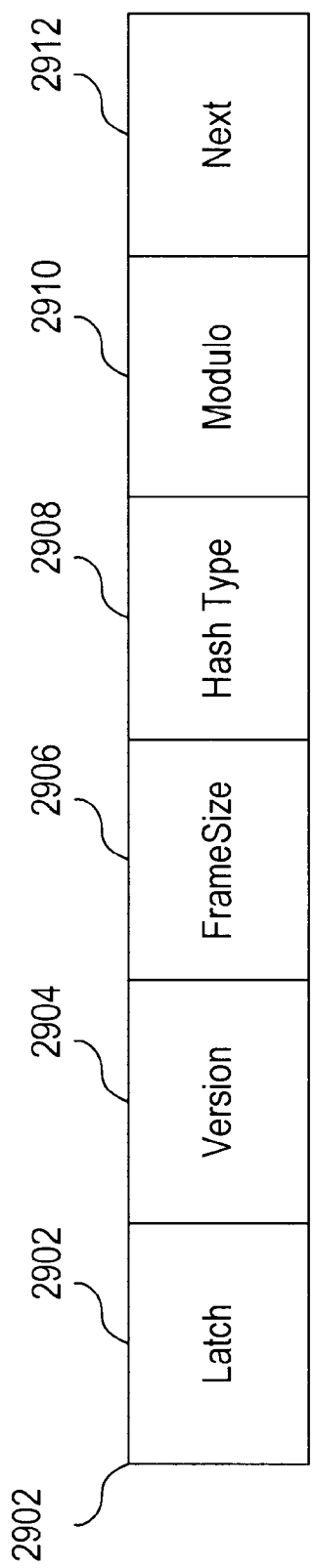
FIG. 29 is a block diagram of a file header implemented in accordance with the persistent storage model of the invention.

In the illustrative embodiment of the invention, file header 2802 contains a latch field 2902, a version field 2904, a frame size field 2906, a hash type field 2908, a modulo field 2910, and a Next frame field 2912, as illustrated in FIG. 29 and described in Table 3.

TABLE 3

| Element | Size | Description |
| --- | --- | --- |
| Latch 2902 | 4 | This element stores information during a file header lock, such as during the expansion of the file when the file header is modified. |
| Version 2904 | 4 | This element contains an integer that defines the version number for the file. |
| Frame Size | 4 | This element contains the number of bytes that will be stored in each of the data frames. It does not include the |

TABLE 3-continued

| Element | Size | Description |
| --- | --- | --- |
| 2906 | | count of bytes required for each frame header. |
| Hash Type 2908 | 4 | This element contains a number that defines the hashing algorithm used for the file. By providing different hashing algorithms, the creator of the file has more control over the distribution of records throughout the frames. |
| Modulo 2910 | 4 | This element contains the number of frames created when the file was originally defined (a.k.a. base frames). |
| Next 2912 | 4 | This element defines the next frame number that will be created when the file overflows the original frames. |

Figure 30:
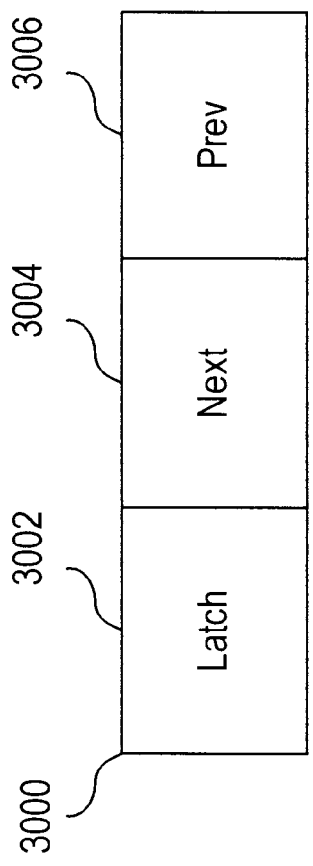
FIG. 30 is a block diagram illustrating the format of a frame head implemented in accordance with the persistent storage model of the invention.

At the beginning of each frame 2810, 2820, 2830, 2840 is a frame header (phxFrameHead) 2812, 2822, 2832, 2842 that contains information specific to its respective frame 2810, 2820, 2830, 2840. Specifically, the frame header is used for linking frames together when the data in a frame exceeds the allotted frame size. Each frame header 2812, 2822, 2832, 2842, illustrated generally in FIG. 30 at 3000, contains latch field 3002, Next frame field 3004, and Previous frame field 3006, described in Table 4.

TABLE 4

| Element | Size | Description |
| --- | --- | --- |
| Latch 3002 | 4 | This element stores information during a frame header lock, such as during the expansion of the file when a frame header is modified. |
| Next 3004 | 4 | Forward link: When a file is first created, this value is set to zero to denote that this frame has no forward linkage. If the frame overflows and needs more space, a new frame is created and its frame number linked here. This is how the invention manages the connection between the frames orginally created (a.k.a. base frames) vs. frames used for overflow (a.k.a. overflow frames). |
| Prev 3006 | 4 | Backward Link: In the base frames, this element is always zero. In overflow frames, however, this element contains the number of the frame that references the overflow frame in the Next element. |

Following the frame header 2812, 2822, 2832, 2842 is a data field 2814, 2824, 2834, 2844, which contains a certain number of data bytes, the length of which is determined by the frame size parameter 2906 in the file header 2802. These data bytes are specifically formatted for each record written to the file, and provide a structure that supports rapid movement from record to record throughout each frame 2810, 2820, 2830, 2840.

In the illustrative embodiment, there are three types of records that can be contained in the data bytes. Table 5 illustrates the different types of records.

TABLE 5

| Record Type | Description |
| --- | --- |
| Living Record | A living record is a record that is considered not deleted; that is, a record with valid, undeleted information. |
| Dead Record | A dead record is a newly deleted record. When records are deleted from the file, the data elements are undisturbed; Only the delete flag is set to denote the record as being deleted. |
| Gap Record | A gap record is a record used to fill in the gap between records when a deleted or gap record is overwritten. See "Gap Records" for more information about gap records. |

Figure 31:
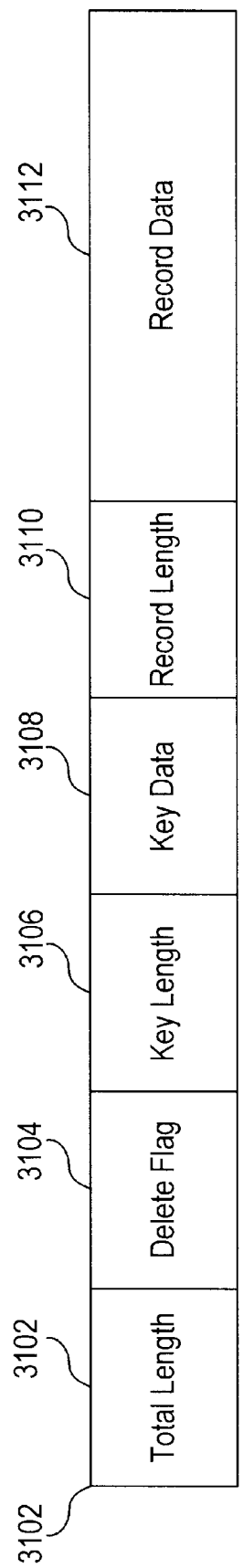
FIG. 31 is a block diagram illustrating the format of a record stored in a frame implemented in accordance with the persistent storage model of the invention.

The format of each record written into the data bytes is illustrated in FIG. 31 and described in Table 6.

TABLE 6

| Element | Size | Description |
| --- | --- | --- |
| Total Length 3102 | 4 | This element contains the total number of data bytes in the key and record. For living and dead records, this value is calculated as: Total Length = Key Length + Record Length For gap records, the total length is calculated as the total number of gap bytes minus the size of the key length and record length elements. In the current embodiment of the invention, this is calculated as: Total Length = total gap size − (total gap used + (sizeof(unsigned) * 3) + sizeof(Del Flag) See "Gap Records" for more information about gap records. |
| Delete Flag 3104 | 1 | This element contains 0 for living records and 1 for dead/gap records. |
| Key Length 3106 | 4 | This element contains the length of the Key Data element. |
| Key Data 3108 | Key Length | This element contains the actual key data for this record. |
| Record Length 3110 | 4 | This element contains the length of the Record Data element. |
| Record Data 3112 | Record Length | This element contains the actual record data. | a. Hashing Options

Hashing is the process by which a sequence of characters is analyzed and a numeric result obtained. For the invention, hashing is used on the key data 3108 to determine the base frame 2810, 2820, 2830, 2840 to be used for writing a particular record.

To calculate a hash value in the illustrative embodiment, the ASCII value of each byte of the key data 3108 is obtained, and added to an accumulator. If a particular hashing algorithm 2908 uses weighting (as do six of the algorithms in the illustrative embodiment), the value of the key byte is multiplied times a weighting factor and then added to an accumulator.

In the illustrative embodiment, the weighting factor for left justified weighting is calculated as:

Weight=key length−byte position

The weighting factor for right justified weighting is calculated as:

Weight=byte position

For any given file 2800, the hash value must be between zero and the number of base frames 2810, 2820, 2830, 2840 in the file 2800. Therefore, for each byte of the key data 3108, the hash value is adjusted to these limits by dividing the accumulated value by the number of base frames in the file and returning the remainder as the new accumulated value.

In the illustrative embodiment, the invention supports ten different hashing algorithms, as set forth in Table 7.

TABLE 7

| Algorithm Symbolic Constant | Description |
| --- | --- |
| HASH_ALL_EVEN | All characters in the key are used in the calculation of the hash value. There is no weighting. |
| HASH_ALL_LEFT | All characters in the key are used in the calculation of the hash value. The numbers are weighted heavier to the left. |

TABLE 7-continued

| Algorithm Symbolic Constant | Description |
| --- | --- |
| HASH_ALL_RIGHT | All characters in the key are used in the calculation of the hash value. The numbers are weighted heavier to the right. |
| HASH_ALPHA_EVEN | Only alphabetic characters in the key are used in the calculation of the hash value. There is no weighting. |
| HASH_ALPHA_LEFT | Only alphabetic characters in the key are used in the calculation of the hash value. The numbers are weighted heavier to the left. |
| HASH_ALPHA_RIGHT | Only alphabetic characters in the key are used in the calculation of the hash value. The numbers are weighted heavier to the right. |
| HASH_NUM_EVEN | Only numeric characters in the key are used in the calculation of the hash value. There is no weighting. |
| HASH_NUM_LEFT | Only numeric characters in the key are used in the calculation of the hash value. The numbers are weighted heavier to the left. |
| HASH_NUM_RIGHT | Only numeric characters in the key are used in the calculation of the hash value. The numbers are weighted heavier to the right. |
| HASH_LONG | The key value is an unsigned long integer. The hash value is the remainder of this integer divided by the Mod parameter in the file header. | b. Overflow

When a file 2800 is created, a certain number N of base frames 2810, 2820, 2830, 2840 (defined by the user) are created. It is impractical to believe that the contents of the file 2800 will always fit in this predefined space. Therefore, each frame 2810, 2820, 2830, 2840 has the ability to overflow, or extend into subsequent frames termed herein "overflow frames". Overflow frames are always added to the end of the file 2800 on an as-needed basis.

Figure 32:
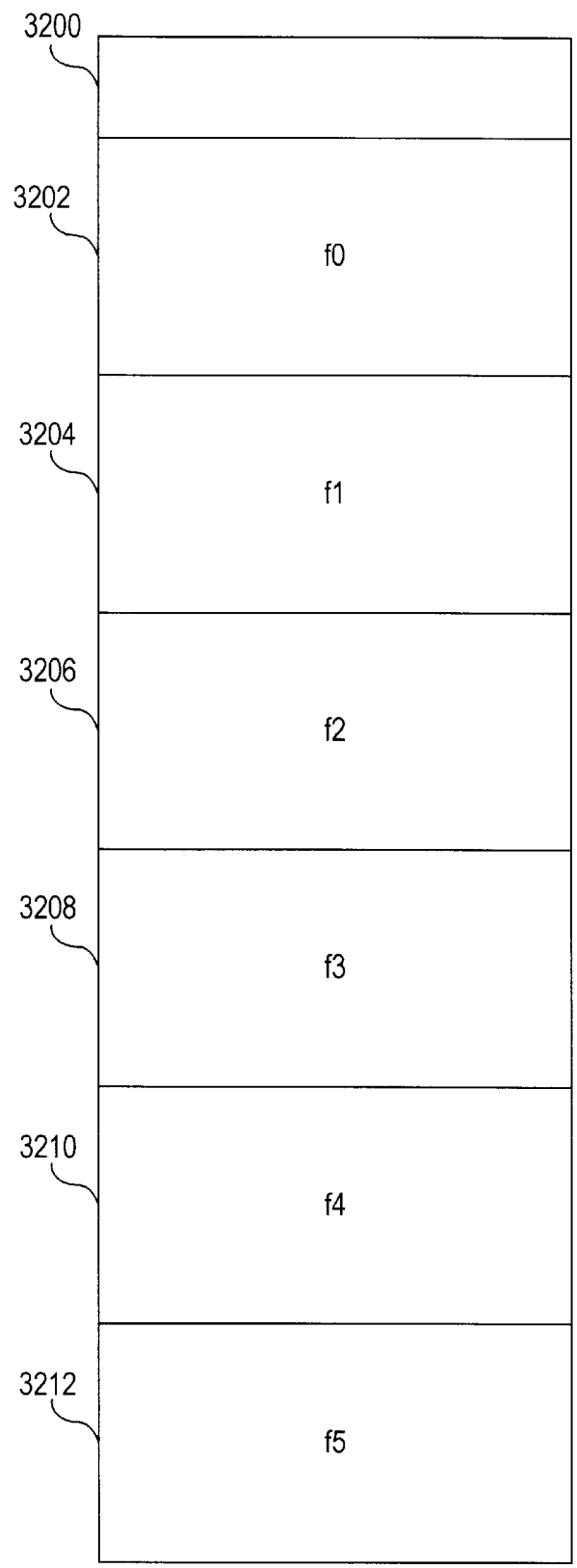
FIG. 32 is an example file implemented in accordance with the persistent storage model of the invention illustrating frame overflow.

For example, consider a file 3200 illustrated in FIG. 32 that created with five base frames numbered $f^0$–$f^4$ 3202–3210. Frame $f^5$ 3212 is then considered the next available frame in the file 3200 to be used for overflow. (The Next parameter 2912 in the file header 2802 will reflect this.) When one of the base frames $f^0$–$f^4$ 3202–3210 requires more space than is available, this new frame $f^5$ 3212 is added to the file 3200 and linked to the base frame that has overflowed. For example, if $f^2$ 3206 overflows, $f^5$ 3212 is added to the file 3200, the file header 2802 Next element 2912 is incremented to point to frame $f^6$ as the next available overflow frame, frame $f^2$ 3406 frame header Next element 3004 is updated to point to overflow frame $f^5$ 3212, and frame $f^5$ 3212 frame header Prev element 3006 is updated to point to frame $f^2$ 3206.

When a frame overflows, the continuity of the bytes in the data element is preserved. The invention automatically coordinates the extension of the base frame into overflow without any impact or change to the structure of the data element.

Finally, overflow frames can themselves be overflowed. The invention automatically extends any frame, whether base or overflow, with additional overflow frames as required. As a result, if a record of 900 bytes is being written into an empty 200 byte base frame, the base frame and 4 overflow frames will be required for the storage of the record.

c. Gap Records

When a record is deleted, the space previously occupied by the record becomes a candidate for overwrite when new or amended records are written to the file. Any record that is exactly the same length or a certain degree smaller can be written over the original deleted record, thus effectively reusing the storage and minimizing unnecessary growth of the file.

If the space occupied by the deleted record is exactly the same size as the space required for storing a new record, the new record will simply overwrite the deleted record. However, it is more likely that the space required for storing the new record will be smaller than the space available. When this occurs, the invention inserts a gap record into the file to occupy the extra storage. Once the gap record has been written, it functions exactly like a deleted record and can be overwritten via the same rules.

To be eligible for a gap record, a gap must
1) follow a written record; and
2) must be wide enough to accommodate a Total Length field 3103, a Delete Flag field 3104, a Key Length field 3106, a Record Length field 3110, and at least one byte of data (regardless of whether the data is key data 3108 or record data 3112).

Figure 37:
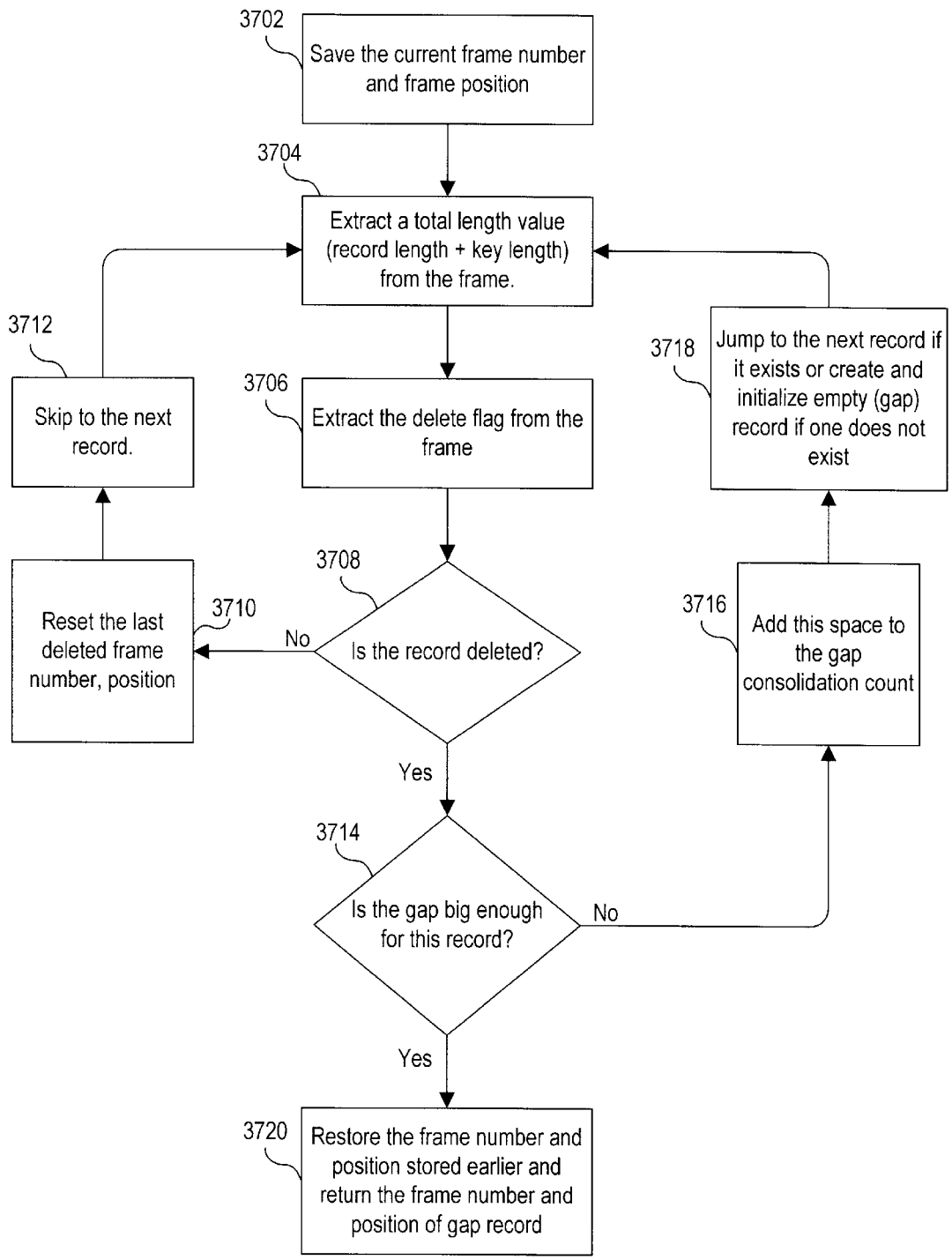
FIG. 37 is a flowchart illustrating one embodiment of a method for locating a write gap during the writing of a record from a file stored in accordance with the persistent storage model of the invention.

The invention also supports a feature known as gap consolidation. When writing a record, sequences of consecutive deleted and gap records are consolidated into one gap for the purpose of determining whether the record to be written would fit in the gap. This feature provides a more sophisticated method of gap reuse, again minimizing unnecessary growth of the file as a whole. FIG. 37 is an operational flowchart of a method for locating a gap which illustrates the implementation of automatic gap consolidation.

The persistent storage model includes a number of methods for manipulating persistent storage. These methods perform access and manipulation of the persistent storage model and generally fall into one of the following categories as illustrated in Table 8.

TABLE 8

| Method Type | Description |
| --- | --- |
| Create | This method is used to create and open a new file. When a file is created, the file header (phxFileHeader, described earlier) is written followed by a number of frames (which is determined by the creator of the file.) Once the file has been created, it is considered opened and can be updated via Write and Delete methods, accessed via Read and Select methods, or closed using the Close method. |
| Open | This method is used to open a file and provide access (update/retrieval) of the contents therein. If the file to be opened does not exist, it is created using default sizing parameters. |
| Close | This method closes an open file. Once a file has been closed it can no longer be accessed or updated. |
| Read | This method reads a record from an open file based on a particular key value. |
| Write | This method writes a record to an open file using a particular key value. Before writing the record, a scan is made through the group to determine if the record previously exists. If the record previously exists, that version of the record is deleted before the new record is written. |
| Delete | This method deletes a record from an open file using a particular key value. |
| Select | This method scans through the open file and returns a list of keys that are in the file. This list of keys can then be scanned sequentially and each record read in turn to achieve pseudo-sequential access to the records in the file. |

Figure 33:
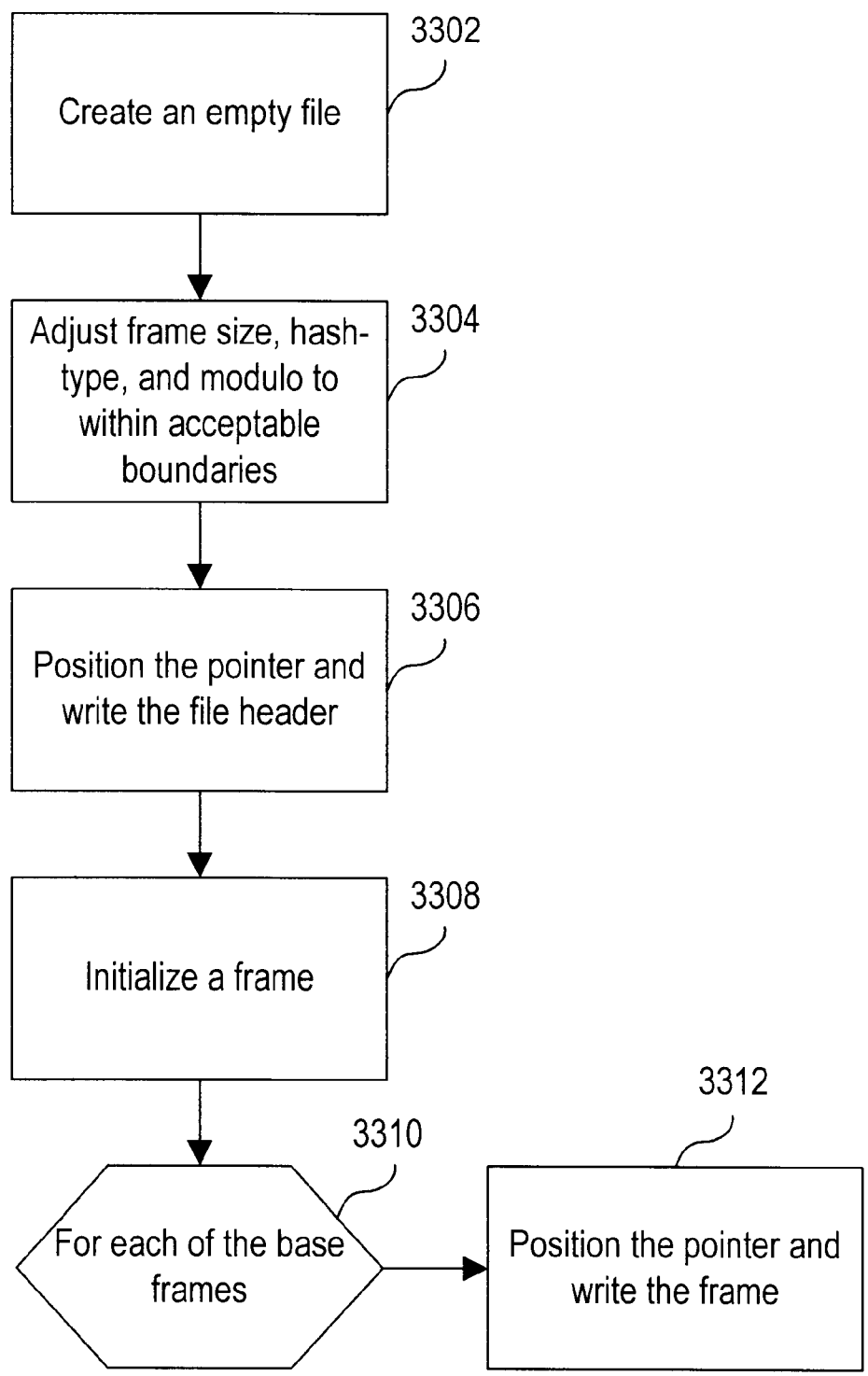
FIG. 33 is a flowchart illustrating one embodiment of a file creation method for creating a new file in persistent storage.

FIGS. 33–39 contain operational flowcharts of the persistent storage model methods defined in Table 8. FIG. 33 illustrates one embodiment of a file creation method for creating a new file in persistent storage, such as file 2800 shown in FIG. 28. In this embodiment, an empty file is first created 3302. The frame size 2906, hash type 2908 and modulo 2910 are defined 3304. The file pointer is positioned to the beginning of the file 2800 and the file header 2802 is written to the file 2800. The number of base frames is determined 3308 according to the modulo 2910 definition. Then, a base frame 2810 is initialized 3310 by setting the Next 3004 and Previous 3006 elements of a frame header 2812 to null, and the data 2814 to an initial value. The file pointer is positioned to the end of the file header 2802 and the initialized base frame 2810 is then written in persistent storage. Each of the other defined base frames 2820, 2830, . . . , and 2840 are similarly initialized 3310 and written 3312 contiguously to persistent storage.

Figure 34:
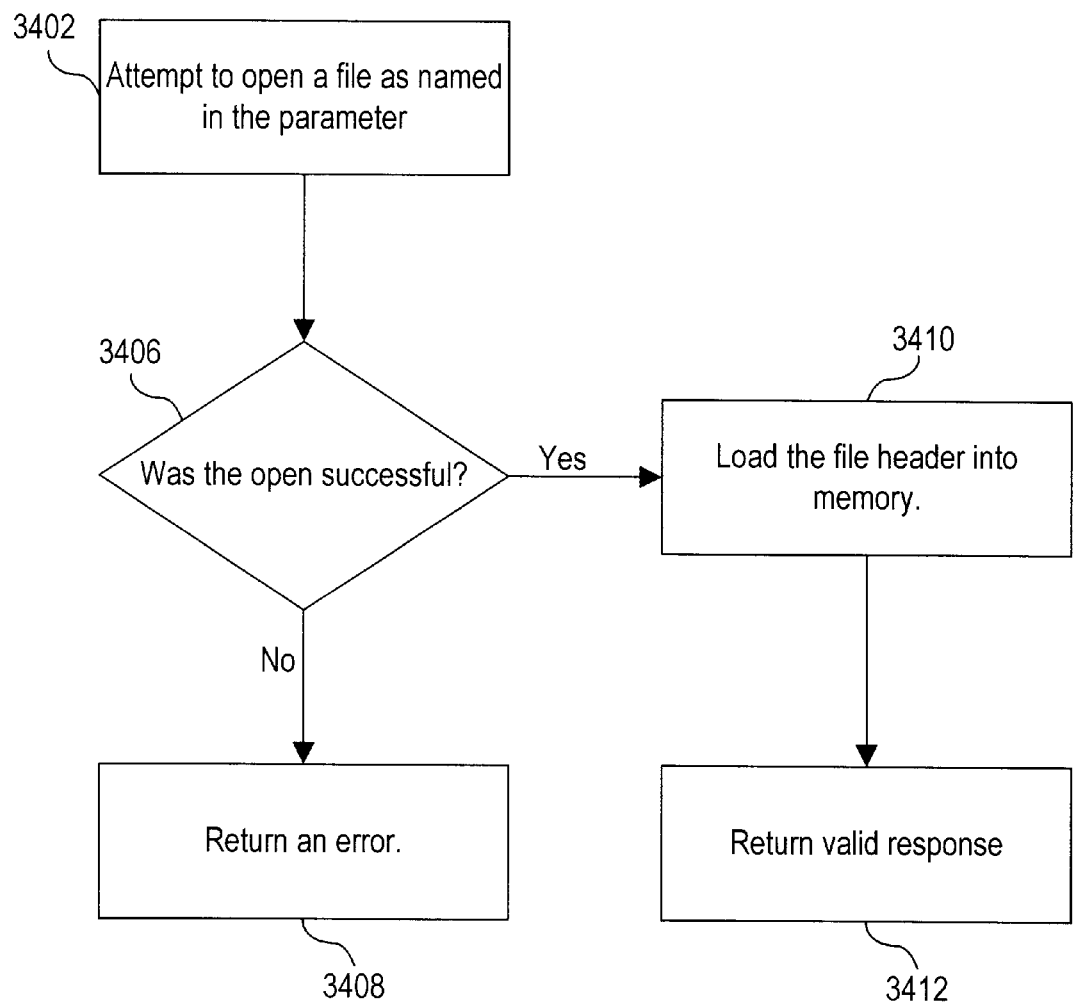
FIG. 34 is a flowchart illustrating one embodiment of a method for opening an existing file stored in accordance with the persistent storage model of the invention.

FIG. 34 illustrates one embodiment of a method for opening an existing file. Using file 2800 of FIG. 28 as an example, this method attempts 3402 to open a file named as the input parameter. If the open is not successful, as determined in step 3406, an error message is returned 3408. If the open is successful, the file header 2802 is loaded 3410 into local memory, and a valid response is returned 3412 to indicate that the file open method is complete.

Figure 35A:
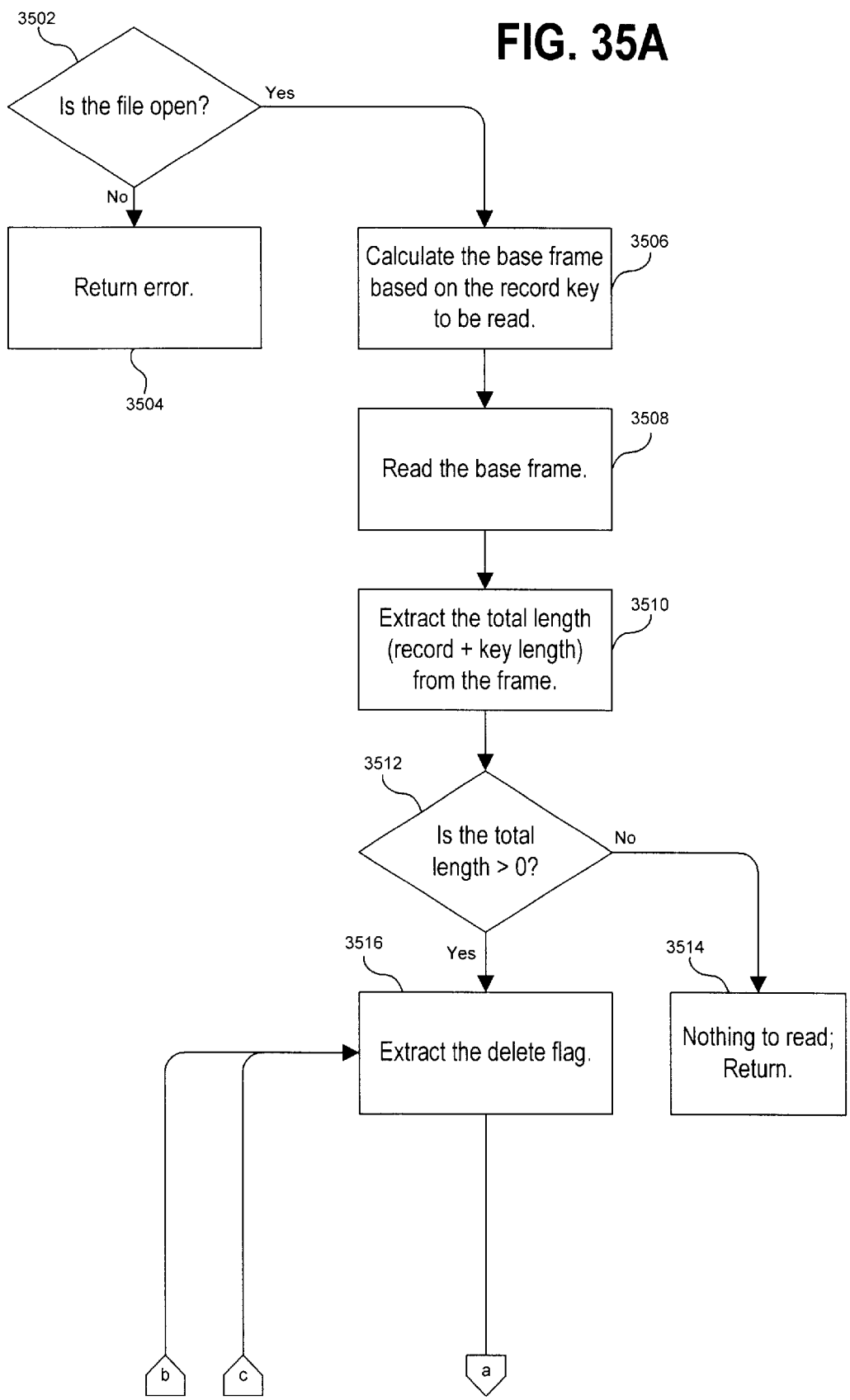
FIGS. 35a–35b contain an operational flowchart illustrating one embodiment of a method for reading a record from a file stored in accordance with the persistent storage model of the invention.
Figure 35B:
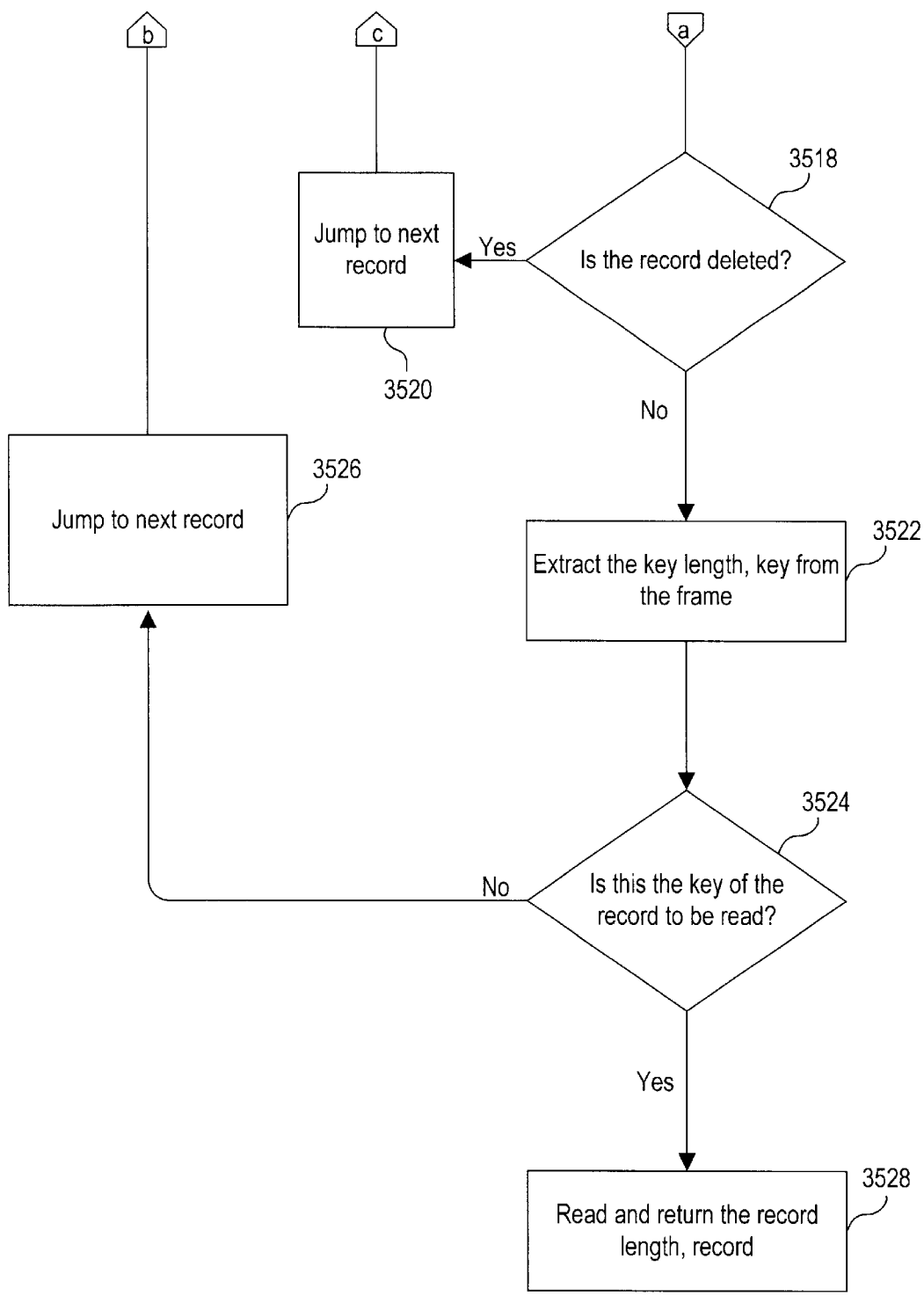

FIGS. 35*a*–35*b* illustrate one embodiment of a method for reading a record from a file. As illustrated, a check is performed 3502 on whether the file is open or not, and an error message is returned 3504 if not. The base frame containing the record is determined 3506 based on the record key to be read. The record key is determined by hashing the record number using the hashing algorithm corresponding to the hash type 2908. Once the correct base frame is determined, it is read 3508 from persistent storage. The total length (i.e., the key length 3106 plus the record length 3110) is extracted 3510 from the first record in the base frame. If the total length is zero, as determined in step 3512, there is nothing to read and the read method returns empty 3514. If the total length is greater than zero, the delete flag 3140 is extracted 3516. If the delete flag indicates that the record has been deleted, as determined in step 3518, the next record is read 3520 and steps 3510 through 3518 are repeated. If the delete flag does not indicate that the record has been deleted, the key length 3106 and key data 3108 are extracted from the current record and the key data 3108 is compared to the key of the record to be read in step 3524. If the key matches that of the record to be read, the record length 3110 and record data 3112 are returned and the method is complete. If, on the other hand, the key data 3108 does not match the key of the record to be read, the next record in the frame is obtained 3526 and steps 3510 through 3528 are repeated until either the record to be read is found or the end of the frame is reached without finding a record key match.

Figure 36A:
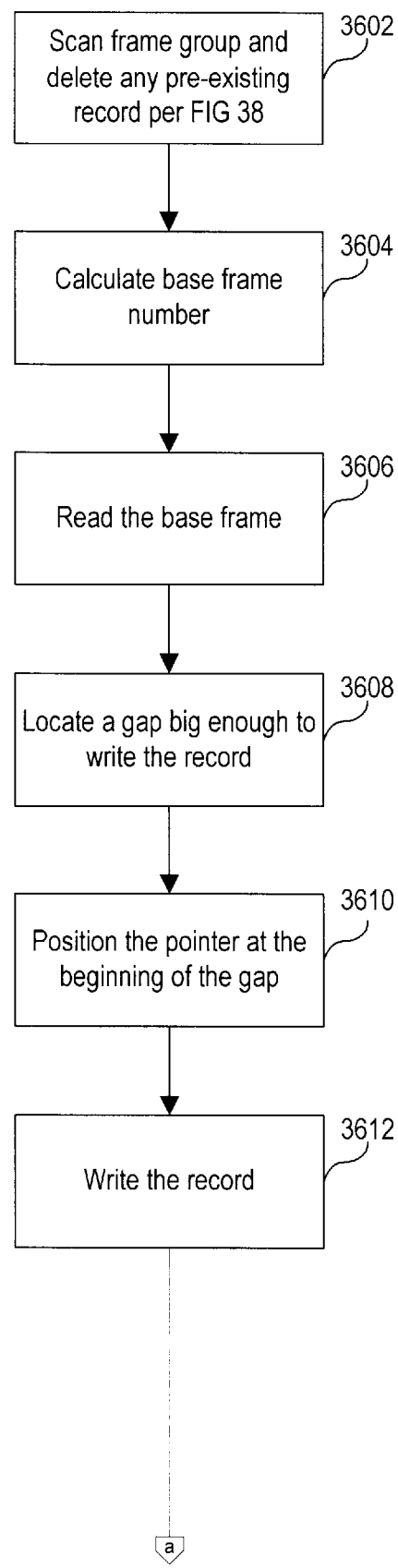
FIGS. 36a–36b contain an operational flowchart illustrating one embodiment of a method for writing a record to a file stored in accordance with the persistent storage model of the invention.
Figure 36B:
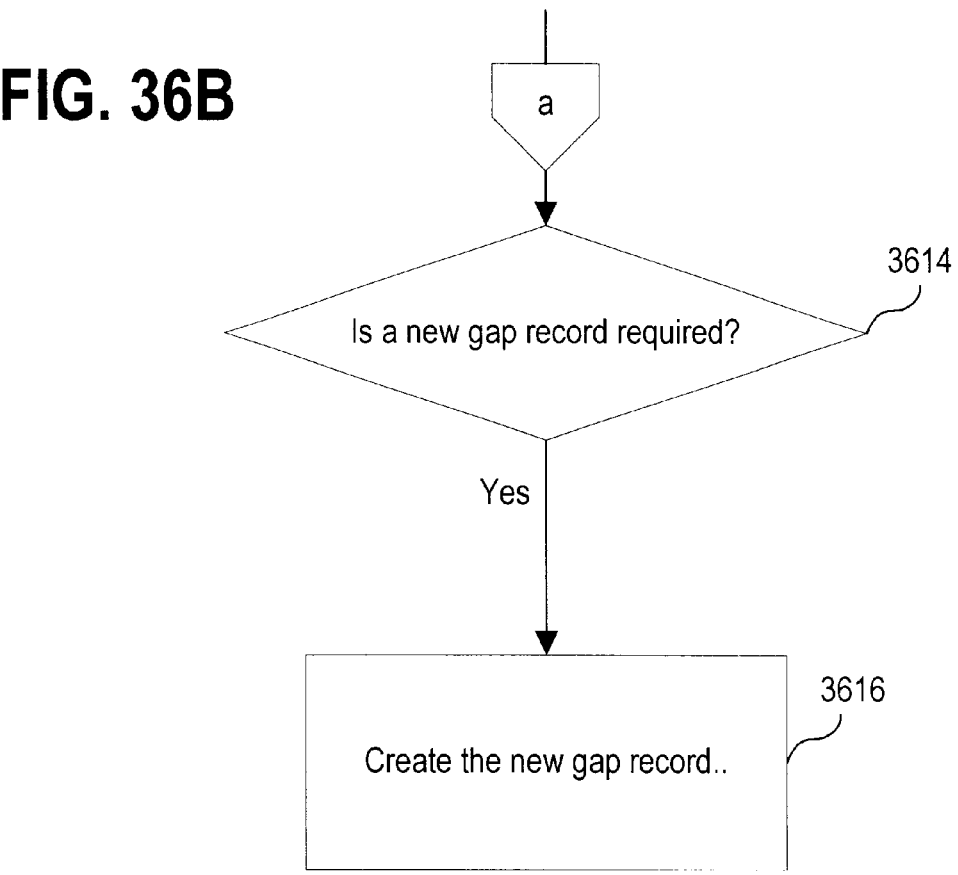

FIGS. 36*a*–36*b* illustrate one embodiment of a method for writing a record to an existing file. As illustrated, a scan is made through the frame group corresponding to the proper base frame, as determined from the record key, to determine whether the record previously exists in the file, and to delete 3602 the previously existing record from the file if it does exist. The base frame number is then calculated 3604 based on the key value of the record to be written. The frame group corresponding to the calculated base frame is then read sequentially 3606 (as per FIGS. 35*a*–35*b*), beginning with the base frame and overflowing into the next overflow frames as necessary (and creating them as necessary) in the same frame group to locate 3608 a gap large enough to store the record to be written. Once the position in the file where the record is to be written is located, the file pointer is positioned 3610 at the beginning of the selected gap, and the record is written 3612 at that location. If the gap is not completely overwritten by the record, as determined in step 3614, a new gap record is created 3616 in the remaining portion of the gap area if the size of the remaining portion of the gap is wide enough to accommodate a total length field 3103, a delete flag 3104, a key length field 3106, a record length field 3110, and at least one byte of data (either key data 3108 or record data 3112).

FIG. 37 illustrates one embodiment of a method for locating a write gap as per step 3608 of FIG. 36a. In this embodiment, the current frame number and frame position are saved 3702 for later return. The total length value, including the record length 3106 and key length 3110 from the current record, is extracted 3704. The delete flag 3104 is also extracted 3706 and used to detect 3708 whether the record has been deleted. If the record has been deleted (the delete flag 3104 will be set to a "1"), the last deleted frame number and position are reset 3710 and the method skips 3712 to the next record in the frame group, updating the current frame number and frame position. Steps 3704 through 3712 are repeated until a record is found that has been deleted, as detected in step 3708. Once a deleted (or gap) record is found, the total length value is compared 3714 to the size of the record to be written to determine whether the gap is large enough to store the record to be written. If the gap record is not large enough to store the-record to be written, the total length value is added 3716 to the gap consolidation count, the next record is read 3718 (or created, initialized and read if no more records exist in the frame group), and steps 3704 through 3714 are repeated until either a gap record or a series of consolidated gap records is located that is large enough to store the record to be written. The frame number and frame position saved on entry into the method in step 3702 are then restored and the frame number and frame position of the located gap record are returned 3720.

Figure 38A:
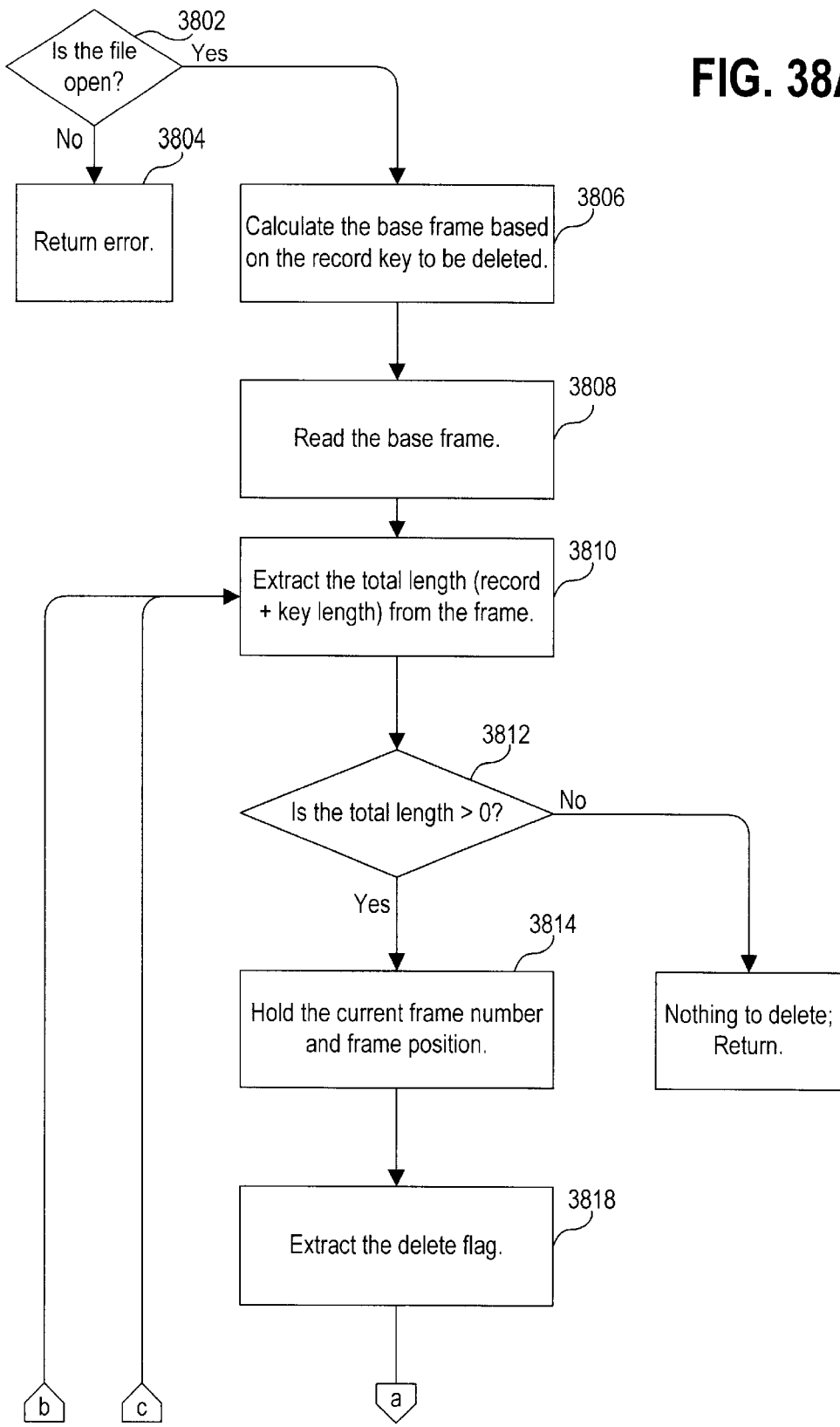
FIGS. 38a–38b illustrate one embodiment of a method for deleting a record from a file stored in accordance with the persistent storage model of the invention.
Figure 38B:
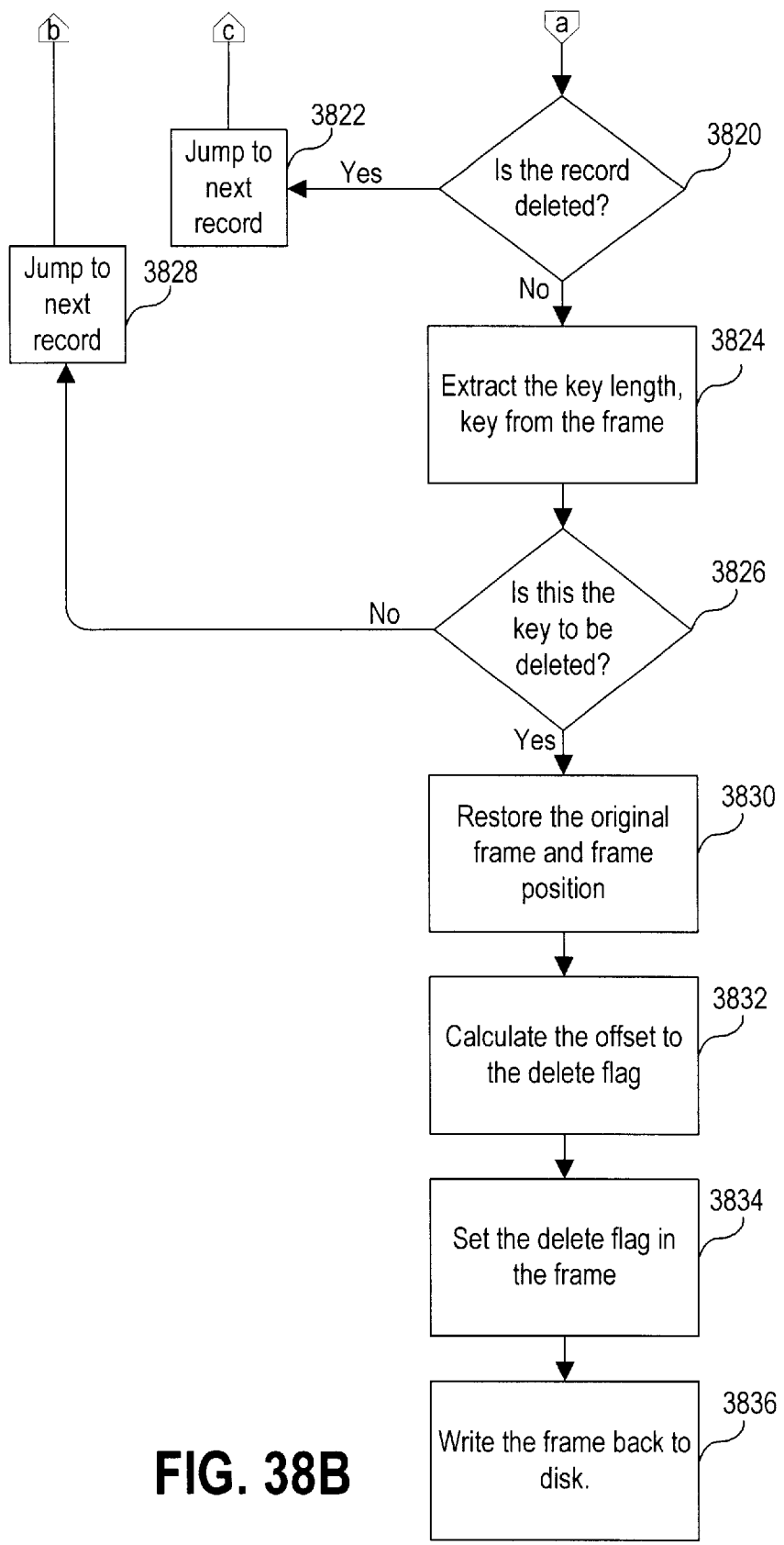

FIGS. 38a–38b illustrate one embodiment of a method for deleting a record. A check is first performed 3802 to ensure that the file from which the record is to be deleted is open, and a message returned 3804 if the file is not open. The base frame of the record to be deleted is calculated 3806 using the record key of the record to be deleted and the hash type. The base frame is then read 3808, and the total length including the record length 3110 value and key length 3106 value is extracted 3810 from the frame. If the total length is zero, as detected in step 3812, the frame does not contain the record to be deleted and the method returns 3816. If the total length is greater than zero, the current frame number and frame position are saved 3814 for return later. The delete flag 3140 is then extracted 3818. If the record is deleted, as detected in step 3820, the method jumps 3822 to the next record in the current frame group and repeats steps 3810 through 3820 until a record is found that has not been deleted already. Once such a record is found, the key length 3106 is extracted and used to extract 3824 the key data 3108 from the current record. The key data 3108 value is compared 3826 to the key value of the record to be deleted. If the keys do not match, the method jumps 3828 to the next record in the current frame group and repeats steps 3810 through 3826 until it finds the record that has a matching key value. Once the matching record is found, the original frame number and frame position are restored 3830, and the offset to the delete flag in the frame is calculated 3832 and set 3834. The frame is then written back 3826 to persistent storage.

It will be recognized that the deletion method performs a "soft" delete of the record, and the record space is then available for overwrite by converting it to a "gap" record.

Figure 39A:
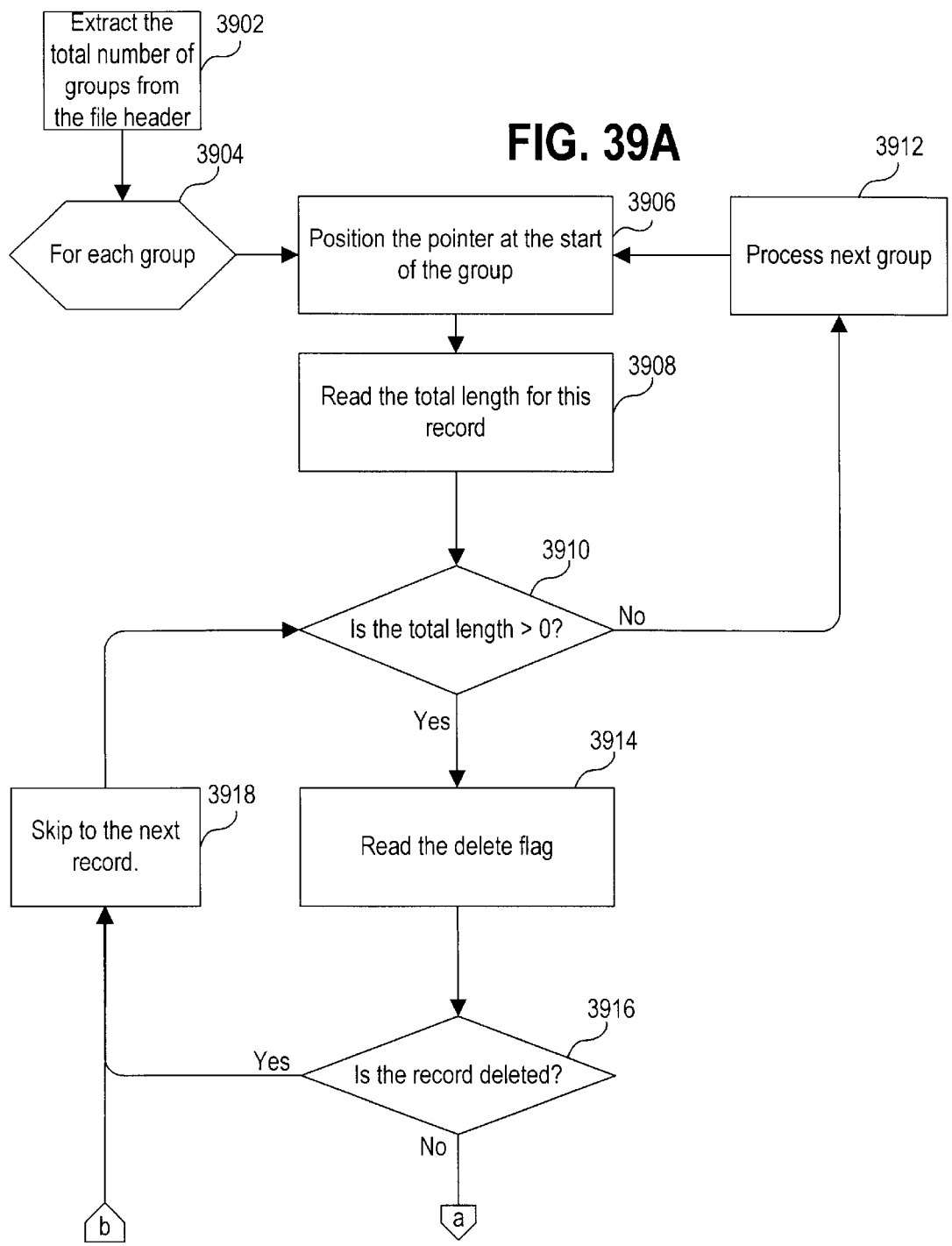
FIGS. 39a–39b illustrate one embodiment of a method for selecting records in a file stored in accordance with the persistent storage model of the invention.
Figure 39B:
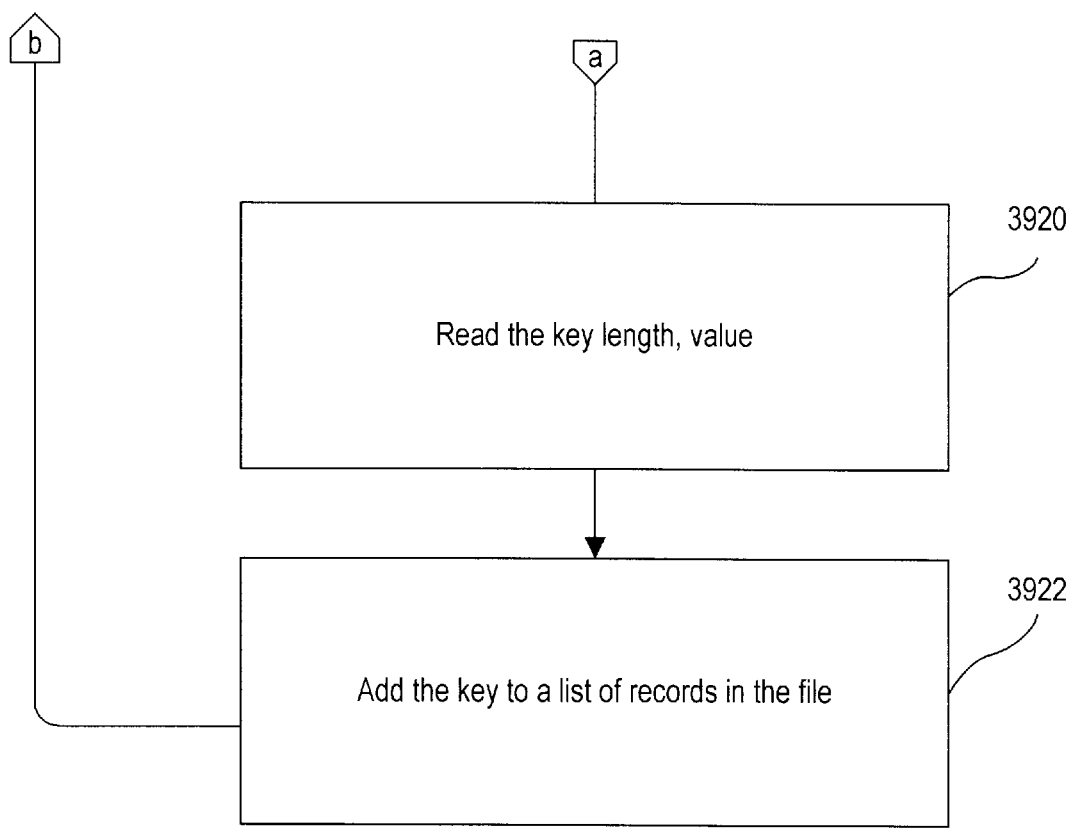

FIGS. 39a–39b illustrate one embodiment of a method for selecting records. In this embodiment, the total number of frame groups, as determined by the modulo field 2910 in the file header 2900 is extracted 3902. Then for each group, as managed by step 3904, the following steps are performed. First, the file pointer is positioned 3906 at the start of the group. The total length of the current record is read 3908. If the total length is not greater than zero, as detected in a step 3910, the next group is located to process 3912. If the total length of the current record is detected to be greater than zero, the delete flag is extracted 3914. If the record is deleted, as detected in step 3916, the next record in the group is located 3918 and the method continues as described beginning with step 3908. If the record has not been deleted, as detected in step 3916, the key length 3106 is read and used to obtain 3920 the key data 3108 value, which is added to a list of keys associated with records existing in the file. The method is repeated for each subsequent record in the frame group, and then for each frame group in the file.

It will be appreciated from the above detailed description that the present invention solves many of the problems of prior art database solutions. The invention allows records of unlimited dimensions containing data of any type and size, in any combination, to be constructed, maintained, and utilized in both non-persistent and persistent storage. In the persistent model, the invention also allows a user to define variable length frames, multiple hashing algorithms, and reuse of space caused by deleted records using an automatic gap consolidation algorithm.

Although the invention has been described in terms of the illustrative embodiments, it will be appreciated by those skilled in the art that various changes and modifications may be made to the illustrative embodiments without departing from the spirit or scope of the invention. It is intended that the scope of the invention not be limited in any way to the illustrative embodiment shown and described but that the invention be limited only by the claims appended hereto.

What is claimed is:

1. A data file which stores one or more records in persistent storage, comprising:

a plurality of equally sized data frames;

a file header comprising a frame size field which indicates the size of each of said plurality of data frames, a hash type field which indicates which of a plurality of different hashing algorithms is to be used to determine the respective positions of said records in said file, and a modulo field which indicates a number of hash buckets to be used by said hashing algorithm indicated by said hash type field; and at least one record stored in at least one of said plurality of equally sized data frames, each of said at least one record comprising a key length field containing a size of a key that identifies said record, a key data field which contains said key, a record data field containing zero or more bytes of record data, and a record length field which contains the size of said record data field.

2. A data file in accordance with claim 1, wherein said plurality of equally sized data frames comprises a plurality of base frames, said plurality of base frames comprising a set of originally created data frames equal in number to the value of said modulo field.

3. A data file in accordance with claim 2, wherein:

said plurality of data frames comprises zero or more overflow frames; and wherein each of said plurality of data frames comprises a frame header, said frame header comprising a forward link field that contains a pointer to one of said overflow frames if said data frame adds with said fame header overflows, and a backward link field that contains a pointer to one of said base frames or one of said other overflow frames from which data overflowed if said data frame associated with said frame header is an overflow frame.

4. A data file in accordance with claim 3, wherein:

each of said at least one record comprises a delete flag which indicates whether or not said record has been deleted from said file.

5. A method for storing one or more records in persistent storage, said method comprising the steps of:

creating a file header, said file header comprising a frame size field, a hash type field, and a modulo field;

creating a plurality of equally sized data frames, said plurality of data frames comprising a plurality of base frames;

setting said frame size field to the size of each of said plurality of equally sized data frames;

setting said hash type field to indicate a selected one of a plurality of different hashing algorithms that is to be used to determine the respective positions of said one or more records in said file;

setting said modulo field to the number of said base frames, said modulo indicating a number of hash buckets to be used by said selected hashing algorithm;

receiving a data record to be stored, said data record comprising a key data field containing a record key that identifies said record, a key length field indicating the size of said key data field, a data field containing record data; and a data length field indicating the size of said data field;

hashing said record key associated with a data record to be stored to select one base frame from said plurality of base frames and to determine a selected frame group corresponding to said selected base frame;

locating an available gap within said frame group that is large enough to store said data record to be stored; and writing said data record to be stored in said available gap.

6. A method in accordance with claim 5, wherein:

said available gap spans a portion of two or more of said plurality of equally sized data frames.

7. A method in accordance with claim 6, wherein:

said locating step comprises reading a sequence of characters from one of said equally sized data frames, determining if the characters represent a gap or record, skipping records and gaps until a gap of sufficient size for storing said data record to be stored is determined, and potentially traversing through a plurality of said equally sized frames to determine said gap.

8. A method in accordance with claim 7, wherein:

the determination of said gap of sufficient size is based on the total size of a consolidation of adjacent gaps in a plurality of equally sized data frames.

9. A method for accessing a record in a file stored in persistent storage, said file comprising a plurality of equally sized data frames arranged in a plurality of frame groups, a file header comprising a frame size field which indicates the size of each of said plurality of data frames, a hash type field which indicates a selected one of a plurality of different hashing algorithms to be used to select one of said plurality of frame groups in which said record to be accessed should reside, and a modulo field which indicates a number of hash buckets to be used by said selected hashing algorithm in determining which of said plurality of data frames belongs in said selected frame group, said method comprising:

receiving a record identifier that identifies said record to be accessed;

hashing said record identifier to obtain a record key associated with said record to be accessed, to select one of said plurality of frame groups in which said record to be accessed should reside;

reading a sequence of characters from said selected frame group;

determining if the characters represent a gap or record;

if said characters represent a record:
extracting a record key from the characters;
comparing the extracted record key to the record key associated with the record to be accessed; and
indicating a position of the record if the record key matches the record key associated with the record to be accessed; and if said characters represent a gap or said record key does not match the record key associated with the record to be accessed:
reading a next sequence of characters from selected frame group; and
repeating said determining step through said repeating step until a record having a record key that matches said record key of said record to be accessed is either found or the entire selected frame group has been read.

10. A method for accessing a record in a file in accordance with claim 9, comprising:

if said position of said record to be accessed is indicated:
extracting a delete flag from said record; and
setting the delete flag to indicate that said record is deleted.

11. A method for accessing a record in a file in accordance with claim 9, comprising:

if said position of said record to be accessed is indicated:
overwriting said record to be accessed with a replacement record at said indicated position; and
if said overwritten record is greater in size that said replacement record, inserting a gap in the portion of said overwritten record that is not overwritten by said replacement record.

* * * * *